United States Patent
Palla et al.

(10) Patent No.: US 12,310,286 B2
(45) Date of Patent: May 27, 2025

(54) CROP CONSTITUENT SENSING

(71) Applicant: Deere & Company, Moline, IL (US)

(72) Inventors: Bhanu Kiran Reddy Palla, Bettendorf, IA (US); Federico Pardina-Malbran, Fort Collins, CO (US); Nathan R. Vandike, Geneseo, IL (US)

(73) Assignee: Deere & Company, Moline, IL (US)

( * ) Notice: Subject to any disclaimer, the term of this patent is extended or adjusted under 35 U.S.C. 154(b) by 808 days.

(21) Appl. No.: 17/550,762

(22) Filed: Dec. 14, 2021

(65) Prior Publication Data

US 2023/0180662 A1   Jun. 15, 2023

(51) Int. Cl.
| | | |
|---|---|---|
| A01D 41/12 | (2006.01) | |
| A01B 79/00 | (2006.01) | |
| A01D 41/127 | (2006.01) | |
| G06Q 50/02 | (2012.01) | |
| A01D 43/08 | (2006.01) | |

(52) U.S. Cl.
CPC ........ *A01D 41/1277* (2013.01); *A01B 79/005* (2013.01); *G06Q 50/02* (2013.01); *A01D 43/085* (2013.01); *G06T 2207/30188* (2013.01)

(58) Field of Classification Search
CPC .............. A01D 41/1277; A01D 43/085; A01D 41/127; A01B 79/005; G06Q 50/02; G06T 2207/30188
See application file for complete search history.

(56) References Cited

U.S. PATENT DOCUMENTS

| | | |
|---|---|---|
| 3,568,157 A | 3/1971 | Downing et al. |
| 3,580,257 A | 5/1971 | Teague |
| 3,599,543 A | 8/1971 | Kerridge |
| 3,775,019 A | 11/1973 | Konig et al. |
| 3,856,754 A | 12/1974 | Habermeier et al. |
| 4,129,573 A | 12/1978 | Bellus et al. |
| 4,166,735 A | 9/1979 | Pilgram et al. |
| 4,183,742 A | 1/1980 | Sasse et al. |

(Continued)

FOREIGN PATENT DOCUMENTS

| | | |
|---|---|---|
| AR | 108898 A1 | 10/2018 |
| AU | 20100224431 A1 | 4/2011 |

(Continued)

OTHER PUBLICATIONS

Apan et al., "Predictive Mapping of Blackberry in the Condamine Catchment Using Logistic Regressiona dn Spatial Analysis", Jan. 2008, 12 pages.

(Continued)

*Primary Examiner* — Kira Nguyen
(74) *Attorney, Agent, or Firm* — Kelly, Holt & Christenson; Joseph R. Kelly

(57) ABSTRACT

A crop constituent value is sensed by a crop constituent sensor on an agricultural machine. The crop constituent value is distributed among subregions covered by the agricultural machine. A vegetative index-estimated crop constituent value is obtained for each of the subregions. A weighted crop constituent value is generated for each subregion based upon the distributed constituent value for each subregion and the vegetative index-estimated constituent value for that subregion. An action signal is generated based upon the weighted crop constituent value for the subregion.

20 Claims, 12 Drawing Sheets

(56) References Cited

U.S. PATENT DOCUMENTS

| | | |
|---|---|---|
| 4,268,679 A | 5/1981 | Lavanish |
| 4,349,377 A | 9/1982 | Churchill |
| 4,360,677 A | 11/1982 | Doweyko et al. |
| 4,435,203 A | 3/1984 | Funaki et al. |
| 4,493,726 A | 1/1985 | Burdeska et al. |
| 4,527,241 A | 7/1985 | Sheehan et al. |
| 4,566,901 A | 1/1986 | Martin et al. |
| 4,584,013 A | 4/1986 | Brunner |
| 4,687,505 A | 8/1987 | Sylling et al. |
| 4,857,101 A | 8/1989 | Musco et al. |
| 4,911,751 A | 3/1990 | Nyffeler et al. |
| 5,059,154 A | 10/1991 | Reyenga |
| 5,089,043 A | 2/1992 | Hayase et al. |
| 5,246,164 A | 9/1993 | McCann et al. |
| 5,246,915 A | 9/1993 | Lutz et al. |
| 5,250,690 A | 10/1993 | Turner et al. |
| 5,296,702 A | 3/1994 | Beck et al. |
| 5,300,477 A | 4/1994 | Tice |
| 5,416,061 A | 5/1995 | Hewett et al. |
| 5,477,459 A | 12/1995 | Clegg et al. |
| 5,488,817 A | 2/1996 | Paquet et al. |
| 5,563,112 A | 10/1996 | Barnes, III |
| 5,585,626 A | 12/1996 | Beck et al. |
| 5,586,033 A | 12/1996 | Hall |
| 5,592,606 A | 1/1997 | Myers |
| 5,606,821 A | 3/1997 | Sadjadi et al. |
| 5,666,793 A | 9/1997 | Bottinger |
| 5,712,782 A | 1/1998 | Weigelt et al. |
| 5,721,679 A | 2/1998 | Monson |
| 5,767,373 A | 6/1998 | Ward et al. |
| 5,771,169 A | 6/1998 | Wendte |
| 5,789,741 A | 8/1998 | Kinter et al. |
| 5,809,440 A | 9/1998 | Beck et al. |
| 5,841,282 A | 11/1998 | Christy et al. |
| 5,849,665 A | 12/1998 | Gut et al. |
| 5,878,821 A | 3/1999 | Flenker et al. |
| 5,899,950 A | 5/1999 | Milender et al. |
| 5,902,343 A | 5/1999 | Hale et al. |
| 5,915,492 A | 6/1999 | Yates et al. |
| 5,957,304 A | 9/1999 | Dawson |
| 5,974,348 A | 10/1999 | Rocks |
| 5,978,723 A | 11/1999 | Hale et al. |
| 5,991,687 A | 11/1999 | Hale et al. |
| 5,991,694 A | 11/1999 | Gudat et al. |
| 5,995,894 A | 11/1999 | Wendte |
| 5,995,895 A | 11/1999 | Watt et al. |
| 6,004,076 A | 12/1999 | Cook et al. |
| 6,016,713 A | 1/2000 | Hale |
| 6,029,106 A | 2/2000 | Hale et al. |
| 6,041,582 A | 3/2000 | Tiede et al. |
| 6,073,070 A | 6/2000 | Diekhans |
| 6,073,428 A | 6/2000 | Diekhans |
| 6,085,135 A | 7/2000 | Steckel |
| 6,119,442 A | 9/2000 | Hale |
| 6,119,531 A | 9/2000 | Wendte et al. |
| 6,128,574 A | 10/2000 | Diekhans |
| 6,141,614 A | 10/2000 | Janzen et al. |
| 6,185,990 B1 | 2/2001 | Missotten et al. |
| 6,188,942 B1 | 2/2001 | Corcoran et al. |
| 6,199,000 B1 | 3/2001 | Keller et al. |
| 6,204,856 B1 | 3/2001 | Wood et al. |
| 6,205,381 B1 | 3/2001 | Motz et al. |
| 6,205,384 B1 | 3/2001 | Diekhans |
| 6,216,071 B1 | 4/2001 | Motz |
| 6,236,924 B1 | 5/2001 | Motz et al. |
| 6,272,819 B1 | 8/2001 | Wendte et al. |
| 6,327,569 B1 | 12/2001 | Reep |
| 6,374,173 B1 | 4/2002 | Ehlbeck |
| 6,380,745 B1 | 4/2002 | Anderson et al. |
| 6,431,790 B1 | 8/2002 | Anderegg et al. |
| 6,451,733 B1 | 9/2002 | Pidskalny et al. |
| 6,505,146 B1 | 1/2003 | Blackmer |
| 6,505,998 B1 | 1/2003 | Bullivant |
| 6,539,102 B1 | 3/2003 | Anderson et al. |
| 6,549,849 B2 | 4/2003 | Lange et al. |
| 6,584,390 B2 | 6/2003 | Beck |
| 6,591,145 B1 | 7/2003 | Hoskinson et al. |
| 6,592,453 B2 | 7/2003 | Coers et al. |
| 6,604,432 B1 | 8/2003 | Hamblen et al. |
| 6,682,416 B2 | 1/2004 | Behnke et al. |
| 6,687,616 B1 | 2/2004 | Peterson et al. |
| 6,729,189 B2 | 5/2004 | Paakkinen |
| 6,735,568 B1 | 5/2004 | Buckwalter et al. |
| 6,834,550 B2 | 12/2004 | Upadhyaya et al. |
| 6,838,564 B2 | 1/2005 | Edmunds et al. |
| 6,846,128 B2 | 1/2005 | Sick et al. |
| 6,932,554 B2 | 8/2005 | Isfort |
| 6,999,877 B1 | 2/2006 | Dyer et al. |
| 7,073,374 B2 | 7/2006 | Berkman |
| 7,167,797 B2 | 1/2007 | Faivre et al. |
| 7,167,800 B2 | 1/2007 | Faivre et al. |
| 7,191,062 B2 | 3/2007 | Chi et al. |
| 7,194,965 B2 | 3/2007 | Hickey et al. |
| 7,211,994 B1 | 5/2007 | Mergen et al. |
| 7,248,968 B2 | 7/2007 | Reid |
| 7,255,016 B2 | 8/2007 | Burton |
| 7,261,632 B2 | 8/2007 | Pirro et al. |
| 7,302,837 B2 | 12/2007 | Wendte |
| 7,308,326 B2 | 12/2007 | Maertens et al. |
| 7,313,478 B1 | 12/2007 | Anderson et al. |
| 7,318,010 B2 | 1/2008 | Anderson |
| 7,347,168 B2 | 3/2008 | Reckels et al. |
| 7,408,145 B2 | 8/2008 | Holland |
| 7,480,564 B2 | 1/2009 | Metzler et al. |
| 7,483,791 B2 | 1/2009 | Anderegg et al. |
| 7,537,519 B2 | 5/2009 | Huster et al. |
| 7,557,066 B2 | 7/2009 | Hills et al. |
| 7,628,059 B1 | 12/2009 | Scherbring |
| 7,687,435 B2 | 3/2010 | Witschel et al. |
| 7,703,036 B2 | 4/2010 | Satterfield et al. |
| 7,725,233 B2 | 5/2010 | Hendrickson et al. |
| 7,733,416 B2 | 6/2010 | Gal |
| 7,756,624 B2 | 7/2010 | Diekhans et al. |
| 7,798,894 B2 | 9/2010 | Isfort |
| 7,827,042 B2 | 11/2010 | Jung et al. |
| 7,915,200 B2 | 3/2011 | Epp et al. |
| 7,945,364 B2 | 5/2011 | Schricker et al. |
| 7,993,188 B2 | 8/2011 | Ritter |
| 8,024,074 B2 | 9/2011 | Stelford et al. |
| 8,060,283 B2 | 11/2011 | Mott et al. |
| 8,107,681 B2 | 1/2012 | Gaal |
| 8,145,393 B2 | 3/2012 | Foster et al. |
| 8,147,176 B2 | 4/2012 | Coers et al. |
| 8,152,610 B2 | 4/2012 | Harrington |
| 8,190,335 B2 | 5/2012 | Vik et al. |
| 8,195,342 B2 | 6/2012 | Anderson |
| 8,195,358 B2 | 6/2012 | Anderson |
| 8,213,964 B2 | 7/2012 | Fitzner et al. |
| 8,224,500 B2 | 7/2012 | Anderson |
| 8,252,723 B2 | 8/2012 | Jakobi et al. |
| 8,254,351 B2 | 8/2012 | Fitzner et al. |
| 8,321,365 B2 | 11/2012 | Anderson |
| 8,329,717 B2 | 12/2012 | Minn et al. |
| 8,332,105 B2 | 12/2012 | Laux |
| 8,338,332 B1 | 12/2012 | Hacker et al. |
| 8,340,862 B2 | 12/2012 | Baumgarten et al. |
| 8,407,157 B2 | 3/2013 | Anderson |
| 8,428,829 B2 | 4/2013 | Brunnert et al. |
| 8,478,493 B2 | 7/2013 | Anderson |
| 8,494,727 B2 | 7/2013 | Green et al. |
| 8,527,157 B2 | 9/2013 | Imhof et al. |
| 8,544,397 B2 | 10/2013 | Bassett |
| 8,577,561 B2 | 11/2013 | Green et al. |
| 8,606,454 B2 | 12/2013 | Wang et al. |
| 8,626,406 B2 | 1/2014 | Schleicher et al. |
| 8,635,903 B2 | 1/2014 | Oetken et al. |
| 8,649,940 B2 | 2/2014 | Bonefas |
| 8,656,693 B2 | 2/2014 | Madsen et al. |
| 8,662,972 B2 | 3/2014 | Behnke et al. |
| 8,671,760 B2 | 3/2014 | Wallrath et al. |
| 8,677,724 B2 | 3/2014 | Chaney et al. |
| 8,738,238 B2 | 5/2014 | Rekow et al. |
| 8,738,244 B2 | 5/2014 | Lenz et al. |
| 8,755,976 B2 | 6/2014 | Peters et al. |

(56) References Cited

U.S. PATENT DOCUMENTS

| | | |
|---|---|---|
| 8,781,692 B2 | 7/2014 | Kormann |
| 8,789,563 B2 | 7/2014 | Wenzel |
| 8,814,640 B2 | 8/2014 | Behnke et al. |
| 8,843,269 B2 | 9/2014 | Anderson et al. |
| 8,868,304 B2 | 10/2014 | Bonefas |
| 8,909,389 B2 | 12/2014 | Meyer |
| D721,740 S | 1/2015 | Schmaltz et al. |
| 8,942,860 B2 | 1/2015 | Morselli |
| 8,962,523 B2 | 2/2015 | Rosinger et al. |
| 9,002,591 B2 | 4/2015 | Wang et al. |
| 9,008,918 B2 | 4/2015 | Missotten et al. |
| 9,009,087 B1 | 4/2015 | Mewes et al. |
| 9,011,222 B2 | 4/2015 | Johnson et al. |
| 9,014,901 B2 | 4/2015 | Wang et al. |
| 9,043,096 B2 | 5/2015 | Zielke et al. |
| 9,043,129 B2 | 5/2015 | Bonefas et al. |
| 9,066,465 B2 | 6/2015 | Hendrickson et al. |
| 9,072,227 B2 | 7/2015 | Wenzel |
| 9,095,090 B2 | 8/2015 | Casper et al. |
| 9,119,342 B2 | 9/2015 | Bonefas |
| 9,127,428 B2 | 9/2015 | Meier |
| 9,131,644 B2 | 9/2015 | Osborne |
| 9,152,938 B2 | 10/2015 | Lang et al. |
| 9,173,339 B2 | 11/2015 | Sauder et al. |
| 9,188,518 B2 | 11/2015 | Snyder et al. |
| 9,188,986 B2 | 11/2015 | Baumann |
| 9,226,449 B2 | 1/2016 | Bischoff |
| 9,234,317 B2 | 1/2016 | Chi |
| 9,235,214 B2 | 1/2016 | Anderson |
| 9,301,447 B2 | 4/2016 | Kormann |
| 9,301,466 B2 | 4/2016 | Kelly |
| 9,313,951 B2 | 4/2016 | Herman et al. |
| 9,326,443 B2 | 5/2016 | Zametzer et al. |
| 9,326,444 B2 | 5/2016 | Bonefas |
| 9,392,746 B2 | 7/2016 | Darr et al. |
| 9,405,039 B2 | 8/2016 | Anderson |
| 9,410,840 B2 | 8/2016 | Acheson et al. |
| 9,439,342 B2 | 9/2016 | Pasquier |
| 9,457,971 B2 | 10/2016 | Bonefas et al. |
| 9,463,939 B2 | 10/2016 | Bonefas et al. |
| 9,485,905 B2 | 11/2016 | Jung et al. |
| 9,489,576 B2 | 11/2016 | Johnson et al. |
| 9,497,898 B2 | 11/2016 | Dillon |
| 9,510,508 B2 | 12/2016 | Jung |
| 9,511,633 B2 | 12/2016 | Anderson et al. |
| 9,511,958 B2 | 12/2016 | Bonefas |
| 9,516,812 B2 | 12/2016 | Baumgarten et al. |
| 9,521,805 B2 | 12/2016 | Muench et al. |
| 9,522,791 B2 | 12/2016 | Bonefas et al. |
| 9,522,792 B2 | 12/2016 | Bonefas et al. |
| 9,523,180 B2 | 12/2016 | Deines |
| 9,529,364 B2 | 12/2016 | Foster et al. |
| 9,532,504 B2 | 1/2017 | Herman et al. |
| 9,538,714 B2 | 1/2017 | Anderson |
| 9,563,492 B2 | 2/2017 | Bell et al. |
| 9,563,848 B1 | 2/2017 | Hunt |
| 9,563,852 B1 | 2/2017 | Wiles et al. |
| 9,578,808 B2 | 2/2017 | Dybro et al. |
| 9,629,308 B2 | 4/2017 | Schøler et al. |
| 9,631,964 B2 | 4/2017 | Gelinske et al. |
| 9,642,305 B2 | 5/2017 | Nykamp et al. |
| 9,648,807 B2 | 5/2017 | Escher et al. |
| 9,675,008 B1 | 6/2017 | Rusciolelli et al. |
| 9,681,605 B2 | 6/2017 | Noonan et al. |
| 9,693,503 B2 | 7/2017 | Dybro et al. |
| 9,694,712 B2 | 7/2017 | Healy |
| 9,696,162 B2 | 7/2017 | Anderson |
| 9,699,967 B2 | 7/2017 | Palla et al. |
| 9,714,856 B2 | 7/2017 | Myers |
| 9,717,178 B1 | 8/2017 | Sauder et al. |
| 9,721,181 B2 | 8/2017 | Guan et al. |
| 9,723,790 B2 | 8/2017 | Berry et al. |
| 9,740,208 B2 | 8/2017 | Sugumaran et al. |
| 9,767,521 B2 | 9/2017 | Stuber et al. |
| 9,807,934 B2 | 11/2017 | Rusciolelli et al. |
| 9,807,940 B2 | 11/2017 | Roell et al. |
| 9,810,679 B2 | 11/2017 | Kimmel |
| 9,829,364 B2 | 11/2017 | Wilson et al. |
| 9,848,528 B2 | 12/2017 | Werner et al. |
| 9,856,609 B2 | 1/2018 | Dehmel |
| 9,861,040 B2 | 1/2018 | Bonefas |
| 9,872,433 B2 | 1/2018 | Acheson et al. |
| 9,903,979 B2 | 2/2018 | Dybro et al. |
| 9,904,963 B2 | 2/2018 | Rupp et al. |
| 9,915,952 B2 | 3/2018 | Dollinger et al. |
| 9,922,405 B2 | 3/2018 | Sauder et al. |
| 9,924,636 B2 | 3/2018 | Lisouski et al. |
| 9,928,584 B2 | 3/2018 | Jens et al. |
| 9,933,787 B2 | 4/2018 | Story |
| 9,974,226 B2 | 5/2018 | Rupp et al. |
| 9,982,397 B2 | 5/2018 | Korb et al. |
| 9,984,455 B1 | 5/2018 | Fox et al. |
| 9,992,931 B2 | 6/2018 | Bonefas et al. |
| 9,992,932 B2 | 6/2018 | Bonefas et al. |
| 10,004,176 B2 | 6/2018 | Mayerle |
| 10,015,928 B2 | 7/2018 | Nykamp et al. |
| 10,019,018 B2 | 7/2018 | Hulin |
| 10,019,790 B2 | 7/2018 | Bonefas et al. |
| 10,025,983 B2 | 7/2018 | Guan et al. |
| 10,028,435 B2 | 7/2018 | Anderson et al. |
| 10,028,451 B2 | 7/2018 | Rowan et al. |
| 10,034,427 B2 | 7/2018 | Krause et al. |
| 10,039,231 B2 | 8/2018 | Anderson et al. |
| 10,064,331 B2 | 9/2018 | Bradley |
| 10,064,335 B2 | 9/2018 | Byttebier et al. |
| 10,078,890 B1 | 9/2018 | Tagestad et al. |
| 10,085,372 B2 | 10/2018 | Noyer et al. |
| 10,091,925 B2 | 10/2018 | Aharoni et al. |
| 10,126,153 B2 | 11/2018 | Bischoff et al. |
| 10,129,528 B2 | 11/2018 | Bonefas et al. |
| 10,143,132 B2 | 12/2018 | Inoue et al. |
| 10,152,035 B2 | 12/2018 | Reid et al. |
| 10,154,624 B2 | 12/2018 | Guan et al. |
| 10,165,725 B2 | 1/2019 | Sugumaran et al. |
| 10,178,823 B2 | 1/2019 | Kovach et al. |
| 10,183,667 B2 | 1/2019 | Anderson et al. |
| 10,188,037 B2 | 1/2019 | Bruns et al. |
| 10,201,121 B1 | 2/2019 | Wilson |
| 10,209,179 B2 | 2/2019 | Hollstein |
| 10,231,371 B2 | 3/2019 | Dillon |
| 10,254,147 B2 | 4/2019 | Vermue et al. |
| 10,254,765 B2 | 4/2019 | Rekow et al. |
| 10,255,390 B2 * | 4/2019 | Mewes ............... G06N 20/00 |
| 10,255,670 B1 | 4/2019 | Wu et al. |
| 10,275,550 B2 | 4/2019 | Lee |
| 10,295,703 B2 | 5/2019 | Dybro et al. |
| 10,310,455 B2 | 6/2019 | Blank et al. |
| 10,314,232 B2 | 6/2019 | Isaac et al. |
| 10,315,655 B2 | 6/2019 | Blank et al. |
| 10,317,272 B2 | 6/2019 | Bhavsar et al. |
| 10,351,364 B2 | 7/2019 | Green et al. |
| 10,368,488 B2 | 8/2019 | Becker et al. |
| 10,398,084 B2 | 9/2019 | Ray et al. |
| 10,408,545 B2 | 9/2019 | Blank et al. |
| 10,412,889 B2 | 9/2019 | Palla et al. |
| 10,426,086 B2 | 10/2019 | Van de Wege et al. |
| 10,437,243 B2 | 10/2019 | Blank et al. |
| 10,477,756 B1 | 11/2019 | Richt et al. |
| 10,485,178 B2 | 11/2019 | Mayerle |
| 10,537,061 B2 | 1/2020 | Farley et al. |
| 10,568,316 B2 | 2/2020 | Gall et al. |
| 10,677,637 B1 | 6/2020 | Von Muenster |
| 10,681,872 B2 | 6/2020 | Viaene et al. |
| 10,703,277 B1 | 7/2020 | Schroeder |
| 10,729,067 B2 | 8/2020 | Hammer et al. |
| 10,740,703 B2 | 8/2020 | Story |
| 10,745,868 B2 | 8/2020 | Laugwitz et al. |
| 10,760,946 B2 | 9/2020 | Meier et al. |
| 10,809,118 B1 | 10/2020 | Von Muenster |
| 10,830,634 B2 | 11/2020 | Blank et al. |
| 10,866,109 B2 | 12/2020 | Madsen et al. |
| 10,890,922 B2 | 1/2021 | Ramm et al. |
| 10,909,368 B2 | 2/2021 | Guo et al. |
| 10,912,249 B1 | 2/2021 | Wilson |

(56) References Cited

U.S. PATENT DOCUMENTS

| | | |
|---|---|---|
| 11,610,157 B1 * | 3/2023 | Berg .................. A01G 22/20 |
| 11,946,747 B2 | 4/2024 | Vandike et al. |
| 2002/0011061 A1 | 1/2002 | Lucand et al. |
| 2002/0083695 A1 | 7/2002 | Behnke et al. |
| 2002/0091458 A1 | 7/2002 | Moore |
| 2002/0099471 A1 | 7/2002 | Benneweis |
| 2002/0133309 A1 | 9/2002 | Hardt |
| 2002/0173893 A1 | 11/2002 | Blackmore et al. |
| 2002/0193928 A1 | 12/2002 | Beck |
| 2002/0193929 A1 | 12/2002 | Beck |
| 2002/0198654 A1 | 12/2002 | Lange et al. |
| 2003/0004630 A1 | 1/2003 | Beck |
| 2003/0014171 A1 | 1/2003 | Ma et al. |
| 2003/0024450 A1 | 2/2003 | Juptner |
| 2003/0060245 A1 | 3/2003 | Coers et al. |
| 2003/0069680 A1 | 4/2003 | Cohen et al. |
| 2003/0075145 A1 | 4/2003 | Sheidler et al. |
| 2003/0174207 A1 | 9/2003 | Alexia et al. |
| 2003/0182144 A1 | 9/2003 | Pickett et al. |
| 2003/0187560 A1 | 10/2003 | Keller et al. |
| 2003/0216158 A1 | 11/2003 | Bischoff |
| 2003/0229432 A1 | 12/2003 | Ho et al. |
| 2003/0229433 A1 | 12/2003 | van den Berg et al. |
| 2003/0229435 A1 | 12/2003 | Van der Lely |
| 2004/0004544 A1 | 1/2004 | William Knutson |
| 2004/0054457 A1 | 3/2004 | Kormann |
| 2004/0073468 A1 | 4/2004 | Vyas et al. |
| 2004/0193348 A1 | 9/2004 | Gray et al. |
| 2005/0059445 A1 | 3/2005 | Niermann et al. |
| 2005/0066738 A1 | 3/2005 | Moore |
| 2005/0149235 A1 | 7/2005 | Seal et al. |
| 2005/0150202 A1 | 7/2005 | Quick |
| 2005/0197175 A1 | 9/2005 | Anderson |
| 2005/0241285 A1 | 11/2005 | Maertens et al. |
| 2005/0283314 A1 | 12/2005 | Hall |
| 2005/0284119 A1 | 12/2005 | Brunnert |
| 2006/0014489 A1 | 1/2006 | Fitzner et al. |
| 2006/0014643 A1 | 1/2006 | Hacker et al. |
| 2006/0047377 A1 | 3/2006 | Ferguson et al. |
| 2006/0058896 A1 | 3/2006 | Pokorny et al. |
| 2006/0074560 A1 | 4/2006 | Dyer et al. |
| 2006/0155449 A1 | 7/2006 | Dammann |
| 2006/0162631 A1 | 7/2006 | Hickey et al. |
| 2006/0196158 A1 | 9/2006 | Faivre et al. |
| 2006/0200334 A1 | 9/2006 | Faivre et al. |
| 2007/0005209 A1 | 1/2007 | Fitzner et al. |
| 2007/0021948 A1 | 1/2007 | Anderson |
| 2007/0056258 A1 | 3/2007 | Behnke |
| 2007/0068238 A1 | 3/2007 | Wendte |
| 2007/0073700 A1 | 3/2007 | Wippersteg et al. |
| 2007/0089390 A1 | 4/2007 | Hendrickson et al. |
| 2007/0135190 A1 | 6/2007 | Diekhans et al. |
| 2007/0185749 A1 | 8/2007 | Anderson et al. |
| 2007/0199903 A1 | 8/2007 | Denny |
| 2007/0208510 A1 | 9/2007 | Anderson et al. |
| 2007/0233348 A1 | 10/2007 | Diekhans et al. |
| 2007/0233374 A1 | 10/2007 | Diekhans et al. |
| 2007/0239337 A1 | 10/2007 | Anderson |
| 2007/0282523 A1 | 12/2007 | Diekhans et al. |
| 2007/0298744 A1 | 12/2007 | Fitzner et al. |
| 2008/0030320 A1 | 2/2008 | Wilcox et al. |
| 2008/0098035 A1 | 4/2008 | Wippersteg et al. |
| 2008/0140431 A1 | 6/2008 | Anderson et al. |
| 2008/0177449 A1 | 7/2008 | Pickett et al. |
| 2008/0248843 A1 | 10/2008 | Birrell et al. |
| 2008/0268927 A1 | 10/2008 | Farley et al. |
| 2008/0269052 A1 | 10/2008 | Rosinger et al. |
| 2008/0289308 A1 | 11/2008 | Brubaker |
| 2008/0312085 A1 | 12/2008 | Kordes et al. |
| 2009/0044505 A1 | 2/2009 | Huster et al. |
| 2009/0074243 A1 | 3/2009 | Missotten et al. |
| 2009/0143941 A1 | 6/2009 | Tarasinski et al. |
| 2009/0192654 A1 | 7/2009 | Wendte et al. |
| 2009/0216410 A1 | 8/2009 | Allen et al. |
| 2009/0226036 A1 | 9/2009 | Gaal |
| 2009/0259483 A1 | 10/2009 | Hendrickson et al. |
| 2009/0265098 A1 | 10/2009 | Dix |
| 2009/0306835 A1 | 12/2009 | Ellermann et al. |
| 2009/0311084 A1 | 12/2009 | Coers et al. |
| 2009/0312919 A1 | 12/2009 | Foster et al. |
| 2009/0312920 A1 | 12/2009 | Boenig et al. |
| 2009/0325658 A1 | 12/2009 | Phelan et al. |
| 2010/0036696 A1 | 2/2010 | Lang et al. |
| 2010/0042297 A1 | 2/2010 | Foster et al. |
| 2010/0063626 A1 | 3/2010 | Anderson |
| 2010/0063648 A1 | 3/2010 | Anderson |
| 2010/0063651 A1 | 3/2010 | Anderson |
| 2010/0063664 A1 | 3/2010 | Anderson |
| 2010/0063954 A1 | 3/2010 | Anderson |
| 2010/0070145 A1 | 3/2010 | Foster et al. |
| 2010/0071329 A1 | 3/2010 | Hindryckx et al. |
| 2010/0094481 A1 | 4/2010 | Anderson |
| 2010/0121541 A1 | 5/2010 | Behnke et al. |
| 2010/0137373 A1 | 6/2010 | Hungenberg et al. |
| 2010/0145572 A1 | 6/2010 | Steckel et al. |
| 2010/0152270 A1 | 6/2010 | Suty-Heinze et al. |
| 2010/0152943 A1 | 6/2010 | Matthews |
| 2010/0217474 A1 | 8/2010 | Baumgarten et al. |
| 2010/0268562 A1 | 10/2010 | Anderson |
| 2010/0268679 A1 | 10/2010 | Anderson |
| 2010/0285964 A1 | 11/2010 | Waldraff et al. |
| 2010/0306012 A1 * | 12/2010 | Zyskowski .......... G06Q 10/0637 |
| | | 705/7.36 |
| 2010/0317517 A1 | 12/2010 | Rosinger et al. |
| 2010/0319941 A1 | 12/2010 | Peterson |
| 2010/0332051 A1 | 12/2010 | Kormann |
| 2011/0056178 A1 | 3/2011 | Sauerwein et al. |
| 2011/0059782 A1 | 3/2011 | Harrington |
| 2011/0072773 A1 | 3/2011 | Schroeder et al. |
| 2011/0084851 A1 | 4/2011 | Peterson et al. |
| 2011/0086684 A1 | 4/2011 | Luellen et al. |
| 2011/0160961 A1 | 6/2011 | Wollenhaupt et al. |
| 2011/0213531 A1 | 9/2011 | Farley et al. |
| 2011/0224873 A1 | 9/2011 | Reeve et al. |
| 2011/0227745 A1 | 9/2011 | Kikuchi et al. |
| 2011/0257850 A1 | 10/2011 | Reeve et al. |
| 2011/0270494 A1 | 11/2011 | Imhof et al. |
| 2011/0270495 A1 | 11/2011 | Knapp |
| 2011/0295460 A1 | 12/2011 | Hunt et al. |
| 2011/0307149 A1 | 12/2011 | Pighi et al. |
| 2012/0004813 A1 | 1/2012 | Baumgarten et al. |
| 2012/0029732 A1 | 2/2012 | Meyer |
| 2012/0087771 A1 | 4/2012 | Wenzel |
| 2012/0096827 A1 | 4/2012 | Chaney et al. |
| 2012/0109614 A1 * | 5/2012 | Lindores .......... A01B 79/005 |
| | | 703/11 |
| 2012/0143642 A1 | 6/2012 | O'Neil |
| 2012/0215378 A1 | 8/2012 | Sprock et al. |
| 2012/0215379 A1 | 8/2012 | Sprock et al. |
| 2012/0253611 A1 | 10/2012 | Zielke et al. |
| 2012/0263560 A1 | 10/2012 | Diekhans et al. |
| 2012/0265412 A1 | 10/2012 | Diekhans et al. |
| 2012/0271489 A1 | 10/2012 | Roberts et al. |
| 2012/0323452 A1 | 12/2012 | Green et al. |
| 2013/0019580 A1 | 1/2013 | Anderson et al. |
| 2013/0022430 A1 | 1/2013 | Anderson et al. |
| 2013/0046419 A1 | 2/2013 | Anderson et al. |
| 2013/0046439 A1 | 2/2013 | Anderson et al. |
| 2013/0046525 A1 | 2/2013 | Ali et al. |
| 2013/0124239 A1 | 5/2013 | Rosa et al. |
| 2013/0184944 A1 | 7/2013 | Missotten et al. |
| 2013/0197767 A1 | 8/2013 | Lenz |
| 2013/0205733 A1 | 8/2013 | Peters et al. |
| 2013/0210505 A1 | 8/2013 | Bischoff |
| 2013/0231823 A1 | 9/2013 | Wang et al. |
| 2013/0319941 A1 | 12/2013 | Schneider |
| 2013/0325242 A1 | 12/2013 | Cavender-Bares et al. |
| 2013/0332003 A1 | 12/2013 | Murray et al. |
| 2014/0002489 A1 | 1/2014 | Sauder et al. |
| 2014/0019017 A1 | 1/2014 | Wilken et al. |
| 2014/0021598 A1 | 1/2014 | Sutardja |
| 2014/0050364 A1 | 2/2014 | Brueckner et al. |
| 2014/0067745 A1 | 3/2014 | Avey |
| 2014/0121882 A1 | 5/2014 | Gilmore et al. |

(56) References Cited

U.S. PATENT DOCUMENTS

| | | |
|---|---|---|
| 2014/0129048 A1 | 5/2014 | Baumgarten et al. |
| 2014/0172222 A1 | 6/2014 | Nickel |
| 2014/0172224 A1 | 6/2014 | Matthews et al. |
| 2014/0172225 A1 | 6/2014 | Matthews et al. |
| 2014/0208870 A1 | 7/2014 | Quaderer et al. |
| 2014/0215984 A1 | 8/2014 | Bischoff |
| 2014/0230391 A1 | 8/2014 | Hendrickson et al. |
| 2014/0230392 A1 | 8/2014 | Dybro et al. |
| 2014/0236381 A1 | 8/2014 | Anderson et al. |
| 2014/0236431 A1 | 8/2014 | Hendrickson et al. |
| 2014/0257911 A1 | 9/2014 | Anderson |
| 2014/0262547 A1 | 9/2014 | Acheson et al. |
| 2014/0277960 A1 | 9/2014 | Blank et al. |
| 2014/0297242 A1 | 10/2014 | Sauder et al. |
| 2014/0303814 A1 | 10/2014 | Burema et al. |
| 2014/0324272 A1 | 10/2014 | Madsen et al. |
| 2014/0331631 A1 | 11/2014 | Sauder et al. |
| 2014/0338298 A1 | 11/2014 | Jung et al. |
| 2014/0350802 A1 | 11/2014 | Biggerstaff et al. |
| 2014/0360148 A1 | 12/2014 | Wienker et al. |
| 2015/0049088 A1 | 2/2015 | Snyder et al. |
| 2015/0088785 A1 | 3/2015 | Chi |
| 2015/0095830 A1 | 4/2015 | Massoumi et al. |
| 2015/0101519 A1 | 4/2015 | Blackwell et al. |
| 2015/0105984 A1 | 4/2015 | Birrell et al. |
| 2015/0124054 A1 | 5/2015 | Darr et al. |
| 2015/0168187 A1 | 6/2015 | Myers |
| 2015/0211199 A1 | 7/2015 | Corcoran et al. |
| 2015/0230403 A1 | 8/2015 | Jung et al. |
| 2015/0242799 A1 | 8/2015 | Seki et al. |
| 2015/0243114 A1 | 8/2015 | Tanabe et al. |
| 2015/0254800 A1 | 9/2015 | Johnson et al. |
| 2015/0264863 A1 | 9/2015 | Muench et al. |
| 2015/0276794 A1 | 10/2015 | Pistrol et al. |
| 2015/0278640 A1 | 10/2015 | Johnson et al. |
| 2015/0285647 A1 | 10/2015 | Meyer zu Helligen et al. |
| 2015/0293029 A1 | 10/2015 | Acheson et al. |
| 2015/0302305 A1 | 10/2015 | Rupp et al. |
| 2015/0305238 A1 | 10/2015 | Klausmann et al. |
| 2015/0305239 A1 | 10/2015 | Jung |
| 2015/0327440 A1 | 11/2015 | Dybro et al. |
| 2015/0351320 A1 | 12/2015 | Takahara et al. |
| 2015/0370935 A1 | 12/2015 | Starr |
| 2015/0373902 A1 | 12/2015 | Pasquier |
| 2015/0379785 A1 | 12/2015 | Brown, Jr. et al. |
| 2016/0025531 A1 | 1/2016 | Bischoff et al. |
| 2016/0029558 A1 | 2/2016 | Dybro et al. |
| 2016/0052525 A1 | 2/2016 | Tuncer et al. |
| 2016/0057922 A1 | 3/2016 | Freiberg et al. |
| 2016/0066505 A1 | 3/2016 | Bakke et al. |
| 2016/0073573 A1 | 3/2016 | Ethington et al. |
| 2016/0078375 A1 | 3/2016 | Ethington et al. |
| 2016/0078570 A1 | 3/2016 | Ethington et al. |
| 2016/0084813 A1 | 3/2016 | Anderson et al. |
| 2016/0088794 A1 | 3/2016 | Baumgarten et al. |
| 2016/0106038 A1 | 4/2016 | Boyd et al. |
| 2016/0146611 A1 | 5/2016 | Matthews |
| 2016/0202227 A1 | 7/2016 | Mathur et al. |
| 2016/0203657 A1 | 7/2016 | Bell et al. |
| 2016/0212939 A1 | 7/2016 | Ouchida et al. |
| 2016/0215994 A1 | 7/2016 | Mewes et al. |
| 2016/0232621 A1 | 8/2016 | Ethington et al. |
| 2016/0247075 A1 | 8/2016 | Mewes et al. |
| 2016/0247082 A1 | 8/2016 | Stehling |
| 2016/0260021 A1 | 9/2016 | Marek |
| 2016/0286720 A1 | 10/2016 | Heitmann et al. |
| 2016/0286721 A1 | 10/2016 | Heitmann et al. |
| 2016/0286722 A1 | 10/2016 | Heitmann et al. |
| 2016/0309656 A1 | 10/2016 | Wilken et al. |
| 2016/0327535 A1 | 11/2016 | Cotton et al. |
| 2016/0330906 A1 | 11/2016 | Acheson et al. |
| 2016/0338267 A1 | 11/2016 | Anderson et al. |
| 2016/0342915 A1 | 11/2016 | Humphrey |
| 2016/0345485 A1 | 12/2016 | Acheson et al. |
| 2016/0360697 A1 | 12/2016 | Diaz |
| 2017/0013773 A1 | 1/2017 | Kirk et al. |
| 2017/0031365 A1 | 2/2017 | Sugumaran et al. |
| 2017/0034997 A1 | 2/2017 | Mayerle |
| 2017/0049045 A1 | 2/2017 | Wilken et al. |
| 2017/0055433 A1 | 3/2017 | Jamison |
| 2017/0082442 A1 | 3/2017 | Anderson |
| 2017/0083024 A1 | 3/2017 | Reijersen van buuren |
| 2017/0086381 A1 | 3/2017 | Roell et al. |
| 2017/0089741 A1 | 3/2017 | Takahashi et al. |
| 2017/0089742 A1 | 3/2017 | Bruns et al. |
| 2017/0090068 A1 | 3/2017 | Xiang et al. |
| 2017/0105331 A1 | 4/2017 | Herlitzius et al. |
| 2017/0105335 A1 | 4/2017 | Xu et al. |
| 2017/0112049 A1 | 4/2017 | Weisberg et al. |
| 2017/0112061 A1 | 4/2017 | Meyer |
| 2017/0115862 A1 | 4/2017 | Stratton et al. |
| 2017/0118915 A1 | 5/2017 | Middelberg et al. |
| 2017/0124463 A1 | 5/2017 | Chen et al. |
| 2017/0127606 A1 | 5/2017 | Horton |
| 2017/0160916 A1 | 6/2017 | Baumgarten et al. |
| 2017/0161627 A1 | 6/2017 | Xu et al. |
| 2017/0185086 A1 | 6/2017 | Sauder et al. |
| 2017/0188515 A1 | 7/2017 | Baumgarten et al. |
| 2017/0192431 A1 | 7/2017 | Foster et al. |
| 2017/0208742 A1 | 7/2017 | Ingibergsson et al. |
| 2017/0213141 A1 | 7/2017 | Xu et al. |
| 2017/0215330 A1 | 8/2017 | Missotten et al. |
| 2017/0223947 A1 | 8/2017 | Gall et al. |
| 2017/0227969 A1 | 8/2017 | Murray et al. |
| 2017/0235471 A1 | 8/2017 | Scholer et al. |
| 2017/0245434 A1 | 8/2017 | Jung et al. |
| 2017/0251600 A1 | 9/2017 | Anderson et al. |
| 2017/0270446 A1 | 9/2017 | Starr et al. |
| 2017/0270616 A1 | 9/2017 | Basso |
| 2017/0316692 A1 | 11/2017 | Rusciolelli et al. |
| 2017/0318743 A1 | 11/2017 | Sauder et al. |
| 2017/0322550 A1 | 11/2017 | Yokoyama |
| 2017/0332551 A1 | 11/2017 | Todd et al. |
| 2017/0336787 A1 | 11/2017 | Pichlmaier et al. |
| 2017/0370765 A1 | 12/2017 | Meier et al. |
| 2018/0000011 A1 | 1/2018 | Schleusner et al. |
| 2018/0014452 A1 | 1/2018 | Starr |
| 2018/0022559 A1 | 1/2018 | Knutson |
| 2018/0024549 A1 | 1/2018 | Hurd |
| 2018/0035622 A1 | 2/2018 | Gresch et al. |
| 2018/0054955 A1 | 3/2018 | Oliver |
| 2018/0060975 A1 | 3/2018 | Hassanzadeh |
| 2018/0070534 A1 | 3/2018 | Mayerle |
| 2018/0077865 A1 | 3/2018 | Gallmeier |
| 2018/0084709 A1 | 3/2018 | Wieckhorst et al. |
| 2018/0084722 A1 | 3/2018 | Wieckhorst et al. |
| 2018/0092301 A1 | 4/2018 | Vandike et al. |
| 2018/0092302 A1 | 4/2018 | Vandike et al. |
| 2018/0108123 A1 | 4/2018 | Baurer et al. |
| 2018/0120133 A1 | 5/2018 | Blank et al. |
| 2018/0121821 A1 | 5/2018 | Parsons et al. |
| 2018/0124992 A1 | 5/2018 | Koch et al. |
| 2018/0129879 A1 | 5/2018 | Achtelik et al. |
| 2018/0132422 A1 | 5/2018 | Hassanzadeh et al. |
| 2018/0136664 A1 | 5/2018 | Tomita et al. |
| 2018/0146612 A1 | 5/2018 | Sauder et al. |
| 2018/0146624 A1 | 5/2018 | Chen et al. |
| 2018/0153084 A1 | 6/2018 | Calleija et al. |
| 2018/0177125 A1 | 6/2018 | Takahara et al. |
| 2018/0181893 A1 | 6/2018 | Basso |
| 2018/0196438 A1 | 7/2018 | Newlin et al. |
| 2018/0196441 A1 | 7/2018 | Muench et al. |
| 2018/0211156 A1 | 7/2018 | Guan et al. |
| 2018/0232674 A1 | 8/2018 | Bilde |
| 2018/0242523 A1 | 8/2018 | Kirchbeck et al. |
| 2018/0249641 A1 | 9/2018 | Lewis et al. |
| 2018/0257657 A1 | 9/2018 | Blank et al. |
| 2018/0271015 A1 | 9/2018 | Redden et al. |
| 2018/0279599 A1 | 10/2018 | Struve |
| 2018/0295771 A1 | 10/2018 | Peters |
| 2018/0310474 A1 | 11/2018 | Posselius et al. |
| 2018/0317381 A1 | 11/2018 | Bassett |
| 2018/0317385 A1 | 11/2018 | Wellensiek et al. |
| 2018/0325012 A1 | 11/2018 | Ferrari et al. |

(56) References Cited

U.S. PATENT DOCUMENTS

| | | |
|---|---|---|
| 2018/0325014 A1 | 11/2018 | Debbaut |
| 2018/0338422 A1 | 11/2018 | Brubaker |
| 2018/0340845 A1 | 11/2018 | Rhodes et al. |
| 2018/0359917 A1 | 12/2018 | Blank et al. |
| 2018/0359919 A1 | 12/2018 | Blank et al. |
| 2018/0364726 A1 | 12/2018 | Foster et al. |
| 2019/0021226 A1 | 1/2019 | Dima et al. |
| 2019/0025175 A1 | 1/2019 | Laugwitz |
| 2019/0050948 A1 | 2/2019 | Perry et al. |
| 2019/0057460 A1 | 2/2019 | Sakaguchi et al. |
| 2019/0066234 A1 | 2/2019 | Bedoya et al. |
| 2019/0069470 A1 | 3/2019 | Pfeiffer et al. |
| 2019/0075727 A1 | 3/2019 | Duke et al. |
| 2019/0085785 A1 | 3/2019 | Abolt |
| 2019/0090423 A1 | 3/2019 | Escher et al. |
| 2019/0098825 A1 | 4/2019 | Neitemeier et al. |
| 2019/0104722 A1 | 4/2019 | Slaughter et al. |
| 2019/0108413 A1 | 4/2019 | Chen et al. |
| 2019/0114847 A1 | 4/2019 | Wagner et al. |
| 2019/0124819 A1 | 5/2019 | Madsen et al. |
| 2019/0129430 A1 | 5/2019 | Madsen et al. |
| 2019/0136491 A1 | 5/2019 | Martin et al. |
| 2019/0138962 A1 | 5/2019 | Ehlmann et al. |
| 2019/0147094 A1 | 5/2019 | Zhan et al. |
| 2019/0147249 A1 | 5/2019 | Kiepe et al. |
| 2019/0156255 A1 | 5/2019 | Carroll |
| 2019/0174667 A1 | 6/2019 | Gresch et al. |
| 2019/0183047 A1 | 6/2019 | Dybro et al. |
| 2019/0200522 A1 | 7/2019 | Hansen et al. |
| 2019/0230855 A1 | 8/2019 | Reed et al. |
| 2019/0239416 A1 | 8/2019 | Green et al. |
| 2019/0261550 A1 | 8/2019 | Damme et al. |
| 2019/0261559 A1 | 8/2019 | Heitmann et al. |
| 2019/0261560 A1 | 8/2019 | Jelenkovic |
| 2019/0313570 A1 | 10/2019 | Owechko |
| 2019/0327889 A1* | 10/2019 | Borgstadt ............. A01D 41/127 |
| 2019/0327892 A1 | 10/2019 | Fries et al. |
| 2019/0335662 A1 | 11/2019 | Good et al. |
| 2019/0335674 A1 | 11/2019 | Basso |
| 2019/0343035 A1 | 11/2019 | Smith et al. |
| 2019/0343043 A1 | 11/2019 | Bormann et al. |
| 2019/0343044 A1 | 11/2019 | Bormann et al. |
| 2019/0343048 A1 | 11/2019 | Farley et al. |
| 2019/0351765 A1 | 11/2019 | Rabusic |
| 2019/0354081 A1 | 11/2019 | Blank et al. |
| 2019/0364733 A1 | 12/2019 | Laugen et al. |
| 2019/0364734 A1 | 12/2019 | Kriebel et al. |
| 2020/0000006 A1 | 1/2020 | McDonald et al. |
| 2020/0008351 A1 | 1/2020 | Zielke et al. |
| 2020/0015416 A1 | 1/2020 | Barther et al. |
| 2020/0019159 A1 | 1/2020 | Kocer et al. |
| 2020/0024102 A1 | 1/2020 | Brill et al. |
| 2020/0029488 A1 | 1/2020 | Bertucci et al. |
| 2020/0034759 A1 | 1/2020 | Dumstorff et al. |
| 2020/0037491 A1 | 2/2020 | Schoeny et al. |
| 2020/0053961 A1 | 2/2020 | Dix et al. |
| 2020/0064144 A1 | 2/2020 | Tomita et al. |
| 2020/0064863 A1 | 2/2020 | Tomita et al. |
| 2020/0074023 A1 | 3/2020 | Nizami et al. |
| 2020/0084963 A1 | 3/2020 | Gururajan et al. |
| 2020/0084966 A1 | 3/2020 | Corban et al. |
| 2020/0090094 A1 | 3/2020 | Blank |
| 2020/0097851 A1 | 3/2020 | Alvarez et al. |
| 2020/0113142 A1 | 4/2020 | Coleman et al. |
| 2020/0125822 A1 | 4/2020 | Yang et al. |
| 2020/0128732 A1 | 4/2020 | Chaney |
| 2020/0128733 A1 | 4/2020 | Vandike et al. |
| 2020/0128734 A1 | 4/2020 | Brammeier et al. |
| 2020/0128735 A1 | 4/2020 | Bonefas et al. |
| 2020/0128737 A1 | 4/2020 | Anderson et al. |
| 2020/0128738 A1 | 4/2020 | Suleman et al. |
| 2020/0128740 A1 | 4/2020 | Suleman |
| 2020/0133262 A1 | 4/2020 | Suleman et al. |
| 2020/0141784 A1 | 5/2020 | Lange et al. |
| 2020/0146203 A1 | 5/2020 | Deng |
| 2020/0150631 A1 | 5/2020 | Frieberg et al. |
| 2020/0154639 A1 | 5/2020 | Takahara et al. |
| 2020/0163277 A1 | 5/2020 | Cooksey et al. |
| 2020/0183406 A1 | 6/2020 | Borgstadt |
| 2020/0187409 A1 | 6/2020 | Meyer Zu Helligen |
| 2020/0196526 A1 | 6/2020 | Koch et al. |
| 2020/0202596 A1 | 6/2020 | Kitahara et al. |
| 2020/0221632 A1 | 7/2020 | Strnad et al. |
| 2020/0221635 A1 | 7/2020 | Hendrickson et al. |
| 2020/0221636 A1 | 7/2020 | Boydens et al. |
| 2020/0265527 A1 | 8/2020 | Rose et al. |
| 2020/0317114 A1 | 10/2020 | Hoff |
| 2020/0319632 A1 | 10/2020 | DeSai et al. |
| 2020/0319655 A1 | 10/2020 | Desai et al. |
| 2020/0323133 A1 | 10/2020 | Anderson et al. |
| 2020/0323134 A1 | 10/2020 | Darr et al. |
| 2020/0326674 A1 | 10/2020 | Palla et al. |
| 2020/0326727 A1 | 10/2020 | Palla et al. |
| 2020/0333278 A1 | 10/2020 | Locken et al. |
| 2020/0337232 A1 | 10/2020 | Blank et al. |
| 2020/0352099 A1 | 11/2020 | Meier et al. |
| 2020/0359547 A1 | 11/2020 | Sakaguchi et al. |
| 2020/0359549 A1 | 11/2020 | Sakaguchi et al. |
| 2020/0363256 A1 | 11/2020 | Meier et al. |
| 2020/0375083 A1 | 12/2020 | Anderson et al. |
| 2020/0375084 A1 | 12/2020 | Sakaguchi et al. |
| 2020/0378088 A1 | 12/2020 | Anderson |
| 2020/0404842 A1 | 12/2020 | Dugas et al. |
| 2021/0015041 A1 | 1/2021 | Bormann et al. |
| 2021/0176916 A1 | 6/2021 | Sidon et al. |
| 2021/0176918 A1 | 6/2021 | Franzen et al. |
| 2021/0289692 A1* | 9/2021 | Zhang ............. A01C 21/007 |
| 2022/0113142 A1 | 4/2022 | Vandike et al. |

FOREIGN PATENT DOCUMENTS

| | | |
|---|---|---|
| BR | PI0502658 A | 2/2007 |
| BR | PI0802384 A2 | 3/2010 |
| BR | PI1100258 A2 | 3/2014 |
| BR | 102014007178 A2 | 8/2016 |
| CA | 1165300 A | 4/1984 |
| CA | 2283767 A1 | 3/2001 |
| CA | 2330979 A1 | 8/2001 |
| CA | 2629555 A1 | 11/2009 |
| CA | 135611 S | 5/2011 |
| CN | 2451633 Y | 10/2001 |
| CN | 101236188 A | 8/2008 |
| CN | 100416590 C | 9/2008 |
| CN | 101303338 A | 11/2008 |
| CN | 101363833 A | 2/2009 |
| CN | 201218789 Y | 4/2009 |
| CN | 101839906 A | 9/2010 |
| CN | 101929166 A | 12/2010 |
| CN | 102080373 A | 6/2011 |
| CN | 102138383 A | 8/2011 |
| CN | 102277867 B | 12/2011 |
| CN | 202110103 U | 1/2012 |
| CN | 202119772 U | 1/2012 |
| CN | 202340435 U | 7/2012 |
| CN | 103088807 A | 5/2013 |
| CN | 103181263 A | 7/2013 |
| CN | 203053961 U | 7/2013 |
| CN | 203055121 U | 7/2013 |
| CN | 203206739 U | 9/2013 |
| CN | 203275401 U | 11/2013 |
| CN | 203613525 U | 5/2014 |
| CN | 203658201 U | 6/2014 |
| CN | 103954738 A | 7/2014 |
| CN | 203741803 U | 7/2014 |
| CN | 204000818 U | 12/2014 |
| CN | 204435344 U | 7/2015 |
| CN | 204475304 U | 7/2015 |
| CN | 105205248 A | 12/2015 |
| CN | 204989174 U | 1/2016 |
| CN | 105432228 A | 3/2016 |
| CN | 105741180 A | 7/2016 |
| CN | 106053330 A | 10/2016 |
| CN | 106198877 A | 12/2016 |
| CN | 106198879 A | 12/2016 |

(56) References Cited

FOREIGN PATENT DOCUMENTS

| | | | |
|---|---|---|---|
| CN | 106226470 | A | 12/2016 |
| CN | 106248873 | A | 12/2016 |
| CN | 106290800 | A | 1/2017 |
| CN | 106327349 | A | 1/2017 |
| CN | 106644663 | A | 5/2017 |
| CN | 206330815 | U | 7/2017 |
| CN | 206515118 | U | 9/2017 |
| CN | 206515119 | U | 9/2017 |
| CN | 206616118 | U | 11/2017 |
| CN | 206696107 | | 12/2017 |
| CN | 206696107 | U | 12/2017 |
| CN | 107576674 | | 1/2018 |
| CN | 107576674 | A | 1/2018 |
| CN | 206906093 | U | 1/2018 |
| CN | 206941558 | | 1/2018 |
| CN | 206941558 | U | 1/2018 |
| CN | 107736088 | A | 2/2018 |
| CN | 107795095 | A | 3/2018 |
| CN | 207079558 | | 3/2018 |
| CN | 107941286 | A | 4/2018 |
| CN | 107957408 | A | 4/2018 |
| CN | 108009542 | A | 5/2018 |
| CN | 108304796 | A | 7/2018 |
| CN | 207567744 | U | 7/2018 |
| CN | 108614089 | A | 10/2018 |
| CN | 208013131 | U | 10/2018 |
| CN | 108881825 | A | 11/2018 |
| CN | 208047351 | U | 11/2018 |
| CN | 109357804 | A | 2/2019 |
| CN | 109485353 | A | 3/2019 |
| CN | 109633127 | A | 4/2019 |
| CN | 109763476 | A | 5/2019 |
| CN | 109961024 | A | 7/2019 |
| CN | 110262287 | A | 9/2019 |
| CN | 110720302 | A | 1/2020 |
| CN | 111201879 | A | 5/2020 |
| CN | 210585958 | U | 5/2020 |
| CN | 111406505 | A | 7/2020 |
| CS | 247426 | B1 | 12/1986 |
| CS | 248318 | B1 | 2/1987 |
| CZ | 17266 | U1 | 2/2007 |
| CZ | 20252 | U1 | 11/2009 |
| DE | 2354828 | A1 | 5/1975 |
| DE | 152380 | A1 | 11/1981 |
| DE | 3728669 | A1 | 3/1989 |
| DE | 4431824 | C1 | 5/1996 |
| DE | 19509496 | A1 | 9/1996 |
| DE | 19528663 | A1 | 2/1997 |
| DE | 19718455 | A1 | 11/1997 |
| DE | 19705842 | A1 | 8/1998 |
| DE | 19828355 | A1 | 1/2000 |
| DE | 10050224 | A1 | 4/2002 |
| DE | 10120173 | A1 | 10/2002 |
| DE | 202004015141 | U1 | 12/2004 |
| DE | 102005000770 | B3 | 7/2006 |
| DE | 102005000771 | A1 | 8/2006 |
| DE | 102008021785 | A1 | 11/2009 |
| DE | 102009041646 | A1 | 3/2011 |
| DE | 102010004648 | A1 | 7/2011 |
| DE | 102010038661 | A1 | 2/2012 |
| DE | 102011005400 | A1 | 9/2012 |
| DE | 202012103730 | U1 | 10/2012 |
| DE | 102011052688 | A1 | 2/2013 |
| DE | 102012211001 | A1 | 1/2014 |
| DE | 102012220109 | | 5/2014 |
| DE | 102012223768 | | 6/2014 |
| DE | 102013212151 | A1 | 12/2014 |
| DE | 102013019098 | B3 | 1/2015 |
| DE | 102014108449 | A1 | 2/2015 |
| DE | 2014201203 | A1 | 7/2015 |
| DE | 102014208068 | A1 | 10/2015 |
| DE | 102015006398 | B3 | 5/2016 |
| DE | 102015109799 | A1 | 12/2016 |
| DE | 112015002194 | T5 | 1/2017 |
| DE | 102017204511 | A1 | 9/2018 |
| DE | 102019114872 | A1 | 12/2020 |
| EP | 0070219 | B1 | 10/1984 |
| EP | 0355049 | A2 | 2/1990 |
| EP | 845198 | B2 | 6/1998 |
| EP | 0532146 | B1 | 8/1998 |
| EP | 1444879 | A1 | 8/2004 |
| EP | 1219159 | B1 | 6/2005 |
| EP | 1219153 | B1 | 2/2006 |
| EP | 1692928 | A2 | 8/2006 |
| EP | 1574122 | B1 | 2/2008 |
| EP | 1943877 | A2 | 7/2008 |
| EP | 1598586 | B1 | 9/2009 |
| EP | 1731983 | B1 | 9/2009 |
| EP | 2146307 | A2 | 1/2010 |
| EP | 2186389 | A1 | 5/2010 |
| EP | 2267566 | A2 | 12/2010 |
| EP | 3491192 | A2 | 12/2010 |
| EP | 2057884 | B1 | 1/2011 |
| EP | 2146307 | B1 | 5/2012 |
| EP | 2446732 | A1 | 5/2012 |
| EP | 2524586 | A2 | 11/2012 |
| EP | 2529610 | A1 | 12/2012 |
| EP | 2243353 | B1 | 3/2013 |
| EP | 2174537 | B1 | 5/2013 |
| EP | 2592919 | A1 | 5/2013 |
| EP | 1674324 | B2 | 5/2014 |
| EP | 2759829 | A1 | 7/2014 |
| EP | 2764764 | B1 | 8/2014 |
| EP | 2267566 | A3 | 12/2014 |
| EP | 2191439 | B1 | 3/2015 |
| EP | 2586286 | B1 | 3/2015 |
| EP | 2592919 | B1 | 9/2015 |
| EP | 2921042 | A1 | 9/2015 |
| EP | 2944725 | A1 | 11/2015 |
| EP | 2510777 | B1 | 3/2016 |
| EP | 3000302 | A1 | 3/2016 |
| EP | 2868806 | B1 | 7/2016 |
| EP | 3085221 | A1 | 10/2016 |
| EP | 3095310 | A1 | 11/2016 |
| EP | 3097759 | A1 | 11/2016 |
| EP | 2452551 | B1 | 5/2017 |
| EP | 3175691 | A1 | 6/2017 |
| EP | 3195719 | A1 | 7/2017 |
| EP | 3195720 | A1 | 7/2017 |
| EP | 3259976 | A1 | 12/2017 |
| EP | 3262934 | A1 | 1/2018 |
| EP | 3287007 | A1 | 2/2018 |
| EP | 3298876 | A1 | 3/2018 |
| EP | 3300579 | A1 | 4/2018 |
| EP | 3315005 | A1 | 5/2018 |
| EP | 3316208 | A1 | 5/2018 |
| EP | 2829171 | B1 | 6/2018 |
| EP | 2508057 | | 7/2018 |
| EP | 2508057 | B1 | 7/2018 |
| EP | 3378298 | A1 | 9/2018 |
| EP | 3378299 | A1 | 9/2018 |
| EP | 2997805 | A1 | 10/2018 |
| EP | 3384754 | A1 | 10/2018 |
| EP | 3289853 | B1 | 3/2019 |
| EP | 3456167 | A1 | 3/2019 |
| EP | 3466239 | A1 | 4/2019 |
| EP | 3469878 | A1 | 4/2019 |
| EP | 3289852 | B1 | 6/2019 |
| EP | 3491192 | A1 | 6/2019 |
| EP | 3494770 | A1 | 6/2019 |
| EP | 3498074 | A1 | 6/2019 |
| EP | 3000302 | B1 | 8/2019 |
| EP | 3533314 | A1 | 9/2019 |
| EP | 3569049 | A1 | 11/2019 |
| EP | 3000307 | B1 | 12/2019 |
| EP | 3586592 | A2 | 1/2020 |
| EP | 3593613 | A1 | 1/2020 |
| EP | 3593620 | A1 | 1/2020 |
| EP | 3613272 | A1 | 2/2020 |
| EP | 3243374 | B1 | 3/2020 |
| EP | 3626038 | A1 | 3/2020 |
| EP | 3259976 | B1 | 4/2020 |
| EP | 3635647 | A1 | 4/2020 |
| EP | 3378298 | B1 | 5/2020 |

(56) References Cited

FOREIGN PATENT DOCUMENTS

| | | |
|---|---|---|
| EP | 3646699 A1 | 5/2020 |
| EP | 3662741 A1 | 6/2020 |
| EP | 3685648 A1 | 7/2020 |
| EP | 2995191 B2 | 10/2020 |
| ES | 2116215 A1 | 7/1998 |
| ES | 2311322 A1 | 2/2009 |
| FI | 5533 A | 11/1913 |
| FR | 1451480 A | 1/1966 |
| FR | 2817344 A1 | 5/2002 |
| FR | 2901291 A | 11/2007 |
| FR | 2901291 A1 | 11/2007 |
| GB | 901081 A | 7/1962 |
| GB | 201519517 A1 | 5/2017 |
| IN | 01632 | 8/2016 |
| IN | 1632DE2014 A | 8/2016 |
| IN | 201641027017 A | 10/2016 |
| IN | 202041039250 A | 9/2020 |
| JP | S60253617 A | 12/1985 |
| JP | S63308110 A | 12/1988 |
| JP | H02196960 A | 8/1990 |
| JP | H02215311 A | 8/1990 |
| JP | H0779681 A | 3/1995 |
| JP | H1066436 A | 3/1998 |
| JP | H10191762 A | 7/1998 |
| JP | 2000352044 A | 12/2000 |
| JP | 2001057809 A | 3/2001 |
| JP | 2002186348 A | 7/2002 |
| JP | 2005227233 A | 8/2005 |
| JP | 2006166871 A | 6/2006 |
| JP | 2011205967 A | 10/2011 |
| JP | 2015070812 A | 4/2015 |
| JP | 2015151826 A | 8/2015 |
| JP | 2015219651 A | 12/2015 |
| JP | 2016071726 A | 5/2016 |
| JP | 2016160808 A | 9/2016 |
| JP | 6087258 B2 | 3/2017 |
| JP | 2017136035 A | 8/2017 |
| JP | 2017137729 A | 8/2017 |
| JP | 2017195804 A | 11/2017 |
| JP | 2018068284 A | 5/2018 |
| JP | 2018102154 A | 7/2018 |
| JP | 2018151388 A | 9/2018 |
| JP | 2019004796 A | 1/2019 |
| JP | 2019129744 A | 8/2019 |
| JP | 2019146506 A | 9/2019 |
| JP | 2019216744 A | 12/2019 |
| JP | 2020018255 A | 2/2020 |
| JP | 2020031607 A | 3/2020 |
| JP | 2020113062 A | 7/2020 |
| JP | 2020127405 A | 8/2020 |
| KR | 100974892 | 8/2010 |
| KR | 100974892 B1 | 8/2010 |
| KR | 20110018582 A | 2/2011 |
| KR | 101067576 B | 9/2011 |
| KR | 101067576 B1 | 9/2011 |
| KR | 101134075 B1 | 4/2012 |
| KR | 101447197 B1 | 10/2014 |
| KR | 101653750 | 9/2016 |
| KR | 20170041377 A | 4/2017 |
| KR | 200485051 Y | 11/2017 |
| KR | 200485051 Y1 | 11/2017 |
| KR | 101873657 B | 8/2018 |
| MX | GT06000012 A | 1/2008 |
| PL | 178299 B1 | 4/2000 |
| RO | 130713 | 11/2015 |
| RU | 1791767 C | 1/1993 |
| RU | 2005102554 A | 7/2006 |
| RU | 2421744 C | 6/2011 |
| RU | 2421744 C1 | 6/2011 |
| RU | 2502047 C | 12/2013 |
| RU | 2502047 C1 | 12/2013 |
| RU | 164128 | 8/2016 |
| RU | 2017114139 A | 10/2018 |
| RU | 2017114139 A3 | 5/2019 |
| SU | 834514 A1 | 5/1981 |
| SU | 887717 A1 | 12/1981 |
| SU | 1052940 A1 | 11/1983 |
| SU | 1134669 A1 | 1/1985 |
| SU | 1526588 A1 | 12/1989 |
| SU | 1761864 A1 | 9/1992 |
| WO | 1986005353 A1 | 9/1986 |
| WO | 2001052160 A1 | 7/2001 |
| WO | 2002015673 A1 | 2/2002 |
| WO | 2003005803 A1 | 1/2003 |
| WO | 2007050192 A2 | 5/2007 |
| WO | 2009156542 A1 | 12/2009 |
| WO | 2010003421 A1 | 1/2010 |
| WO | 2011104085 A1 | 9/2011 |
| WO | 2012041621 A1 | 4/2012 |
| WO | 2012110508 A1 | 8/2012 |
| WO | 2012110544 A1 | 8/2012 |
| WO | 2013063106 A2 | 5/2013 |
| WO | 2013079247 A1 | 6/2013 |
| WO | 2013086351 A1 | 6/2013 |
| WO | 2013087275 A1 | 6/2013 |
| WO | 2014046685 A1 | 3/2014 |
| WO | 2014093814 A1 | 6/2014 |
| WO | 2014195302 A1 | 12/2014 |
| WO | 2015038751 A1 | 3/2015 |
| WO | 2015153809 A1 | 10/2015 |
| WO | 16020595 A1 | 2/2016 |
| WO | 2016020595 A1 | 2/2016 |
| WO | 2016118686 A1 | 7/2016 |
| WO | 2017008161 A1 | 1/2017 |
| WO | 2017060168 A1 | 4/2017 |
| WO | 2017077113 A1 | 5/2017 |
| WO | 2017096489 A1 | 6/2017 |
| WO | 2017099570 A1 | 6/2017 |
| WO | 2017116913 A1 | 7/2017 |
| WO | 2017170507 A1 | 10/2017 |
| WO | 2017205406 A1 | 11/2017 |
| WO | 2017205410 A1 | 11/2017 |
| WO | 2018043336 A1 | 3/2018 |
| WO | 2018073060 A1 | 4/2018 |
| WO | 2018081759 A1 | 5/2018 |
| WO | 2018116772 A1 | 6/2018 |
| WO | 2018142768 A1 | 8/2018 |
| WO | 2018200870 A1 | 11/2018 |
| WO | 2018206587 A1 | 11/2018 |
| WO | 2018220159 A1 | 12/2018 |
| WO | 2018226139 A1 | 12/2018 |
| WO | 2018235486 A1 | 12/2018 |
| WO | 2018235942 A1 | 12/2018 |
| WO | WO18235486 A1 | 12/2018 |
| WO | 2019034213 A1 | 2/2019 |
| WO | 2019079205 A1 | 4/2019 |
| WO | 2019081349 A1 | 5/2019 |
| WO | 2019091535 A1 | 5/2019 |
| WO | 2019109191 A1 | 6/2019 |
| WO | 2019124225 A1 | 6/2019 |
| WO | 2019129333 A1 | 7/2019 |
| WO | 2019129334 A1 | 7/2019 |
| WO | 2019129335 A1 | 7/2019 |
| WO | 2019215185 A1 | 11/2019 |
| WO | 2019230358 A1 | 12/2019 |
| WO | 2020023392 A1 | 1/2020 |
| WO | 2020026578 A1 | 2/2020 |
| WO | 2020026650 A1 | 2/2020 |
| WO | 2020026651 A1 | 2/2020 |
| WO | 2020031473 A1 | 2/2020 |
| WO | 2020038810 A1 | 2/2020 |
| WO | 2020039312 A1 | 2/2020 |
| WO | 2020039671 A1 | 2/2020 |
| WO | 2020044726 A1 | 3/2020 |
| WO | 2020082182 A1 | 4/2020 |
| WO | 2020100810 A1 | 5/2020 |
| WO | 2020110920 A1 | 6/2020 |
| WO | 2020195007 A1 | 10/2020 |
| WO | 2020206941 A1 | 10/2020 |
| WO | 2020206942 A1 | 10/2020 |

(56) References Cited

FOREIGN PATENT DOCUMENTS

| WO | 2020210607 A1 | 10/2020 |
|---|---|---|
| WO | 2020221981 A1 | 11/2020 |

OTHER PUBLICATIONS

Robson, "Remote Sensing Applications for the Determination of Yield, Maturity and Aflatoxin Contamination in Peanut", Oct. 2007, 275 pages.
Bhattarai et al., "Remote Sensing Data to Detect Hessian Fly Infestation in Commercial Wheat Fields", Apr. 16, 2019, 8 pages.
Towery, et al., "Remote Sensing of Crop Hail Damage", Jul. 21, 1975, 31 pages.
Sa et al., "WeedMap: A Large-Scale Semantic Weed Mapping Framework Using Aerial Multispectral Imaging and Deep Neural Network for Precision Farming", Sep. 7, 2018, 25 pages.
Mathyam et al., "Remote Sensing of Biotic Stress in Crop Plants and Its Applications for Pest Management", Dec. 2011, 30 pages.
Martinez-Feria et al., "Evaluating Maize and Soybean Grain Dry-Down In The Field With Predictive Algorithms and Genotype-by-Environmental Analysis", May 9, 2019, 13 pages.
"GIS Maps for Agriculture", Precision Agricultural Mapping, Retrieved Dec. 11, 2020, 6 pages.
Paul, "Scabby Wheat Grain? Increasing Your Fan Speed May Help", https://agcrops.osu.edu/newsletter/corn-newsletter/2015-20/scabby-wheat-grain-increasing-yourfan-speed-may-help, C.O.R.N Newsletter//2015-20, 3 pages.
Clay et al., "Scouting for Weeds", SSMG-15, 4 pages, 2002.
Taylor et al., "Sensor-Based Variable Rate Application for Cotton", 8 pages, 2010.
Christiansen et al., "Designing and Testing a UAV Mapping System for Agricultural Field Surveying", Nov. 23, 2017, 19 pages.
Haung et al., "AccurateWeed Mapping and Prescription Map Generation Based on Fully Convolutional Networks Using UAV Imagery", Oct. 1, 2018, 12 pages.
Ma et al., Identification of Fusarium Head Blight in Winter Wheat Ears Using Continuous Wavelet Analysis, Dec. 19, 2019, 15 pages.
Morrison, "Should You Use Tillage to Control Resistant Weeds", Aug. 29, 2014, 9 pages.
Morrison, "Snow Trapping Snars Water", Oct. 13, 2005, 3 pages.
"Soil Zone Index", https://www.satimagingcorp.com/applications/natural-resources/agricultu . . . , Retrieved Dec. 11, 2020, 5 pages.
Malvic, "Soybean Cyst Nematode", University of Minnesota Extension, Oct. 19, 2020, 3 pages.
Unglesbee, "Soybean Pod Shatter—Bad Enough to Scout Before Harvest?—DTN", Oct. 17, 2018, 4 pages.
Tao, "Standing Crop Residue Can Reduce Snow Drifting and Increase Soil Moisture", 2 pages, last accessed Jul. 14, 2020.
Berglund, et al., "Swathing and Harvesting Canola", Jul. 2019, 8 pages.
Bell et al., "Synthetic Aperture Radar and Optical Remote Sensing of Crop Damage Attributed to Severe Weather in the Central United States", Jul. 25, 2018, 1 page.
Rosencrance, "Tabletop Grapes in India to Be Picked by Virginia Tech Robots", Jul. 23, 2020, 8 pages.
Lofton, et al., The Potential of Grazing Grain Sorghum Residue Following Harvest, May 13, 2020, 11 pages.
Beal et al., "Time Shift Evaluation to Improve Yield Map Quality", Published in Applied Engineering in Agriculture vol. 17(3): 385-390 (© 2001 American Society of Agricultural Engineers ), 9 pages.
"Tips and Tricks of Harvesting High Moisture Grain", https://www.koenigequipment.com/blog/tips-and-tricks-of-harvesting-highmoisture-grain, 7 pages, last accessed Jul. 14, 2020.
Ransom, "Tips for Planting Winter Wheat and Winter Rye (for Grain) (Aug. 15, 2019)", 2017, 3 pages.
AgroWatch Tree Grading Maps, "The Grading Maps and Plant Count Reports", https://www.satimagingcorp.com/ applications/natural-resources/agricultu . . . , Retrieved Dec. 11, 2020, 4 pages.
Ackley, "Troubleshooting Abnormal Corn Ears", Jul. 23, 2020, 25 pages.
Smith, "Understanding Ear Flex", Feb. 25, 2019, 17 pages.
Carroll et al., "Use of Spectral Vegetation Indicies Derived from Airborne Hyperspectral Imagery For Detection of European Corn Borer Infestation in Iowa Corn Plots", Nov. 2008, 11 pages.
Agriculture, "Using drones in agriculture and capturing actionable data", Retrieved Dec. 11, 2020, 18 pages.
Bentley et al., "Using Landsat to Identify Thunderstorm Damage in Agricultural Regions", Aug. 28, 2001, 14 pages.
Duane Grant and the Idaho Wheat Commission, "Using Remote Sensing to Manage Wheat Grain Protein", Jan. 2, 2003, 13 pages.
Zhang et al., "Using satellite multispectral imagery for damage mapping of armyworm (*Spodoptera frugiperda*) in maize at a regional scale", Apr. 10, 2015, 14 pages.
Booker, "Video: Canadian cage mill teams up with JD", Dec. 19, 2019, 6 pages.
AgTalk Home, "Best Combine to Handle Weeds", Posted Nov. 23, 2018, 9 pages.
"Volunteer corn can be costly for soybeans", Jun. 2, 2016, 1 page.
Pflanz, et al., "Weed Mapping with UAS Imagery and a Bag of Visual Words Based Image Classifier", Published Sep. 24, 2018, 17 pages.
Hartzler, "Weed seed predation in agricultural fields", 9 pages, 2009.
Sa et al., "Weedmap: A Large-Scale Sematnic Weed Mapping Framework Using Aerial Multispectral Imaging and Deep Neural Netowrk for Precision Farming", Sep. 6, 2018, 25 pages.
Nagelkirk, Michigan State University-Extension, "Wheat Harvest: Minimizing the Risk of Fusarium Head Scab Losses", Jul. 11, 2013, 4 pages.
Saskatchewan, "Wheat: Winter Wheat", (https://www.saskatchewan.ca/business/agriculture-natural-resources-and-industry/agribusiness-farmers-and-ranchers/crops-and-irrigation/field-crops/cereals-barley-wheat-oats-triticale/wheat-winter-wheat) 5 pages, last accessed Jul. 14, 2020.
Quora, "Why would I ever use sport mode in my automatic transmission car? Will this incrase fuel efficiency or isit simply a feature that makes form more fun when driving?", Aug. 10, 2020, 5 pages.
Wade, "Using a Drone's Surface Model to Estimate Crop Yields & Assess Plant Health", Oct. 19, 2015, 14 pages.
Mathyam et al., "Remote Sensing of Biotic Stress in Crop Plants and Its Applications for Pest Stress", Dec. 2011, 30 pages.
"Four Helpful Weed-Management Tips for Harvest Time", 2 pages, Sep. 4, 2019.
Franz et al., "The role of topography, soil, and remotely sensed vegetation condition towards predicting crop yield", University of Nebraska—Lincoln, Mar. 23, 2020, 44 pages.
Peiffer et al., The Genetic Architecture of Maize Stalk Strength:, Jun. 20, 2013, 14 pages.
Leu et al., Grazing Corn Residue Using Resources and Reducing Costs, Aug. 2009, 4 pages.
"No-Till Soils", Soil Heath Brochure, 2 pages, last accessed Jul. 14, 2020.
Strickland et al., "Nitrate Toxicity in Livestock" Oklahoma State University, Feb. 2017, 2 pages.
Strickland et al., "Nitrate Toxicity in Livestock" Oklahoma State University, 8 pages, Feb. 2017.
Brownlee, "Neural Networks are Function Approximation Algorithms", Mar. 18, 2020, 13 pages.
Thompson, "Morning glory can make it impossible to harvest corn", Feb. 19, 2015, 3 pages.
Tumlison, "Monitoring Growth Development and Yield Estimation of Maize Using Very High-Resolution Uavimages in Gronau, Germany", Feb. 2017, 63 pages.
Hunt, "Mapping Weed Infestations Using Remote Sensing", 8 pages, Jul. 19, 2005.
Wright, et al., "Managing Grain Protein in Wheat Using Remote Sensing", 12 pages, 2003.
"Malting Barley in Pennsylvania", Agronomy Facts 77, 6 pages, Code EE0179 06/16.

(56) References Cited

OTHER PUBLICATIONS

"Green stem syndrome in soybeans", Agronomy eUpdate Issue 478 Oct. 10, 2014, 3 pages.
"Keep Weed Seed Out of Your Harvest", Aug. 8, 2019, 1 pages.
Hodrius et al., "The Impact of Multi-Sensor Data Assimilation on Plant Parameter Retrieval and Yield Estimation for Sugar Beet", The International Archives of the Photogrammetry, Remote Sensing and Spatial Information Sciences, vol. XL-7/W3, 2015, 36th International Symposium on Remote Sensing of Environment, May 11-15, 2015, Berlin, Germany, 7 pages.
Fernandez-Quintanilla et al., "Is the current state of the art of weed monitoring suitable for site-specific weed management in arable crops?", Feb. 2018, 35 pages.
Anonymously, "Improved System and Method for Controlling Agricultural Vehicle Operation Using Historical Data", Dec. 16, 2009, 8 pages.
Anonymously, "System and Method for Controlling Agricultural Vehicle Operation Using Historical Data", Jun. 30, 2009, 8 pages.
"Leafsnap, a new mobile app that identifies plants by leaf shape, is launched by Smithsonian and collaborators", May 2, 2011, 5 pages.
Insect Gallery, Department of Entomology, Kansas State University, Oct. 19, 2020, 8 pages.
Licht, "Influence of Corn Seeding Rate, Soil Attributes, and Topographic Characteristics on Grain Yield, Yield Components, and Grain Composition", 2015, 107 pages.
"Notice of Retraction Virtual simulation of plant with individual stem based on crop growth model", May 3, 2017, 7 pages.
Leland, "Who Did that? Identifying Insect Damage", Apr. 1, 2015, 4 pages.
"How to improve maize protein content" https://www.yara.co.uk/crop-nutrition/forage-maize/improving-maize-protein-content, Sep. 30, 2020, 10 pages.
Hafemeister, "Weed control at harvest, combines are ideal vehicles for spreading weed seeds", Sep. 25, 2019, 3 pages.
"Harvesting Tips", Northern Pulse Growers Association, 9 pages, Jan. 31, 2001.
Wortmann et al., "Harvesting Crop Residues", Aug. 10, 2020, 8 pages.
"Harvesting", Oklahoma State University, Canola Swathing Guide, 2010, 9 pages, last accessed Jul. 14, 2020.
Hanna, "Harvest Tips for Lodged Corn", Sep. 6, 2011, 3 pages.
"Green Weeds Complicate Harvest", Crops, Slider, Sep. 26, 2012, 2 pages.
"Agrowatch Green Vegetation Index", Retrieved Dec. 11, 2020, 4 pages.
"Grazing Corn Residues" (http://www.ca.uky.edu), 3 pages, Aug. 24, 2009.
Jarnevich et al., Forecasting Weed Distributions Using Climate Data: A GIS Early Warning Tool, Downloaded on Jul. 13, 2020, 12 pages.
Combine Cutting and Feeding Mechanisms in the Southeast, By J-K Park, Agricultural Research Service, U.S. Dept. of Agriculture, 1963, 1 page.
Hartzler, "Fate of weed seeds in the soil", 4 pages, Jan. 31, 2001.
Digman, "Combine Considerations for a Wet Corn Harvest", Extension SpecialistUW—Madison, 3 pages, Oct. 29, 2009.
S-Series Combine and Front End Equipment Optimization, John Deere Harvester Works, 20 pages Date: Oct. 9, 2017.
Determining yield monitoring system delay time with geostatistical and data segmentation approaches (https://www.ars.usda.gov/ARSUserFiles/50701000/cswq-0036-128359.pdf) Jul. 2002, 13 pages.
Precision Agriculture: Yield Monitors (dated Nov. 1998—metadata; last accessed Jul. 16, 2020) (https://extensiondata.missouri.edu/pub/pdf/envqual/wq0451.pdf) 4 pages.
Paul et al., "Effect of soil water status and strength on trafficability" (1979) (https://www.nrcresearchpress.com/doi/pdfplus/10.4141/cjss79-035), 12 pages, Apr. 23, 1979.
Sick, "Better understanding corn hybrid characteristics and properties can impact your seed decisions" (https://emergence.fbn.com/agronomy/corn-hybrid-characteristics-and-properties-impact-seed-decisions) By Steve Sick, FBN Breeding Project Lead | Sep. 21, 2018, 8 pages.
Robertson et al., "Maize Stalk Lodging: Morphological Determinants of Stalk Strength" Mar. 2017, 10 pages.
Martin, et al., "Breakage Susceptibility and Hardness of Corn Kernels of Various Sizes and Shapes", May 1987, 10 Pages.
Extended European Search Report and Written Opinion issued in European Patent Application No. 20208171.7, dated May 11, 2021, in 05 pages.
Cordoba, M.A., Bruno, C.I. Costa, J.L. Peralta, N.R. and Balzarini, M.G., 2016, Protocol for multivariate homogeneous zone delineation in precision agriculture, biosystems engineering, 143, pp. 95-107.
Pioneer Estimator, "Corn Yield Estimator" accessed on Feb. 13, 2018, 1 page. retrieved from: https://www.pioneer.com/home/site/us/tools-apps/growing-tools/corn-yield-estimator/.
Guindin, N. "Estimating Maize Grain Yield From Crop Biophysical Parameters Using Remote Sensing", Nov. 4, 2013, 19 pages.
EP Application No. 19203883.4-1004 Office Action dated May 3, 2021, 4 pages.
Iowa State University Extension and Outreach, "Harvest Weed Seed Control", Dec. 13, 2018, 6 pages. https://crops.extension.iastate.edu/blog/bob-hartzler/harvest-weed-seed-control.
Getting Rid Of WeedsThrough Integrated Weed Management, accessed on Jun. 25, 2021, 10 pages. https://integratedweedmanagement.org/index.php/iwm-toolbox/the-harrington-seed-destructor.
The Importance of Reducing Weed Seeds, Jul. 2018, 2 pages. https://www.aphis.usda.gov/plant_health/soybeans/soybean-handouts.pdf.
Alternative Crop Guide, Published by the Jefferson Institute, "Buckwheat", Revised Jul. 2002. 4 pages.
Application and Drawings for U.S. Appl. No. 16/171,978, filed Oct. 26, 2018, 53 pages.
Notice of Allowance for U.S. Appl. No. 16/432,557 dated Mar. 22, 2021, 9 pages.
Zhao, L., Yang, J., Li, P. and Zhang, L., 2014. Characteristics analysis and classification of crop harvest patterns by exploiting high-frequency multipolarization SAR data. IEEE Journal of Selected Topics in Applied Earth Observations and Remote Sensing, 7(9), pp. 3773-3783.
Feng-jie, X., Er-da, W. and Feng-yuan, X., Crop area yield risk evaluation and premium rates calculation—Based on nonparametric kernel density estimation. In 2009 International Conference on Management Science and Engineering, 7 pages.
Liu, R. and Bai, X., May 2014. Random fuzzy production and distribution plan of agricultural products and its PSO algorithm. In 2014 IEEE International Conference on Progress in Informatics and Computing (pp. 32-36). IEEE.
Notice of Allowance for U.S. Appl. No. 16/171,978 dated Mar. 31, 2021, 6 pages.
Application and Drawings for U.S. Appl. No. 17/067,383, filed Oct. 9, 2020, 61 pages.
Application and Drawings for U.S. Appl. No. 16/175,993, filed Oct. 31, 2018, 28 pages.
Application and Drawings for U.S. Appl. No. 16/380,623, filed Apr. 10, 2019, 36 pages.
Application and Drawings for U.S. Appl. No. 16/783,511, filed Feb. 6, 2020, 55 pages.
"Automated Weed Detection With Drones" dated May 25, 2017, retrieved at: <<https://www.precisionhawk.com/blog/media/topic/automated-weed-identification-with-drones>>, retrieved on Jan. 21, 2020, 4 pages.
F. Forcella, "Estimating the Timing of Weed Emergence", Site-Specific Management Guidelines, retrieved at: <<http://www.ipni.net/publication/ssmg.nsf/0/D26EC9A906F9B8C9852579E500773936/$FILE/SSMG-20.pdf>>, retrieved on Jan. 21, 2020, 4 pages.
Chauhan et al., "Emerging Challenges and Opportunities for Education and Research in Weed Science", frontiers in Plant Science. Published online Sep. 5, 2017, 22 pages.
Apan, A., Wells, N., Reardon-Smith, K, Richardson, L, McDougall, K, and Basnet, B.B., 2008. Predictive mapping of blackberry in the Condamine Catchment using logistic regression and spatial analy-

(56) References Cited

OTHER PUBLICATIONS sis. In Proceedings of the 2008 Queensland Spatial Conference: Global Warning: What's Happening in Paradise. Spatial Sciences Institute, 11 pages.
Jarnevich, C.S., Holcombe, T.R., Barnett, D.T., Stohlgren, T.J. and Kartesz, J.T., 2010. Forecasting weed distributions using climate data: a GIS early warning tool. Invasive Plant Science and Management. 3(4), pp. 365-375.
Sa et al., "WeedMap: A Large-Scale Semantic Weed Mapping Framework Using Aerial Multispectral Imaging and Deep Neural Network for Precision Farming", Sep. 6, 2018, 25 pages.
Pflanz et al., "Weed Mapping with UAS Imagery and a Bag of Visual Words Based Image Classifier", Published Sep. 24, 2018, 28 pages.
Provisional Application and Drawings for U.S. Appl. No. 62/928,964, filed Oct. 31, 2019, 14 pages.
Application and Drawings for U.S. Appl. No. 16/783,475, filed Feb. 6, 2020, 55 pages.
U.S. Appl. No. 17/067,483 Application and Drawings as filed on Oct. 9, 2020, 63 pages.
U.S. Appl. No. 17/066,442 Application and Drawings as filed on Oct. 8, 2020, 65 pages.
U.S. Appl. No. 16/380,550, filed Apr. 10, 2019, Application and Drawings, 47 pages.
U.S. Appl. No. 17/066,999 Application and Drawings as filed on Oct. 9, 2020, 67 pages.
U.S. Appl. No. 17/066,444 Application and Drawings as filed on Oct. 8, 2020, 102 pages.
Extended Search Report for European Patent Application No. 20167930.5 dated Sep. 15, 2020, 8 pages.
Extended Search Report for European Patent Application No. 19205901.2 dated Mar. 17, 2020, 6 pages.
Notice of Allowance for U.S. Appl. No. 16/171,978, dated Dec. 15, 2020, 21 pages.
Zhigen et al., "Research of the Combine Harvester Load Feedback Control System Using Multi-Signal Fusion Method and Fuzzy Algorithm," 2010, Publisher: IEEE, 5 pages.
Dan et al., "On-the-go Throughput Prediction in a Combine Harvester Using Sensor Fusion," 2017, Publisher: IEEE, 6 pages.
Fernandez-Quintanilla et al., "Is the current state of the art of weed monitoring sutible for site-specific weed management in arable crops?", First Published May 1, 2018, 4 pages.
Dionysis Bochtis et al. "Field Operations Planning for Agricultural Vehicles: A Hierarchical Modeling Framework." Agricultural Engineering International: the CIGR Ejournal. Manuscript PM 06 021. vol. IX. Feb. 2007, pp. 1-11.
U.S. Appl. No. 16/432,557, filed Jun. 5, 2019, 61 pages.
European Search Report issued in counterpart European Patent Application No. 19205142.3 dated Feb. 28, 2020 (6 pages).
Mei-Ju et al., "Two paradigms in cellular Internet-of-Things access for energy-harvesting machine-to-machine devices: push-based versus pull-based," 2016, vol. 6, 9 pages.
Yi et al., "An Efficient MAC Protocol With Adaptive Energy Harvesting for Machine-to-Machine Networks," 2015, vol. 3, Publisher: IEEE, 10 pages.
European Search Report issued in European Patent Application No. 19203883.4 dated Mar. 23, 2020 (10 pages).
Notice of Allowance for U.S. Appl. No. 16/171,978 dated Oct. 28, 2020, 5 pages.
Notice of Allowance for U.S. Appl. No. 16/171,978, dated Aug. 7, 2020, 9 pages.
K.R. Manjunath et al., "Developing Spectral Library of Major Plant Species of Western Himalayas Using Ground Observations", J. Indian Soc Remote Sen (Mar. 2014) 42(a):201-216, 17 pages.
U.S. Appl. No. 16/380,564 Application and Drawings as filed on Apr. 10, 2019, 55 pages.
S. Veenadhari et al., "Machine Learning Approach For Forecasting Crop Yield Based on Climatic Parameters", 2014 International Conference on Computer Communication and Informatics (ICCCI-2014) Jan. 3-6, 2014, Coimbatore, India, 5 pages.

Non-Final Office Action for U.S. Appl. No. 16/380,531 dated Oct. 21, 2020, 10 pages.
U.S. Appl. No. 16/380,531 Application and Drawings as filed on Apr. 10, 2019, 46 pages.
Martin et al., "Breakage Susceptibility and Harness of Corn Kernels of Various Sizes and Shapes", May 1987, 10 pages.
Jones et al., "Brief history of agricultural systems modeling" Jun. 21, 2016, 15 pages.
Dan Anderson, "Brief history of agricultural systems modeling" 1 pages. Aug. 13, 2019.
A.Y. Şeflek, "Determining the Physico-Mechanical Characteristics of Maize Stalks Fordesigning Harvester", The Journal of Animal & Plant Sciences, 27(3): 2017, p. 855-860 ISSN: 1018-7081, Jun. 1, 2017.
Carmody, Paul, "Windrowing and harvesting", 8 pages Date: Feb. 3, 2010.
Dabney, et al., "Forage Harvest Representation in RUSLE2", Published Nov. 15, 2013, 17 pages.
John Deere S-Series Combines S760, S770, S780, S790 Brochure, 44 pages, Nov. 15, 2017.
Sekhon et al., "Stalk Bending Strength is Strongly Assoicated with Maize Stalk Lodging Incidence Across Multiple Environments", Jun. 20, 2019, 23 pages.
Thomison et al. "Abnormal Corn Ears", Apr. 28, 2015, 1 page.
Anderson, "Adjust your Combine to Reduce Damage to High Moisture Corn", Aug. 13, 2019, 11 pages.
Sumner et al., "Reducing Aflatoxin in Corn During Harvest and Storage", Reviewed by John Worley, Apr. 2017, 6 pages.
Sick, "Better understanding corn hybrid characteristics and properties can impact your seed decisions", 8 pages, Sep. 21, 2018.
TraCl/Change Vehicle State—SUMO Documentation, 10 pages, Retrieved Dec. 11, 2020.
Arnold, et al., Chapter 8. "Plant Growth Component", Jul. 1995, 41 pages.
Humburg, Chapter: 37 "Combine Adjustments to Reduce Harvest Losses", 2019, South Dakota Board of Regents, 8 pages.
Hoff, "Combine Adjustments", Cornell Extension Bulletin 591, Mar. 1943, 10 pages.
University of Wisconsin, Corn Agronomy, Originally written Feb. 1, 2006 | Last updated Oct. 18, 2018, 2 pages.
University of Nebraska-Lincoln, "Combine Adjustments for Downed Corn—Crop Watch", Oct. 27, 2017, 5 pages.
"Combine Cleaning: Quick Guide To Removing Resistant Weed Seeds (Among Other Things)", Nov. 2006, 5 pages.
Dekalb, "Corn Drydown Rates", 7 pages, Aug. 4, 2020.
Mahmoud et al. Iowa State University, "Corn Ear Orientation Effects on Mechanical Damage and Forces on Concave", 1975, 6 pages.
Sindelar et al., Kansas State University, "Corn Growth & Development" Jul. 17, 2017, 9 pages.
Pannar, "Manage the Growth Stages of the Maize Plant With Pannar", Nov. 14, 2016, 7 pages.
He et al., "Crop residue harvest impacts wind erodibility and simulated soil loss in the Central Great Plains", Sep. 27, 2017, 14 pages.
Blanken, "Designing a Living Snow Fence for Snow Drift Control", Jan. 17, 2018, 9 pages.
Jean, "Drones give aerial boost to ag producers", Mar. 21, 2019, 4 pages.
Zhao et al., "Dynamics modeling for sugarcane sucrose estimation using time series satellite imagery", Jul. 27, 2017, 11 pages.
Brady, "Effects of Cropland Conservation Practices on Fish and Wildlife Habitat", Sep. 1, 2007, 15 pages.
Jasa, et al., "Equipment Adjustments for Harvesting Soybeans at 13%-15% Moisture", Sep. 15, 2017, 2 pages.
Bendig et al., "Estimating Biomass of Barley Using Crop Surface Models (CSMs) Derived from UAV-Based RGB Imaging", Oct. 21, 2014, 18 pages.
Robertson, et al., "Maize Stalk Lodging: Morphological Determinants of Stalk Strength", Mar. 3, 2017, 10 pages.
MacGowan et al. Purdue University, Corn and Soybean Crop Depreciation by Wildlife, Jun. 2006, 14 pages.

(56) References Cited

OTHER PUBLICATIONS

Martinez-Feria et al., Iowa State University, "Corn Grain Dry Down in Field From Maturity to Harvest", Sep. 20, 2017, 3 pages.
Wrona, "Precision Agriculture's Value" Cotton Physiology Today, vol. 9, No. 2, 1998, 8 pages.
Zhang et al., "Design of an Optical Weed Sensor Using Plant Spectral Characteristics" Sep. 2000, 12 pages.
Hunt, et al., "What Weeds Can Be Remotely Sensed?", 5 pages, May 2016.
Pepper, "Does An Adaptive Gearbox Really Learn How You Drive?", Oct. 30, 2019, 8 pages.
Eggerl, "Optimization of Combine Processes Using Expert Knowledge and Methods of Artificial Intelligence", Jul. 10, 1982, 143 pages.
Sheely et al., "Image-Based, Variable Rate Plant Growth Regulator Application in Cotton at Sheely Farms in California", Jan. 6-10, 2003 Beltwide Cotton Conferences, Nashville, TN, 17 pages.
Kovacs et al., "Physical characteristics and mechanical behaviour of maize stalks for machine development", Apr. 23, 2019, 1-pages.
Anonymously, "Optimizing Crop Profit Across Multiple Grain Attributes and Stover", ip.com, May 26, 2009, 17 pages.
Breen, "Plant Identification: Examining Leaves", Oregon State University, 2020, 8 pages.
Caglayan et al., A Plant Recognition Approach Using Shape and Color Features in Leaf Images, Sep. 2013, 11 pages.
Casady et al., "Precision Agriculture Yield Monitors" University of Missouri-System, 4 pages, 1998.
Apan et al., "Predicting Grain Protein Content in Wheat Using Hyperspectral Sensing of In-season Crop Canopies and Partial Least Squares Regression" 18 pages, 2006.
Xu et al., "Prediction of Wheat Grain Protein by Coupling Multisource Remote Sensing Imagery and ECMWF Data", Apr. 24, 2020, 21 pages.
Day, "Probability Distributions of Field Crop Yields," American Journal of Agricultural Economics, vol. 47, Issue 3, Aug. 1965, Abstract Only, 1 page.
Butzen, "Reducing Harvest Losses in Soybeans", Pioneer, Jul. 23, 2020, 3 pages.
Martin et al., "Relationship between secondary variables and soybean oil and protein concentration", Abstract Only, 1 page., 2007.
Torres, "Precision Planting of Maize" Dec. 2012, 123 pages.
Prosecution History for U.S. Appl. No. 16/380,691 including: Notice of Allowance dated Mar. 10, 2021 and Application and Drawings filed Apr. 10, 2019, 46 pages.
U.S. Appl. No. 16/831,216 Application and Drawings filed Mar. 26, 2020, 56 pages.
Notice of Allowance for U.S. Appl. No. 16/380,531 dated Apr. 5, 2021, 5 pages.
Lamsal et al. "Sugarcane Harvest Logistics in Brazil" Iowa Research Online, Sep. 11, 2013, 27 pages.
Jensen, "Algorithms for Operational Planning of Agricultural Field Operations", Mechanical Engineering Technical Report ME-TR-3, Nov. 9, 2012, 23 pages.
Chauhan, "Remote Sensing of Crop Lodging", Nov. 16, 2020, 16 pages.
7 Combine Tweaks to Boost Speed (https://www.agriculture.com/machinery/harvest-equipment/7-combine-tweaks-to-boost-speed_203-ar33059) 8 pages, Aug. 19, 2018.
Managing corn harvest this fall with variable corn conditions (https://www.ocj.com/2019/10/managing-corn-harvest-this-fall-with-variable-corn-conditions/), 4 pages, Oct. 10, 2019.
Reducing Aflatoxin in Corn During Harvest and Storage (https://extension.uga.edu/publications/detail.html?number=B1231&title=Reducing%20Aflatoxin%20in%20Corn%20During%20Harvest%20and%20Storage), 9 pages, Published with Full Review on Apr. 19, 2017.
Variable Rate Applications to Optimize Inputs (https://www.cotton.org/tech/physiology/cpt/miscpubs/upload/CPT-v9No2-98-REPOP.pdf), 8 pages, Nov. 2, 1998.
Robin Booker, Video: Canadian cage mill teams up with JD (https://www.producer.com/2019/12/video-canadian-cage-mill-teams-up-with-jd/) , 6 pages, Dec. 19, 2019.
Jarnevich, et al. "Forecasting Weed Distributions using Climate Data: A GIS Early Warning Tool", Invasive Plant Science and Management, 11 pages, Jan. 20, 2017.
Burks, "Classification of Weed Species Using Color Texture Features and Discriminant Analysis" (http://citeseerx.ist.psu.edu/viewdoc/download?doi=10.1.1.468.5833&rep=rep1&type=pdf), 8 pages, 2000.
John Deere, https://www.youtube.com/watch?v=1Gq77CfdGI4&list=PL1KGsSJ4CWk4rShNb3-sTMOliL8meHBL5 (last accessed Jul. 14, 2020), Jun. 15, 2020, 5 pages.
Combine Adjustments (http://corn.agronomy.wisc.edu/Management/L036.aspx), 2 pages, Originally written Feb. 1, 2006; last updated Oct. 18, 2018.
Ardekani, "Off- and on-ground GPR techniques for field-scale soil moisture mapping" Jun. 2013, 13 pages.
Does an Adaptive Gearbox Really Learn How You Drive? (https://practicalmotoring.com.au/voices/does-an-adaptive-gearbox-really-learn-how-you-drive/), Oct. 30, 2019, 8 pages.
https://www.researchgate.net/publication/222527694_Energy_Requirement_Model_for_a_Combine_Harvester_Part_I_Development_of_Component_Models, Abstract Only, Jan. 2005.
http://canola.okstate.edu/cropproduction/harvesting, 8 pages, Aug. 2011.
"Tips and Tricks of Harvesting High Moisture Grain", https://www.koenigequipment.com/blog/tips-and-tricks-of-harvesting-highmoisture-grain, 5 pages, last accessed Feb. 11, 2021.
Hoff, Combine Adjustements, Mar. 1943, 8 pages.
Haung et al., "Accurate Weed Mapping and Prescription Map Generation Based onFully Convolutional Networks Using UAV Imagery", 14 pages, Oct. 1, 2018.
Thompson, "Morning glory can make it impossible to harvest corn", Feb. 19, 2015, 4 pages.

\* cited by examiner

| ROW | DISTRIBUTED CONSTITUENT VALUE - PROTEIN (g/kg) | VI-ESTIMATED CONSTITUENT VALUE - PROTEIGN (g/kg) (135 avg g/kg) | WEIGHTED CONSTITUENT VALUE - PROTEIN (g/kg) |
|---|---|---|---|
| 204 | 120 | 140 | 124.4 |
| 206 | 120 | 130 | 115.6 |
| 208 | 120 | 135 | 120.0 |
| 210 | 120 | 130 | 115.6 |
| 212 | 120 | 130 | 115.6 |
| 214 | 120 | 140 | 120.0 |
| 216 | 120 | 140 | 124.4 |
| 218 | 120 | 135 | 120.0 |

FIG. 6

CROP CONSTITUENT SENSING

FIELD OF THE DESCRIPTION

The present description relates to agriculture. More specifically, the present description relates to sensing crop constituents.

BACKGROUND

There are a wide variety of different types of agricultural machines. Some agricultural machines include harvesters, such as combine harvesters, sugarcane harvesters, cotton harvesters, self-propelled forage harvesters, and windrowers. Some harvesters can also be fitted with different types of headers to harvest different types of crops. Other agricultural machines include sprayers and other application machines that can be used to apply a substance to a field.

Some current harvesters have crop constituent sensors that sense crop constituents as a crop is being harvested. The crop constituents can be used in later agricultural operations such as in applying fertilizer or other substances to the field.

The discussion above is merely provided for general background information and is not intended to be used as an aid in determining the scope of the claimed subject matter.

SUMMARY

A crop constituent value is sensed by a crop constituent sensor on an agricultural machine. The crop constituent value is distributed among subregions covered by the agricultural machine. A vegetative index-estimated crop constituent value is also obtained for each of the subregions. A weighted crop constituent value is then generated for each subregion, based upon the distributed constituent value for each subregion and the vegetative index-estimated constituent value for that subregion. An action signal is generated based upon the weighted crop constituent value for the subregion.

Example 1 is an agricultural system comprising:
a crop constituent value distribution system that obtains a detected crop constituent value detected by a crop constituent sensor, the detected crop constituent value corresponding to a sensor measurement by the crop constituent sensor, the crop constituent value distribution system assigning the detected crop constituent value, as a distributed constituent value, to a set of subregions from which the detected crop constituent value was measured during the sensor measurement;
a weighted constituent value generator that generates a weighted crop constituent value for each subregion in the set of subregions, the weighted crop constituent value for a subregion in the set of subregions being based on the distributed constituent value for the subregion and based on an agricultural characteristic-estimated constituent value for the subregion that is estimated based on an agricultural characteristic value for the subregion; and
an action signal generator that generates an action signal based on the weighted crop constituent value for the subregions in the set of subregions.

Example 2 is the agricultural system of any or all previous examples wherein the agricultural characteristic-estimated constituent value for the subregion that is estimated based on an agricultural characteristic value for the subregion comprises a vegetative index (VI)-estimated constituent value for the subregion that is estimated based on a VI value for the subregion and further comprising:
a vegetative index map processing system that accesses a VI map that includes a VI value georeferenced to each of the subregions in the set of subregions and generates the VI-estimated constituent value for the subregion in the set of subregions based on the VI value georeferenced to the subregion in the set of subregions.

Example 3 is the agricultural system of any or all previous examples, wherein the vegetative index map processing system comprises:
a VI value extraction component that accesses VI values for each of the subregions from the VI map.

Example 4 is the agricultural system of any or all previous examples, wherein the vegetative index map processing system comprises:
a correlation generator that generates a VI value-to-constituent value correlation between a given VI value and a constituent value.

Example 5 is the agricultural system of any or all previous examples, wherein the vegetative index map processing system comprises:
a VI-estimated constituent value generator that generates the VI-estimated constituent value for the subregion based on the VI value georeferenced to the subregion and the VI value-to-constituent value correlation.

Example 6 is the agricultural system of any or all previous examples, wherein the action signal generator generates an action signal to control a controllable subsystem on an agricultural machine based on the weighted crop constituent value.

Example 7 is the agricultural system of any or all previous examples and further comprising:
a communication system that communicates with a remote system over a network,
wherein the action signal generator generates an action signal to control the communication system to communicate the weighted crop constituent value to the remote system.

Example 8 is the agricultural system of any or all previous examples and further comprising:
a data store, and
wherein the action signal generator generates an action signal to control the data store to store the weighted crop constituent value.

Example 9 is the agricultural system of any or all previous examples and further comprising:
an agricultural harvester,
wherein the crop constituent sensor is deployed on the agricultural harvester to detect the crop constituent value corresponding to harvested crop during a harvesting operation.

Example 10 is a computer implemented method of controlling an agricultural system comprising:
obtaining a detected crop constituent value detected by a crop constituent sensor, the detected crop constituent value corresponding to a sensor measurement by the crop constituent sensor;
assigning the detected crop constituent value, as a distributed constituent value, to a set of subregions from which the detected crop constituent value was measured during the sensor measurement;
generating a weighted crop constituent value for each subregion in the set of subregions, the weighted crop constituent value for a subregion in the set of subregions being based on the distributed constituent value for the subregion and based on an agricultural characteristic-estimated constituent value for the subregion that is estimated based on an agricultural characteristic value for the subregion; and generating an action signal based on the weighted crop constituent value for the subregions in the set of subregions.

Example 11 is the computer implemented method of any or all previous examples, wherein the agricultural characteristic-estimated constituent value for the subregion that is estimated based on an agricultural characteristic value for the subregion comprises a vegetative index (VI)-estimated constituent value for the subregion that is estimated based on a VI value for the subregion, the method further comprising:

accessing a VI map that includes a VI value georeferenced to each of the subregions in the set of subregions; and generating the VI-estimated constituent value for the subregion in the set of subregions based on the VI value georeferenced to the subregion in the set of subregions.

Example 12 is the computer implemented method of any or all previous examples, wherein accessing a VI map comprises:

accessing VI values for each of the subregions from the VI map.

Example 13 is the computer implemented method of any or all previous examples, wherein generating the VI-estimated constituent value comprises:

generating a VI value-to-constituent value correlation between a given VI value and a given crop constituent value.

Example 14 is the computer implemented method of any or all previous examples, wherein generating the VI-estimated constituent value comprises:

generating the VI-estimated constituent value for the subregion based on the VI value georeferenced to the subregion and the VI value-to-constituent value correlation.

Example 15 is the computer implemented method of any or all previous examples, wherein generating an action signal comprises:

generating an action signal to control a controllable subsystem on an agricultural machine based on the weighted crop constituent value.

Example 16 is the computer implemented method of any or all previous examples and further comprising:

generating an action signal to control a communication system to communicate the weighted crop constituent value to a remote system.

Example 17 is the computer implemented method of any or all previous examples, wherein the agricultural system comprises a data store, and wherein generating an action signal comprises:
generating an action signal to control the data store to store the weighted crop constituent value.

Example 18 is the computer implemented method of any or all previous examples, wherein the agricultural system comprises an agricultural harvester, wherein the crop constituent sensor is deployed on the agricultural harvester, and wherein obtaining a detected crop constituent value comprises:

detecting the crop constituent value corresponding to harvested crop during a harvesting operation.

Example 19 is an agricultural system comprising:
an agricultural vehicle configured to perform an agricultural operation in a field;

a crop constituent sensor, mounted on the agricultural vehicle, that performs a sensor measurement to detect a crop constituent value during the agricultural operation;

a crop constituent value distribution system that obtains the detected crop constituent value and assigns the crop constituent value, as a distributed constituent value, to a set of subregions from which the detected crop constituent value was measured during the sensor measurement;

a weighted constituent value generator that generates a weighted crop constituent value for each subregion in the set of subregions, the weighted crop constituent value for a subregion in the set of subregions being based on the distributed constituent value for the subregion and based on a vegetative index (VI)-estimated constituent value for the subregion that is estimated based on a VI value for the subregion; and an action signal generator that generates an action signal based on the weighted crop constituent value for the subregions in the set of subregions.

Example 20 is the agricultural system of any or all previous examples and further comprising:

a VI value extraction component that accesses VI values for each of the subregions from a VI map that includes VI values georeferenced to the subregions;

a correlation generator that generates a VI value-to-constituent value correlation between a given VI value and a constituent value; and a VI-estimated constituent value generator generates the VI-estimated constituent value for the subregion based on the VI value georeferenced to the subregion and the VI value-to-constituent value correlation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 6 is a diagram illustrating an example of a weighted allocation of a constituent value to geo-referenced regions based upon a vegetative index-estimated constituent value.

DETAILED DESCRIPTION

Figure 1:
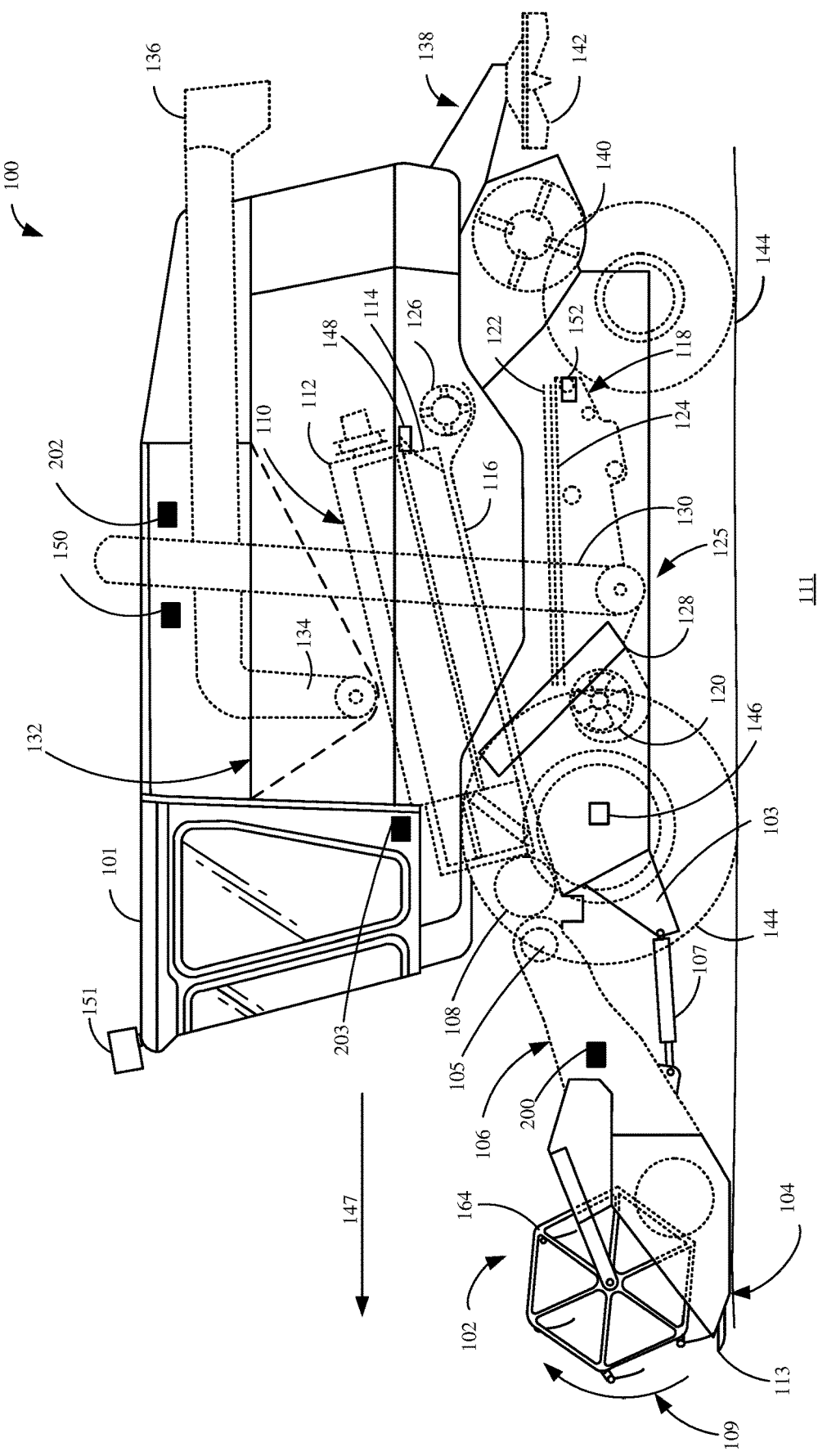
FIG. 1 is a partial pictorial, partial schematic illustration of a self-propelled agricultural harvester 100.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, steps, or a combination thereof described with respect to one example may be combined with the features, components, steps, or a combination thereof described with respect to other examples of the present disclosure.

In some current systems, crop constituents are detected as part of the harvest operation by a constituent sensor on an agricultural harvester. Crop constituents may also be detected using a crop constituent detector on a sprayer or other agricultural machine. The crop constituent values generated by the crop constituent sensor can be geo-referenced to geographic locations based upon the geographic location from which the crop was harvested that gave rise to the crop constituent values. However, the crop constituent sensor is often a single sensor on an agricultural harvester located at a position where the harvested crop passes during processing, such as in an elevator that moves harvested crop to a clean grain tank. Therefore, the resolution of crop constituent values, with respect to geographic locations, is relatively low. That is, crop constituent sensors that take measurements from a combined population of grain is unable to provide granularity to particularly identify a location of the field associated with the sensed constituent data. This problem is exacerbated by the fact that the width of crop harvester headers is continuing to increase. Therefore, the geographic location from which the crop was harvested, and which gave rise to a crop constituent value, is large. When the crop constituent values are used for subsequent agricultural processes, such as the application of fertilizer, those subsequent agricultural processes are imprecise because localized constituent values within an area represented by the measured crop constituent value may vary.

The present description relates to using an agricultural characteristic map that has agricultural characteristic values geo-referenced to different geographic locations on a field. The agricultural characteristic values are correlated to crop constituent values so that the agricultural characteristic map can be used to obtain an agricultural characteristic-estimated crop constituent map using the correlation between the agricultural characteristic values and crop constituent values.

In one example, the agricultural characteristic map is a vegetative index map. Thus, in one example, the present description relates to using a vegetative index map that has vegetative index values geo-referenced to different geographic locations on a field. The vegetative index values are correlated to crop constituent values so that the vegetative index map can be used to obtain a vegetative index-estimated crop constituent map using the correlation between the vegetative index values and crop constituent values.

In the present description, a crop constituent sensor on an agricultural vehicle senses a crop constituent value. The crop constituent value is distributed by geo-referencing the crop constituent value to different subregions in the field based upon the width of the header and based upon other distribution criteria discussed below. The distributed crop constituent values are combined with the agricultural characteristic-estimated crop constituent values, such as the vegetative index-estimated crop constituent values, to obtain a weighted crop constituent value for each subregion. An action signal may be generated to take action based upon the weighted crop constituent values in each of the subregions.

For example, the weighted crop constituent values in each subregion may be used to generate a weighted crop constituent map for the field. In some examples, the weighted crop constituent map may be used to control an agricultural work machine, such as an agricultural harvester. For instance, it may be desirable to change or otherwise control the machine settings of the agricultural harvester based on the crop constituent values in the area in which the agricultural harvester is operating. In some situations, crop constituent values, such as protein or oil, at a particular level may result in premium market prices or in benefits when fed to livestock. To capture this value, crop is segregated at harvest and managed based upon the constituent level. Segregation may be done by directing crop to one of a plurality of on-board clean grain tanks. In other examples, the segregation may be done by off-loading grain to a grain transport vehicle as constituent level thresholds are crossed. In still other examples, the segregation may be done by managing the path a harvesting vehicle takes through the field based upon predicted constituent values. A vegetative index map maps vegetative index values, which may be indicative of vegetative growth, across different geographic locations in one or more field(s) of interest. One example of a vegetative index includes a normalized difference vegetation index (NDVI). There are many other vegetative indices, and all of these vegetative indices are within the scope of the present disclosure. In some examples, a vegetative index may be derived from sensor readings of one or more bands of electromagnetic radiation reflected by the plants. Without limitations, these bands may be in the microwave, infrared, visible, or ultraviolet portions of the electromagnetic spectrum.

A vegetative index map may be used to identify the presence and location of vegetation. In some examples, a vegetative index map enables crops to be identified and geo-referenced in the presence of bare soil, crop residue, or other plants, including crop or weeds. For instance, towards the beginning of a growing season, when a crop is in a growing state, the vegetative index can show the progress of the crop development. Therefore, if a vegetative index map is generated early in the growing season or midway through the growing season, the vegetative index map may be indicative of the progress of the development of the crop plants. For instance, the vegetative index map may indicate whether the plant is stunted or establishing a sufficient canopy. The vegetative index map may also indicate other plant attributes that are indicative of plant development.

While a vegetative index map is one example of an agricultural characteristic map, in other examples various other agricultural characteristic maps can be used, such as a soil type map which maps soil types to different geographic locations in one or more fields of interest, for instance loamy soil, sandy soil, clay soil, silt soil, peat soil, chalk soil, etc. In another example, an agricultural characteristic map can include a soil nutrient map which maps soil nutrient values to different geographic locations in one or more fields of interest, for instance nitrogen levels, phosphorous levels, potassium levels, or a combination thereof. In another example, an agricultural characteristic map can include a crop genotype map which maps crop genotypes to different geographic locations in one or more fields of interest, for instance different crop hybrids. In another example, an agricultural characteristic map can include a historical map, such as a historical crop constituent map which maps historical crop constituent values to different geographic locations in one or more fields of interest. In another example, an agricultural characteristic map can include a soil moisture map which maps soil moisture values to different geographic locations in one or more fields of interest. In another example, an agricultural characteristic map can include a prior operation map which maps agricultural characteristic values from prior operations to different geographic locations in one or more fields of interest, such as a prior nutrient application map which maps nutrient application values to different geographic locations in one or more field(s) of interest, for instance volumes of nutrient(s) applied to different geographic locations in one or more field(s) of interest. These are merely some examples of agricultural characteristic maps. Various other agricultural characteristic maps that map various other agricultural characteristic values are also contemplated herein, such as a topographic map that maps topographic values (e.g., elevation, slope, etc.) to different geographic locations in one or more fields of interest.

In one example, a crop constituent map maps crop constituent values across different geographic locations in one or more field(s) of interest. In some instances, crop constituent maps are generated from past agricultural operations on the field(s), such as past harvesting operations. In some instances, a crop constituent map shows crop constituents in crop constituent value units. One example of a crop constituent value unit includes a numeric value, such as a percentage, weight value, or mass value that indicates an amount of a constituent in a crop. In one example, the crop constituent value indicates an amount of protein, starch, oil, nutrients, water, among various other constituents of crop or vegetation, or an amount of protein, starch, oil, nutrients, water, among various other constituents, in grain of crop plants. Some crop constituents are more transient in nature, in that the amount of the constituent contained within the crop material (such as grain) will vary over time. For instance, grain can dry or take on water throughout a span of time and thus the amount of water, as a crop constituent, will vary with the drying or moistening of the grain. Some crop constituents are more structural in nature, in that the amount of constituent (or ratios of constituents) tend to not vary as much over time, at least until the grain decomposes. As used herein, crop constituents can also refer to grain constituents, and, thus, crop constituent values can, in some examples, refer to an amount of constituent in the grain of crop plants. Crop constituent values can indicate, for example, the amount of protein, starch, oil, nutrients, water, among various other constituents, in the grain of crop plants.

In some examples, crop constituent values are derived from sensor readings of one or more crop constituent sensors. Without limitation, these crop constituent sensors utilize one or more bands of electromagnetic radiation in detecting crop constituents. For example, a crop constituent sensor utilizes the reflectance or absorption of various ranges (e.g., various wavelengths or frequencies, or both) of electromagnetic radiation by crop or other vegetation material in detecting crop constituents. In some examples, a crop constituent sensor includes an optical sensor, such as an optical spectrometer. In one example, a crop constituent sensor utilizes near-infrared spectroscopy or visible and near-infrared spectroscopy.

The present description thus proceeds with respect to examples in which agricultural system receives an agricultural characteristic map, such as a vegetative index map, and a correlation between agricultural characteristic values and crop constituent values, such as a correlation between vegetative index values and crop constituent values. An agricultural characteristic-estimated crop constituent map, such as a vegetative index (VI)-estimated crop constituent map, is generated using the agricultural characteristic map, such as the vegetative index map, and the correlation between the agricultural characteristic values and the crop constituent values, such as the correlation between the vegetative index values and the crop constituent values. The agricultural system also receives a sensed crop constituent value corresponding to a geographic location in a field. In one example, the sensed crop constituent value is assigned to subregions in the field based on the geographic area corresponding to the crop constituent sensor value. A weighted crop constituent value is generated for each subregion based upon a crop constituent value assigned to that subregion and based upon the agricultural characteristic-estimated crop constituent value for that subregion, such as the vegetative index-estimated crop constituent value for that subregion.

FIG. 1 is a partial pictorial, partial schematic, illustration of a self-propelled agricultural harvester 100. In the illustrated example, agricultural harvester 100 is a combine harvester. Further, although combine harvesters are provided as examples throughout the present disclosure, it will be appreciated that the present description is also applicable to other types of harvesters, such as cotton harvesters, sugarcane harvesters, self-propelled forage harvesters, windrowers, or other agricultural work machines. Consequently, the present disclosure is intended to encompass the various types of harvesters and is, thus, not limited to combine harvesters. Moreover, the present disclosure is directed to other types of agricultural machines, such as agricultural seeders and sprayers. Consequently, the present disclosure is intended to encompass these various types of harvesters and other agricultural machines and is thus not limited to combine harvesters.

As shown in FIG. 1, agricultural harvester 100 illustratively includes an operator compartment 101, which may have a variety of different operator interface mechanisms for controlling agricultural harvester 100. Agricultural harvester 100 includes a front-end subsystem that has front-end equipment, such as a header 102, and a cutter generally indicated at 104. Agricultural harvester 100 also includes a feeder house 106, a feed accelerator 108, and a thresher generally indicated at 110. The feeder house 106 and the feed accelerator 108 form part of a material handling subsystem 125. Header 102 is pivotally coupled to a frame 103 of agricultural harvester 100 along pivot axis 105. One or more actuators 107 drive movement of header 102 about axis 105 in the direction generally indicated by arrow 109. Thus, a vertical position of header 102 (the header height) above ground 111 over which the header 102 travels is controllable by actuating actuator 107. While not shown in FIG. 1, agricultural harvester 100 may also include one or more actuators that operate to apply a tilt angle, a roll angle, or both to the header 102 or portions of header 102. Tilt refers to an angle at which the cutter 104 engages the crop. The tilt angle is increased, for example, by controlling header 102 to point a distal edge 113 of cutter 104 more toward the ground. The tilt angle is decreased by controlling header 102 to point the distal edge 113 of cutter 104 more away from the ground. The roll angle refers to the orientation of header 102 about the front-to-back longitudinal axis of agricultural harvester 100 or about an axis parallel to the front-to-back longitudinal axis of agricultural harvester 100.

Thresher 110 illustratively includes a separation subsystem with a threshing rotor 112, a set of concaves 114, and a separator 116. Agricultural harvester 100 also includes a cleaning subsystem or cleaning shoe (collectively referred to as cleaning subsystem 118) that includes a cleaning fan 120, chaffer 122, and sieve 124. The material handling subsystem 125 also includes discharge beater 126, tailings elevator 128, clean grain elevator 130, as well as unloading auger 134 and spout 136. The clean grain elevator moves clean grain into clean grain tank 132. Agricultural harvester 100 also includes a residue subsystem 138 that can include chopper 140 and spreader 142. Agricultural harvester 100 also includes a propulsion subsystem that includes an engine that drives ground engaging components 144, such as wheels or tracks. In some examples, an agricultural harvester 100 within the scope of the present disclosure may have more than one of any of the subsystems mentioned above. In some examples, agricultural harvester 100 may have left and right cleaning subsystems, separators, etc., which are not shown in FIG. 1.

In operation, and by way of overview, agricultural harvester 100 illustratively moves through a field in the direction indicated by arrow 147. As agricultural harvester 100 moves, header 102 (and the associated reel 164) engages the crop to be harvested and gathers the crop toward cutter 104. An operator of agricultural harvester 100 can be a local human operator, a remote human operator, or an automated system. An operator command is a command by an operator. The operator of agricultural harvester 100 may determine one or more of a height setting, a tilt angle setting, or a roll angle setting for header 102. For example, the operator inputs a setting or settings to a control system, that controls actuator 107. The control system may also receive a setting from the operator for establishing the tilt angle and roll angle of the header 102 and implement the inputted settings by controlling associated actuators, not shown, that operate to change the tilt angle and roll angle of the header 102. The actuator 107 maintains header 102 at a height above ground 111 based on a height setting and, where applicable, at desired tilt and roll angles. Each of the height, roll, and tilt settings may be implemented independently of the others. The control system responds to header error (e.g., the difference between the height setting and measured height of header 102 above ground 111 and, in some examples, tilt angle and roll angle errors) with a responsiveness that is determined based on a selected sensitivity level. If the sensitivity level is set at a greater level of sensitivity, the control system responds to smaller header position errors, and attempts to reduce the detected errors more quickly than when the sensitivity is at a lower level of sensitivity.

Returning to the description of the operation of agricultural harvester 100, after crops are cut by cutter 104, the severed crop material is moved through a conveyor in feeder house 106 toward feed accelerator 108, which accelerates the crop material into thresher 110. The crop material is threshed by rotor 112 rotating the crop against concaves 114. The threshed crop material is moved by a separator rotor in separator 116 where a portion of the residue is moved by discharge beater 126 toward the residue subsystem 138. The portion of residue transferred to the residue subsystem 138 is chopped by residue chopper 140 and spread on the field by spreader 142. In other configurations, the residue is released from the agricultural harvester 100 in a windrow. In other examples, the residue subsystem 138 can include weed seed eliminators (not shown) such as seed baggers or other seed collectors, or seed crushers or other seed destroyers.

Grain falls to cleaning subsystem 118. Chaffer 122 separates some larger pieces of material from the grain, and sieve 124 separates some of finer pieces of material from the clean grain. Clean grain falls to an auger that moves the grain to an inlet end of clean grain elevator 130, and the clean grain elevator 130 moves the clean grain upwards, depositing the clean grain in clean grain tank 132. Residue is removed from the cleaning subsystem 118 by airflow generated by cleaning fan 120. Cleaning fan 120 directs air along an airflow path upwardly through the sieves and chaffers. The airflow carries residue rearwardly in agricultural harvester 100 toward the residue handling subsystem 138.

Tailings elevator 128 returns tailings to thresher 110 where the tailings are re-threshed. Alternatively, the tailings also may be passed to a separate re-threshing mechanism by a tailings elevator or another transport device where the tailings are re-threshed as well.

FIG. 1 also shows that, in one example, agricultural harvester 100 includes ground speed sensor 146, one or more separator loss sensors 148, a clean grain camera 150, a forward looking image capture mechanism 151, which may be in the form of a stereo or mono camera, one or more constituent sensors 200, 202, a geographic positioning system 203, and one or more loss sensors 152 provided in the cleaning subsystem 118.

Ground speed sensor 146 senses the travel speed of agricultural harvester 100 over the ground. Ground speed sensor 146 may sense the travel speed of the agricultural harvester 100 by sensing the speed of rotation of the ground engaging components (such as wheels or tracks), a drive shaft, an axel, or other components. In some instances, the travel speed may be sensed using geographic positioning system 203, which may be a global positioning system (GPS), a dead reckoning system, a long range navigation (LORAN) system, or a wide variety of other systems or sensors that provide an indication of a geographic positioning of agricultural harvester 100 in a global or local coordinate system. Detecting a change in position over time may provide an indication of travel speed.

Loss sensors 152 illustratively provide an output signal indicative of the quantity of grain loss occurring in both the right and left sides of the cleaning subsystem 118. In some examples, sensors 152 are strike sensors which count grain strikes per unit of time or per unit of distance traveled to provide an indication of the grain loss occurring at the cleaning subsystem 118. The strike sensors for the right and left sides of the cleaning subsystem 118 may provide individual signals or a combined or aggregated signal. In some examples, sensors 152 may include a single sensor as opposed to separate sensors provided for each cleaning subsystem 118.

Separator loss sensor 148 provides a signal indicative of grain loss in the left and right separators, not separately shown in FIG. 1. The separator loss sensors 148 may be associated with the left and right separators and may provide separate grain loss signals or a combined or aggregate signal. In some instances, sensing grain loss in the separators may also be performed using a wide variety of different types of sensors as well.

As mentioned above, agricultural harvester 100 also includes one or more crop constituent sensors 200, 202 located at one or more different locations on agricultural harvester 100. Crop constituent sensor 200 is shown mounted in feeder house 106, while crop constituent sensor 202 is shown as mounted to sense crop in clean grain elevator 130. However, one or more crop constituent sensor may be provided at one or more other locations on the agricultural harvester 100. Without limitation, crop constituent sensors 200, 202 utilize one or more bands of electromagnetic radiation in detecting crop constituents. For example, in some instances, crop constituent sensors 200, 202 utilize the reflectance or absorption of various ranges (e.g., various wavelengths or frequencies, or both) of electromagnetic radiation by crop or other vegetation material, including grain, in detecting crop constituents. In some examples, a crop constituent sensor 200, 202 includes an optical sensor, such as an optical spectrometer. In one example, a crop constituent sensor 200, 202 utilize near-infrared spectroscopy or visible near-infrared spectroscopy.

Crop constituent sensor may be disposed at or have access to various locations within agricultural harvester 100. For example, the crop constituent sensor 200 is disposed within the feeder house 106 (or otherwise has sensing access to crop material within feeder house 106) and is configured to detect constituents of harvested crop material passing through the feeder house 106. In other examples, the crop constituent sensor 202 is located at other areas within agricultural harvester 100, for instance, on or coupled to the clean grain elevator 130, in a clean grain auger, or in a grain tank 132. In some examples, the crop constituent sensors 200, 202 include a capacitive sensor, which can include, for example, a capacitor for determining dielectric properties of a crop material or other vegetation, such as dielectric properties of grain. In one example, a crop constituent sensor 200, 202 utilizes near-infrared spectroscopy or visible near-infrared spectroscopy and is disposed within (or otherwise has sensing access to crop material within) one or more locations within agricultural harvester, such as feeder house 106, clean grain elevator 130, a clean grain auger, a grain tank, a crop chute, as well as various other locations or combinations thereof. In one example, a crop constituent sensor 200, 202 utilizes near-infrared spectroscopy or visible near-infrared spectroscopy and is disposed along the flow path of the crop material through agricultural harvester 100, the crop constituent sensor 200, 202 can include a chamber to which crop material is diverted to from the flow path so the crop constituent sensor 200, 202 can take a reading. It will be noted that these are merely examples of the types and locations of crop constituent sensors 200, 202 and that various other types and locations of crop constituent sensors are contemplated.

Agricultural harvester 100 may also include other sensors and measurement mechanisms. For instance, agricultural harvester 100 may include one or more of the following sensors: a header height sensor that senses a height of header 102 above ground 111; stability sensors that sense oscillation or bouncing motion (and amplitude) of agricultural harvester 100; a residue setting sensor that is configured to sense whether agricultural harvester 100 is configured to chop the residue, produce a windrow, etc.; a cleaning shoe fan speed sensor to sense the speed of cleaning fan 120; a concave clearance sensor that senses clearance between the rotor 112 and concaves 114; a threshing rotor speed sensor that senses a rotor speed of rotor 112; a chaffer clearance sensor that senses the size of openings in chaffer 122; a sieve clearance sensor that senses the size of openings in sieve 124; a material other than grain (MOG) moisture sensor, such as a capacitive moisture sensor, that senses a moisture level of the MOG passing through agricultural harvester 100; one or more machine setting sensors configured to sense various configurable settings of agricultural harvester 100; a machine orientation sensor that senses the orientation of agricultural harvester 100; and crop property sensors that sense a variety of different types of crop properties, such as crop type, crop moisture, and other crop properties. In some implementations, crop property sensors are configured to sense characteristics of the severed crop material as the crop material is being processed by agricultural harvester 100. For example, in some instances, the crop property sensors sense grain quality, such as broken grain; MOG levels; and grain feed rate as the grain travels through the feeder house 106, clean grain elevator 130, or elsewhere in the agricultural harvester 100. In some implementations, the crop property sensors sense the feed rate of biomass through feeder house 106, through the separator 116, or elsewhere in agricultural harvester 100. Further, in some instances, the crop property sensors sense the feed rate as a mass flow rate of grain through elevator 130 or through other portions of the agricultural harvester 100 or provide other output signals indicative of other sensed variables.

Figure 2:
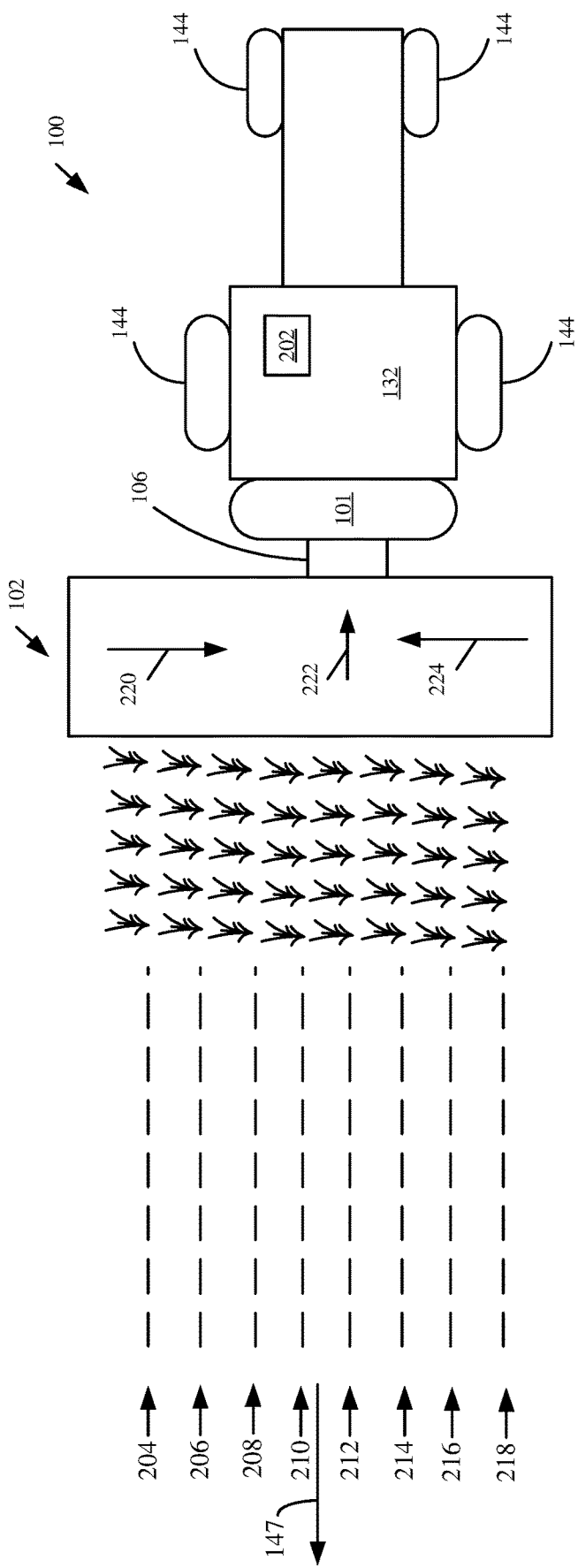
FIG. 2 is a top view of an agricultural harvester.

FIG. 2 is a top view of agricultural harvester 100. Some items in FIG. 2 are similar to those shown in FIG. 1, and those items are similarly numbered. In FIG. 2, agricultural harvester 100 travels in the direction indicated by arrow 147 and harvests row crops. In the example shown in FIG. 2, header 102 is an eight-row head, meaning that header 102 is of a width such that it can harvest eight crop rows at a time. In the example shown in FIG. 2, the crop rows include crop rows 204, 206, 208, 210, 212, 214, 216, and 218. As agricultural harvester 100 moves through the field, the crops that are harvested in rows 204-218 are severed by the cutter on header 102, and are moved inwardly toward a center of header 102, and are then moved rearwardly through feeder house 106 for processing in agricultural harvester 100 by the processing subsystems described earlier. For example, the crops in rows 204, 206, 208, and 210 are severed by the header 102 and are moved by a conveyor or draper belt (collectively referred to hereinafter as "conveyor") in the direction indicated by arrow 220 toward the center of header 102 where the severed crops are moved by another conveyor in the direction indicated by arrow 222 into feeder house 106. Similarly, the crops in rows 212, 214, 216, and 218, after being severed by header 102, are moved in the direction indicated by arrow 224 to the center portion of header 102 where the severed crops are moved in the direction indicated by arrow 222 back into feeder house 106.

Figure 3:
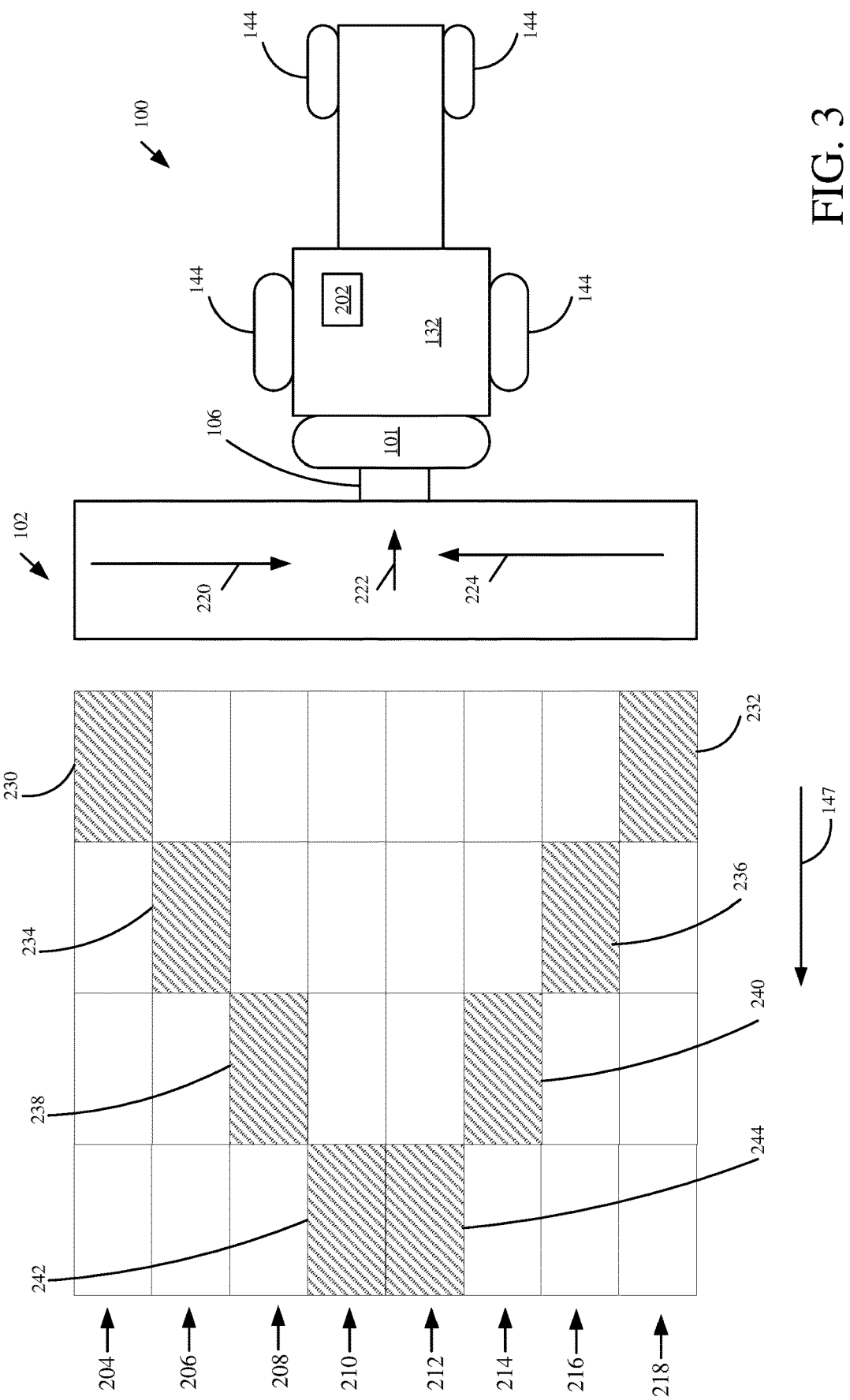
FIG. 3 is a pictorial illustration of an agricultural harvester and subregions in a field.

FIG. 2, thus, shows that the crops on the outermost rows 204 and 218 move a longer distance before the crops from the outermost rows 204 and 218 are processed by the processing subsystems in agricultural harvester 100 than the crops that are in rows closer to the center of agricultural harvester 100, such as the crops in rows 210 and 212. This means that, for crop harvested at the same point in time along a width of the header 102, the crop from the outermost rows 204 and 218 will reach the crop constituent sensor 202 at a time later than the crop from rows 210 and 212. Therefore, the crop that is being sensed by crop constituent sensor 202 at any given time is taken from subregions in the field that are spaced relative to one another in the direction indicated by arrow 147. FIG. 3 shows an example of this is more detail.

It can be seen in FIG. 3 that the crop rows 204-218 are broken up into subregions represented by the rectangles in FIG. 3. The shaded rectangles represent subregions of crop that will all reach the crop constituent sensor 202 at roughly the same time. For instance, as agricultural harvester 100 moves in the direction indicated by arrow 147, header 102 engages the crop in subregions 230 and 232 in rows 204 and 218. That crop will be severed by header 102 and begin moving in the directions indicated by arrows 220 and 224, respectively. Agricultural harvester 100 will then engage the crop in subregions 234 and 236 in rows 206 and 216 so that the crop from subregions 234 and 236 will be at approximately the same location on the conveyors that are conveying the crop from subregions 230 and 232 toward the center of agricultural harvester 100. As agricultural harvester 100 continues to move forward in the direction indicated by arrow 147, the crop in subregions 238 and 240 in rows 208 and 214 will be severed and will join the crop from subregions 230, 232, 234, and 236 at approximately the same location on the conveyors that are conveying the crop toward the center of header 102. As agricultural harvester 100 continues to move forward in the direction indicated by arrow 147, the crop from subregions 242 and 244 in rows 210 and 212 will also join the crop from the other subregions 230-240 at approximately the same location on the conveyors of header 102. Therefore, the crop from the subregions 230-244 will all be processed by the processing subsystems in agricultural harvester 100 at approximately the same time. The crop from subregions 230-244 will thus reach the crop constituent sensor 202 at approximately the same time as well. Therefore, a measurement of crop constituent that is generated by crop constituent sensor 202 will correspond to the crop in subregions 230-244 shown in FIG. 3.

It will be noted that the size of the different subregions 230-244 may vary based upon the forward ground speed of agricultural harvester 100 and the speed of the conveyors that convey the harvested crop in the directions indicated by arrows 220, 222, and 224. Therefore, the subregions 230-244 shown in FIG. 3 are show by way of example only.

In one example, the crop constituent value generated by crop constituent sensor 202 is assigned to the subregions 230-244. Also, as is described in greater detail below, the agricultural system in the present description obtains a map of agricultural characteristic-estimated crop constituent values for the field being harvested, such as a map of vegetative index-estimated crop constituent values for the field being harvested. The agricultural system combines the distributed crop constituent values in subregions 230-244 with the agricultural characteristic-estimated crop constituent values, such as the VI-estimated crop constituent values, in subregions 230-244 to obtain a weighted crop constituent value for each of the subregions 230-244 that may be more accurate than either the distributed crop constituent value or the agricultural characteristic-estimated crop constituent value for each subregion, such as the VI-estimated crop constituent value for each subregion.

Figure 4:
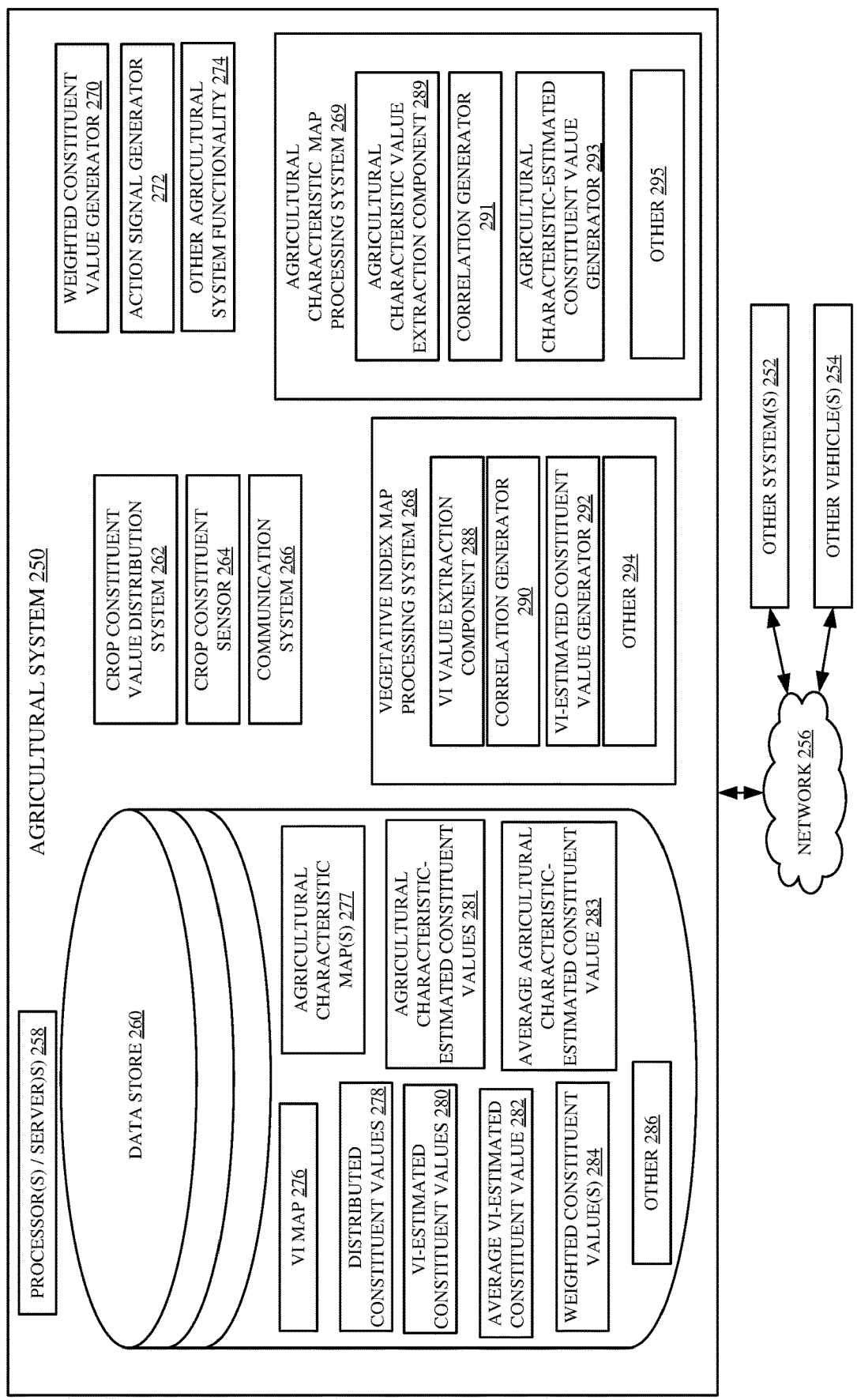
FIG. 4 is a block diagram of one example of an agricultural system.

FIG. 4 shows one example of a block diagram of such an agricultural system. FIG. shows an agricultural system 250 that can be disposed on agricultural harvester 100 or another system remote from agricultural harvester 100. In another example, some items of agricultural system 250 are disposed on agricultural harvester 100 while other parts of agricultural system 250 are disposed at other locations, remote from agricultural harvester 100. FIG. 4 also shows that, in one example, agricultural system 250 may be coupled to other systems 252 and other vehicles 254 over a network 256. Other systems 252 may be remote server systems that are located in a remote server architecture, such as the cloud. Other systems 252 can be farm manager computing systems or vendor computing systems. Other systems 252 can be any of a wide variety of other systems as well. Other vehicles 254 may be other agricultural harvesters, agricultural sprayers, or other agricultural vehicles.

Network 256 may be a wide area network, a local area network, a near field communication network, a cellular communication network, or a wide variety of other networks or combinations of networks.

FIG. 4 also shows that agricultural system 250 can include one or more processors or servers 258, data store 260, crop constituent value distribution system 262, crop constituent sensor 264, communication system 266, vegetative index map processing system 268, agricultural characteristic map processing system 269, weighted constituent value generator 270, action signal generator 272, and other agricultural system functionality 274. Data store 260 can include vegetative index map 276, one or more agricultural characteristic maps 277, distributed constituent values 278, VI-estimated constituent values 280, agricultural characteristic-estimated constituent values 281, average VI-estimated constituent value 282, average agricultural characteristic-estimated value 283, weighted constituent values 284, and other items 286. Vegetative index map processing system 268 can include VI value extraction component 288, correlation generator 290, VI-estimated constituent value generator 292, and other items 294. Agricultural characteristic map processing system 269 can include agricultural characteristic value extraction component 289, correlation generator 291, agricultural characteristic-estimated constituent value generator 293, and other items 295.

Before describing the overall operation of agricultural system 250 in more detail, a brief description of some of the items in agricultural system 250 and the operation of those items will first be described. VI map 276 includes vegetative index maps that store geo-referenced vegetative index values for the field being harvested. Agricultural characteristic map(s) 277 include one or more agricultural characteristic maps that store geo-referenced agricultural characteristic values for the field being harvested, such as one or more of geo-referenced soil types, geo-referenced soil nutrient values, geo-referenced historical values, for instance geo-referenced historical crop constituent values, geo-referenced crop genotypes, and geo-referenced prior operation values, for instance geo-referenced prior nutrient application values. Distributed constituent values 278 are crop constituent values that are sensed by crop constituent sensor 202 (shown in FIG. 3) and distributed to the subregions corresponding to the crop that was sensed and gave rise to the sensed constituent value. In one example, the distributed constituent values 278 are generated during runtime, as agricultural harvester 100 is harvesting. In another example, the crop constituent values sensed by crop constituent sensor 202 are distributed to the subregions after the harvesting process. In one example, the crop constituent values sensed by sensor 202 are geo-referenced to the subregions using a geographic position sensor 203 on agricultural harvester 100, the ground speed of agricultural harvester 100, and the speed of the conveyors moving grain on header 102, as well as any other machine delays in processing the crop.

VI-estimated constituent values 280 are geo-referenced constituent values corresponding to the field being harvested that were estimated based upon the VI values in VI map 276. As is described in greater detail below, vegetative index map processing system 268 extracts the VI values from VI map 276 and obtains or generates a correlation between the VI values and crop constituent values. Vegetative index map processing system 268 generates the geo-referenced VI-estimated constituent values 280 for the different geographic locations in the field being harvested. In some instances, the VI-estimated constituent values 280 are contained on a map that maps the VI-estimated constituent values 280 to the different geographic positions on the field. Average VI-estimated constituent values 282 are the average of the VI-estimated constituent values 280 for the set of subregions corresponding to a measurement taken by crop constituent sensor 264. Again, taking the example shown in FIG. 3, the average VI-estimated constituent value 282 is the average VI-estimated constituent value 280 for the subregions 230-244. In one example, weighted constituent values 284 include the crop constituent values for each subregion in a field that is generated based upon the distributed constituent value 278, the VI-estimated constituent value 280, and the average VI-estimated constituent value 282 corresponding to that subregion. One example of generating the weighted constituent values 284 is described in greater detail below.

Agricultural characteristic-estimated values 281 are geo-referenced constituent values corresponding to the field being harvested that were estimated based upon the agricultural characteristic values in one or more agricultural characteristic maps 277. As is described in greater detail below, agricultural characteristic map processing system 269 extracts the agricultural characteristic values from one or more agricultural characteristic maps 277 and obtains or generates a correlation between the agricultural characteristic values and crop constituent values. Agricultural characteristic map processing system 269 generates the geo-referenced agricultural characteristic-estimated constituent values 281 for the different geographic locations in the field being harvested. In some instances, the agricultural characteristic-estimated constituent values 281 are contained on a map that maps the agricultural characteristic-estimated constituent values 281 to the different geographic positions on the field. Average agricultural characteristic-estimated constituent values 283 are the average of the agricultural characteristic-estimated constituent values 281 for the set of subregions corresponding to a measurement taken by crop constituent sensor 264. Again, taking the example shown in FIG. 3, the average agricultural characteristic-estimated constituent value 283 is the average agricultural characteristic-estimated constituent value 281 for the subregions 230-244. In one example, weighted constituent values 284 include the crop constituent values for each subregion in a field that is generated based upon the distributed constituent value 278, the agricultural characteristic-estimated constituent value 281, and the average agricultural characteristic-estimated constituent value 283 corresponding to that subregion. One example of generating the weighted constituent values 284 is described in greater detail below.

In some examples, the weighted constituent values include the crop constituent values for each subregion in a field that is generated based upon the distribute constituent value 278, the VI-estimated constituent value 280, the agricultural characteristic-estimated constituent value 281, the average VI-estimated constituent value 282, and the average agricultural characteristic-estimated constituent value 283 corresponding to that subregion.

Crop constituent sensor 264 may be crop constituent sensor 200 or crop constituent sensor 202 from previous figures, or crop constituent sensor 264 may be a different crop constituent sensor on agricultural harvester 100. In some instances, crop constituent sensor 264 utilizes one or more bands of electromagnetic radiation in detecting crop constituents. For example, a crop constituent sensor 264 utilizes the reflectance or absorption of various ranges (e.g., various wavelengths or frequencies or both) of electromagnetic radiation by crop or other vegetation material, including grain of crop plants, in detecting crop constituents. In some examples, a crop constituent sensor 264 includes an optical sensor, such as an optical spectrometer. In one example, a crop constituent sensor 264 utilizes near-infrared spectroscopy or visible and near-infrared spectroscopy. In some instances, the crop constituent sensor 264 is disposed at or has access to various locations within agricultural harvester 100. For example, in some implementations, the crop constituent sensor 264 is disposed within the feeder house 106 (or otherwise have sensing access to crop material within feeder house 106) and is configured to detect constituents of harvested crop material passing through the feeder house 106. In other examples, the crop constituent sensor 264 is located at other areas within the agricultural harvester. For instance, in some instances, the crop constituent sensor 264 is on, coupled to, or disposed within the clean grain elevator 130; on, coupled to, or disposed within a clean grain auger; or on, coupled to, or disposed within a clean grain tank 132. It will be noted that these are merely examples of the types of locations of crop constituent sensor 264 and that various other types and locations of crop constituent sensor 264 are contemplated. Crop constituent value distribution system 262 obtains a crop constituent value from crop constituent sensor 264 (or from a data store where the value is stored) and distributes the sensed crop constituent value across the different subregions corresponding to the sensor measurement that generated that value. Again, taking the example shown in FIG. 3, crop constituent value distribution system 262 obtains a crop constituent value from crop constituent sensor 264 and distributes that value across the different subregions 230-244 that correspond to the crop which gave rise to the crop constituent value. For instance, crop constituent value distribution system 262 obtains a geographic subregions from a geographic position sensor 203 (such as a GPS receiver) and determines the geographic locations where the sensed crop constituent value is to be distributed.

In some examples, crop constituent sensor 264 relies on different types of radiation and the way in which the radiation is reflected by, absorbed by, attenuated by, or transmitted through the crop material, including grain. In some implementations, the crop constituent sensor 264 senses other electromagnetic properties of crop material, such as electrical permittivity when the material passes between two capacitive plates. Other material properties and sensors may also be used. In some examples, raw or processed data from crop constituent sensor 264 is presented to the operator of agricultural harvester 100 via an operator interface mechanism. The operator may be on-board of the agricultural harvester 100 or at a remote location such as at another system 252 or in another vehicle 254.

Communication system 266 enables communication among the items in agricultural system 250. Communication system 266 also enables communication over network 256. Therefore, the particular type of communication system 266 that is used in agricultural system 250 will depend on the type of communication that it is to facilitate.

In one example, vegetative index map processing system 268 obtains VI map 276 and generates the VI-estimated constituent values 280 that are geo-referenced to the field being harvested. In one example, vegetative index map processing system 268 generates a VI-estimated constituent map that includes the VI-estimated constituent values 280.

VI value extraction component 288 extracts the VI values from VI map 276. Correlation generator 290 then generates a correlation between the extracted VI values and crop constituent values. Correlation generator 290 can generate a correlation during runtime, or correlation generator 290 can obtain the correlation that was previously generated and stored (such as from a previous operation on the same worksite or another worksite). Generating the correlation between VI values and crop constituent values can be done in a variety of different ways. For example, generating the correlation between VI values and the crop constituent values can include 14 generating, as the correlation, a model. For instance, a VI value-to-crop constituent model generator (e.g., correlation generator 290) can identify a relationship between crop constituent values at different geographic locations in the field and vegetative index values from the VI map 276 for that same field. Based upon this relationship, a correlation or model can be generated by correlation generator 290. The correlation or model is applied to the VI values extracted from VI map 276 by VI value extraction component 288 to generate VI-estimated constituent values 280. For instance, VI-estimated constituent value generator 292 applies the correlation or model generated by correlation generator 290 to the different VI values corresponding to the different geographic locations on VI map 276. VI-estimated constituent value generator 292 generates an estimated crop constituent value for each of those geographic locations. In some instances, VI-estimated constituent value generator 292 outputs the VI-estimated constituent values 280, geo-referenced to the different locations in the field, on a map, such as a functional predictive VI-estimated constituent value map, or in other ways.

In one example, a model can be generated that models the relationship between crop constituent values and vegetative index values. The modeling can include correlating crop constituent values with vegetative index values corresponding to the same geographic locations as the crop constituent values. For instance, a VI value for a given location and a crop constituent value for that same location can be correlated (e.g., modeled). Then, the crop constituent value for a different given location (such as an unharvested location) can be estimated based on the VI value for the different given location (as derived from a VI map or other source) and the correlation (e.g., model). In one example, a VI value for a given location, such as from a VI map, and the crop constituent value detected by crop constituent sensor 264 corresponding to that given location can be correlated (e.g., modeled), and given a VI value, from the VI map, for a different given location (e.g., unharvested location) the crop constituent value for that different given location can be estimated based on the VI value and the correlation (e.g., model). The VI-estimated crop constituent values can be represented in a functional predictive VI-estimated crop constituent map that maps the VI-estimated crop constituent values to different geographic locations across the worksite, based on the correlation (e.g., model) and the VI map. The correlation (e.g., model) can be updated (e.g., remodeled, revised, etc.) based on further corresponding VI values and crop constituent values, such as further crop constituent values detected by crop constituent sensor 264. Further, a new map can be generated based on the updated model.

It can be seen that the correlation (e.g., model) can be predictive of crop constituents (e.g., can be a predictive crop constituent correlation [e.g., model]) in that it can receive, as an input, a VI value from a VI map and generate, as an output, a predictive (e.g., estimated) crop constituent value.

Weighted constituent value generator 270 then generates a weighted crop constituent value for each subregion on the field based on the distributed constituent values 278 for the subregions in the field, the VI-estimated constituent values 280 for the subregions in the field, and the average VI-estimated constituent value 282. In one example, weighted constituent value generator 270 may generate each of the weighted crop constituent values, for each of the different subregions in the field, using the following equation:

$$C_W = \frac{C_{DISTRIB} * C_{VI-EST}}{C_{AVG}} \qquad \text{Eq. 1}$$

Where:
$C_W$ is the weighted crop constituent value for the subregion under analysis;
$C_{DISTRIB}$ is the distributed crop constituent value for the subregion under analysis;
$C_{VI-EST}$ is the VI-estimated crop constituent value for the subregion under analysis; and
$C_{AVG}$ is the average of the VI-estimated crop constituent values for all subregions corresponding to the measurement interval.

In another example, agricultural characteristic map processing system 269 obtains one or more agricultural characteristic maps 277 and generates the agricultural characteristic-estimated constituent values 281 that are geo-referenced to the field being harvested. In one example, agricultural characteristic map processing system 269 generates an agricultural characteristic-estimated constituent map that includes the agricultural characteristic-estimated constituent values 281.

Agricultural characteristic value extraction component 289 extracts the agricultural characteristic values from one or more agricultural characteristic maps 277. Correlation generator 291 then generates a correlation between the extracted agricultural characteristic values and crop constituent values. Correlation generator 291 can generate a correlation during runtime, or correlation generator 291 can obtain the correlation that was previously generated and stored (such as from a previous operation on the same worksite or another worksite). Generating the correlation between agricultural characteristic values and crop constituent values can be done in a variety of different ways. For example, generating the correlation between agricultural characteristic values and the crop constituent values can include generating, as the correlation, a model. For instance, an agricultural characteristic-to-crop constituent model generator (e.g., correlation generator 291) can identify a relationship between crop constituent values at different geographic locations in the field and agricultural characteristics values from the one or more agricultural characteristic maps 277 for that same field. For example, a model can be generated that models the relationship between crop constituent values and agricultural characteristic values. The modeling can include correlating crop constituent values with agricultural characteristic values corresponding to the same geographic locations as the crop constituent values. Based upon this relationship, a correlation or model can be generated by correlation generator 291. The correlation or model is applied to the agricultural characteristic values extracted from the one or more agricultural characteristic maps 277 by agricultural characteristic value extraction component 289 to generate agricultural characteristic-estimated constituent values 281. For instance, agricultural characteristic-estimated constituent value generator 293 applies the correlation or model generated by correlation generator 291 to the different agricultural characteristic values corresponding to the different geographic locations on the one or more agricultural characteristic maps 277. Agricultural characteristic-estimated constituent value generator 293 generates an estimated crop constituent value for each of those geographic locations. In some instances, agricultural characteristic-estimated constituent value generator 293 outputs the agricultural characteristic-estimated constituent values 281, geo-referenced to the different locations in the field, on a map, such as a functional predictive agricultural characteristic-estimated crop constituent map, or in other ways.

In one example, a model can be generated that models the relationship between crop constituent values and agricultural characteristic values. The modeling can include correlating crop constituent values with agricultural characteristic values corresponding to the same geographic locations as the crop constituent values. For instance, one or more agricultural characteristic values for a given location and a crop constituent value for that same location can be correlated (e.g., modeled), and given the one or more agricultural characteristic values, such as from one or more agricultural characteristic maps, for another location the crop constituent value for the other location can be estimated based on the one or more agricultural characteristic values for the other location and the correlation (e.g., model). In one example, one or more agricultural characteristic values for a given location, such as from one or more agricultural characteristic maps, and the crop constituent value detected by crop constituent sensor 264 and corresponding to that given location can be correlated (e.g., modeled), and given one or more agricultural characteristic values, from the one or more agricultural characteristic maps, for a different given location (e.g., unharvested location) the crop constituent value for that different given location can be estimated based on the one or more agricultural characteristic values and the correlation (e.g., model). The agricultural characteristic-estimated crop constituent values can be represented in a functional predictive agricultural characteristic-estimated crop constituent map that maps the agricultural characteristic-estimated crop constituent values to different geographic locations across the worksite, based on the correlation (e.g., model) and the one or more agricultural characteristic maps. The correlation (e.g., model) can be updated (e.g., remodeled, revised, etc.) based on further corresponding VI values and crop constituent values, such as further crop constituent values detected by crop constituent sensor 264. Further, a new map can be generated based on the updated model.

Thus, it can be seen that the correlation (e.g., model) can be predictive of crop constituents (e.g., can be a predictive crop constituent correlation [e.g., model]) in that it can receive, as an input, a value of an agricultural characteristic from an agricultural characteristic map and generate, as an output, a predictive (e.g., estimated) crop constituent value.

Weighted constituent value generator 270 then generates a weighted crop constituent value for each subregion on the field based on the distributed constituent values 278 for the subregions in the field, the agricultural characteristic-estimated constituent values 281 for the subregions in the field, and the average agricultural characteristic-estimated constituent value 283. In one example, weighted constituent value generator may generate each of the weighted crop constituent values, for each of the different subregions in the field, using the following equation:

$$C_W = \frac{C_{DISTRIB} * C_{AG-EST}}{C_{AVGAG}} \quad \text{Eq. 2}$$

Where $C_W$ is the weighted crop constituent value for the subregion under analysis;
$C_{DISTRIB}$ is the distributed crop constituent value for the subregion under analysis;

$C_{AG-EST}$ is the agricultural characteristic-estimated crop constituent value for the subregion under analysis; and
$C_{AVGAG}$ is the average of the agricultural characteristic-estimated crop constituent values for all subregions corresponding to the measurement interval.

Weighted constituent value generator 270 generates the weighted crop constituent values on a weighted crop constituent value map of the field, or weighted constituent value generator 270 outputs the weighted crop constituent values geo-referenced to the subregions in the field in other ways.

Action signal generator 272 generates an action signal based upon the weighted crop constituent values generated by weighted constituent value generator 270. Action signal generator 272 generates one or more different action signals based upon the weighted crop constituent values output by weighted constituent value generator 270. For example, action signal generator 272 is used to control controllable subsystems on agricultural harvester 100 based upon the weighted crop constituent values output by weighted constituent value generator 270. It will be appreciated that the particular control signals that are generated and the particular controllable subsystems that are controlled may vary based upon one or more different criteria. For example, the control signals that are generated and the controllable subsystems that are controlled may be based upon whether the weighted crop constituent values are generated prior to the harvesting operation or during the harvesting operation.

In one example, the weighted crop constituent values generated by the weighted constituent value generator 270 include crop constituent values geo-referenced to locations within the field being harvested. The weighted crop constituent values may be generated prior to the harvesting operation, such as during a spraying operation or another agricultural operation. Action signal generator 272 may control the steering and propulsion subsystems of agricultural harvester 100 to control the heading and speed of agricultural harvester 100 to control a feed rate of material or grain moving through the agricultural harvester 100 based on the weighted crop constituent values and based on a geographic location of agricultural harvester 100. Similarly, the height of header 102 may be controlled to take in more or less material and thus control the feed rate of material through the agricultural harvester 100. In other examples, and assuming that the weighted crop constituent values at geographic locations ahead of agricultural harvester 100 are known, action signal generator 272 determines whether the weighted crop constituent values are higher on one portion of header 102 than another portion of header 102, resulting in a different biomass entering one side of the header 102 over the other side of the header 102. In such a case, action signal generator 272 may control the header 102 based upon the difference in weighted crop constituent values across the header 102. By way of example, a draper speed on one side of header 102 may be increased or decreased relative to the draper speed on the other side of header 102 to account for additional biomass.

In another example, action signal generator 272 may generate control signals to control communication system 266 to output the weighted crop constituent values generated by weighted constituent value generator 270 over network 256 to other systems 252 or other vehicles 254. Operations may be performed on the weighted crop constituent values at other systems 252 or in other vehicles 254.

The examples herein describe the generation of a predictive model and, in some examples, the generation of a functional predictive map based on the predictive model. The examples described herein are distinguished from other approaches by the use of a model which is at least one of multi-variate or site-specific (i.e., georeferenced, such as map-based). Furthermore, the model is revised as the work machine is performing an operation and while additional in-situ sensor data is collected. The model may also be applied in the future beyond the current worksite. For example, the model may form a baseline (e.g., starting point) for a subsequent operation at a different worksite or at the same worksite at a future time.

The revision of the model in response to new data may employ machine learning methods. Without limitation, machine learning methods may include memory networks, Bayes systems, decisions trees, Eigenvectors, Cluster Analysis, Eigenvalues and Machine Learning, Evolutionary and Genetic Algorithms, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning. Learning may be supervised or unsupervised.

Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make uses of networks of data values such as neural networks. These are just some examples of models.

The predictive paradigm examples described herein differ from non-predictive approaches where an actuator or other machine parameter is fixed at the time the machine, system, or component is designed, set once before the machine enters the worksite, is reactively adjusted manually based on operator perception, or is reactively adjusted based on a sensor value.

The functional predictive map examples described herein also differ from other map-based approaches. In some examples of these other approaches, an a priori control map is used without any modification based on in-situ sensor data or else a difference determined between data from an in-situ sensor and a predictive map are used to calibrate the in-situ sensor. In some examples of the other approaches, sensor data may be mathematically combined with a priori data to generate control signals, but in a location-agnostic way; that is, an adjustment to an a priori, georeferenced predictive setting is applied independent of the location of the work machine at the worksite. The continued use or end of use of the adjustment, in the other approaches, is not dependent on the work machine being in a particular defined location or region within the worksite.

In examples described herein, the functional predictive maps and predictive actuator control rely on obtained maps and in-situ data that are used to generate predictive models. The predictive models are then revised during the operation to generate revised functional predictive maps and revised actuator control. In some examples, the actuator control is provided based on functional predictive control zone maps which are also revised during the operation at the worksite. In some examples, the revisions (e.g., adjustments, calibrations, etc.) are tied to regions or zones of the worksite rather than to the whole worksite or some non-georeferenced condition. For example, the adjustments are applied to one or more areas of a worksite to which an adjustment is determined to be relevant (e.g., such as by satisfying one or more conditions which may result in application of an adjustment to one or more locations while not applying the adjustment to one or more other locations), as opposed to applying a change in a blanket way to every location in a non-selective way.

In some examples described herein, the models determine and apply those adjustments to selective portions or zones of the worksite based on a set of a priori data, which, in some instances, is multivariate in nature. For example, adjustments may, without limitation, be tied to defined portions of the worksite based on site-specific factors such as topography, soil type, crop variety, soil moisture, as well as various other factors, alone or in combination. Consequently, the adjustments are applied to the portions of the field in which the site-specific factors satisfy one or more criteria and not to other portions of the field where those site-specific factors do not satisfy the one or more criteria. Thus, in some examples described herein, the model generates a revised functional predictive map for at least the current location or zone, the unworked part of the worksite, or the whole worksite.

As an example, in which the adjustment is applied only to certain areas of the field, consider the following. The system may determine that a detected in-situ characteristic value (e.g., detected crop constituent value) varies from a predictive value of the characteristic (e.g., predictive crop constituent value), such as by a threshold amount. This deviation may only be detected in areas of the field where the elevation of the worksite is above a certain level. Thus, the revision to the predictive value is only applied to other areas of the worksite having elevation above the certain level. In this simpler example, the predictive characteristic value and elevation at the point the deviation occurred and the detected characteristic value and elevation at the point the deviation cross the threshold are used to generate a linear equation. The linear equation is used to adjust the predictive characteristic value in unharvested areas of the worksite in the functional predictive map as a function of elevation and the predicted characteristic value. This results in a revised functional predictive map in which some values are adjusted while others remain unchanged based on selected criteria, e.g., elevation as well as threshold deviation. The revised functional map is then used to generate a revised functional control zone map for controlling the machine.

As an example, without limitation, consider an instance of the paradigm described herein which is parameterized as follows.

One or more maps of the field are obtained, such as one or more of a vegetative index map and another type of agricultural characteristic map.

In-situ sensors generate sensor data indicative of in-situ characteristic values, such as in-situ crop constituent values.

A predictive model generator generates one or more predictive models based on the one or more obtained maps and the in-situ sensor data, such as a predictive crop constituent model.

A predictive map generator generates one or more functional predictive maps based on a model generated by the predictive model generator and the one or more obtained maps. For example, the predictive map generator may generate a functional predictive crop constituent map that maps predictive crop constituent values to one or more locations on the worksite based on a predictive crop constituent model and the one or more obtained maps.

Control zones, which include machine settings values, can be incorporated into the functional predictive crop constituent map to generate a functional predictive crop constituent control zone map.

As the mobile machine continues to operate at the worksite, additional in-situ sensor data is collected. A learning trigger criteria can be detected, such as threshold amount of additional in-situ sensor data being collected, a magnitude of change in a relationship (e.g., the in-situ characteristic values varies to a certain [e.g., threshold] degree from a predictive value of the characteristic), and operator or user makes edits to the predictive map(s) or to a control algorithm, or both, a certain (e.g., threshold) amount of time elapses, as well as various other learning trigger criteria. The predictive model(s) are then revised based on the additional in-situ sensor data and the values from the obtained maps. The functional predictive maps or the functional predictive control zone maps, or both, are then revised based on the revised model(s) and the values in the obtained maps.

Figure 5A:
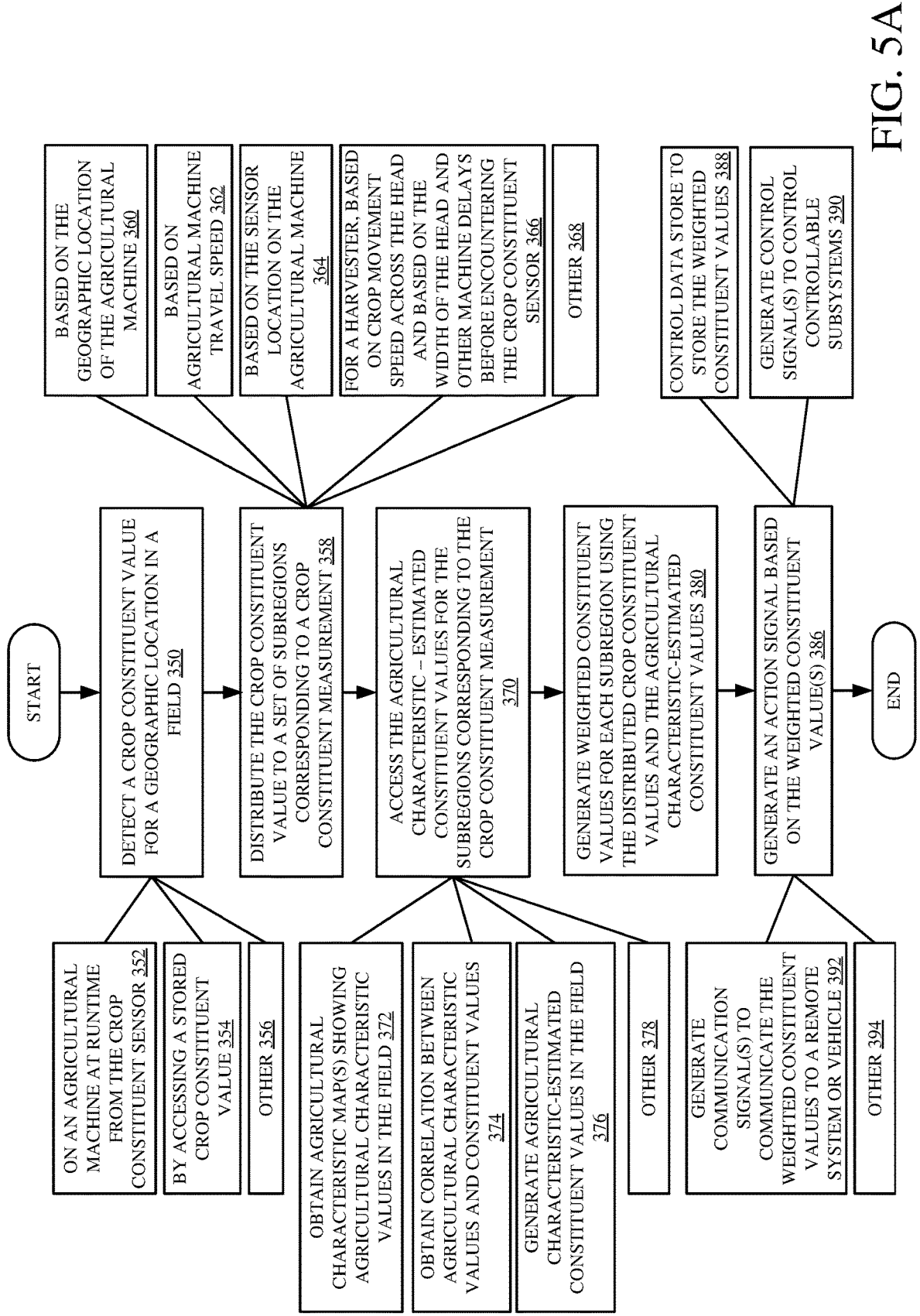
FIG. 5A is a flow diagram illustrating one example of the operation of an agricultural system.

FIG. 5A is a flow diagram showing one example of how agricultural system 250 generates weighted constituent values 284 for a set of subregions corresponding to a measured or detected aggregated constituent value that is sensed or detected by crop constituent sensor 264 during a measurement interval.

At block 350, crop constituent value distribution system 262 first obtains a crop constituent value for a geographic location in a field under analysis. Block 352 shows that, crop constituent value distribution system 262 may obtain the crop constituent value during runtime from crop constituent sensor 264. Block 354 shows that crop constituent value distribution system 262 may obtain the crop constituent value by accessing a stored crop constituent value that was obtained previously for the geographic location in the field. By way of example, it may be that a crop constituent sensor 264 is deployed on a sprayer and the sprayer generates crop constituent values corresponding to different geographic locations in the field being sprayed. The crop constituent values generated for the different geographic locations in the field being sprayed may be stored for later access by agricultural system 250. In one example, it may be that a crop constituent sensor 264 is deployed on an agricultural harvester and the agricultural harvester generates crop constituent values corresponding to different geographic locations in the field being harvested. The crop constituent values generated for the different geographic locations in the field being harvested may be stored for later use by agricultural system 250, such as to correctly allocate the crop constituent values to the different geographic locations in the field after the harvesting operation is complete.

Block 356 shows that crop constituent value distribution system 262 may obtain or detect the crop constituent value in other ways.

At block 358, crop constituent value distribution system 262 then distributes the crop constituent value to a set of subregions. By way of example, and referring to FIG. 3, when crop constituent sensor 200, 202 takes a measurement, crop constituent value distribution system 262 can distribute the crop constituent sensor value to the subregions 230-244. The geographic location of the subregions may be based on one or more of the criteria in blocks 360, 362, 364, 366, and 368. The geographic location of the subregions may be based upon a geographic location of agricultural harvester 100 at the time the measurement from crop constituent sensor 200, 202 is taken as indicated by block 360. Block 362 shows that the geographic location of each of the subregions 230-244 may be based upon the travel speed or ground speed of the agricultural machine (e.g., of the agricultural harvester 100 in the example shown in FIG. 3). Block 364 shows that the geographic location of the subregions 230-244 may also be based upon the location of sensor 200, 202 on the agricultural machine (e.g., in the example shown in FIG. 3 on agricultural harvester 100). Block 366 shows that when the agricultural machine is an agricultural harvester 100, then the geographic location of each of the subregions 230-244 may also be based upon the crop movement speed across the header 102, based upon the width of the header 102, and based upon other machine delays between when the crop is harvested and when it encounters crop constituent sensor 200, 202. For instance, the location of the sensor 200, 202, the location of the machine, the travel speed and heading of the agricultural machine, and the machine delays in processing and transporting the crop material to the sensor (e.g., crop movement speed across the head, width of the head, and other machine delays) may be used to identify a geographic location of the subregions. For example, there may be a time delay (e.g., latency) between when the crop is encountered by the agricultural machine and when the crop material is sensed by the sensor 200, 202. That time delay (e.g., latency) may be identified (e.g., based on machine delays). In some examples, the time delay (e.g., latency) may be fixed (at least for a particular machine or machine model). In other examples, the time delay (e.g., latency) may be variable and based on factors during the operation, such as the travel speed of the machine, the parameters of working parts of the machine, characteristics of the crop, as well as various other factors. The geographic location of the sensor at the time of the measurement of the crop material (as derived from the geographic position of the agricultural machine and the distance between the geographic position sensor and the sensor 200, 202) along with the speed and heading of the agricultural machine may be used, in combination with the identified time delay (e.g., latency), to identify a geographic location of the subregions to which the measurement corresponds. If the measurement was taken at location X, and calculated machine delay is 16 seconds, and the speed of the agricultural machine is 5 miles per hour (MPH) (or 7.33333 feet per second) heading due north, then the location of the subregions (location Y) can be identified as 117.33328 feet (16 seconds multiplied by 7.33333 feet per second) due south (as the machine was/is heading due north) of location X. This is merely an example.

Block 368 shows that crop constituent value distribution system 262 may distribute the crop constituent value to the subregions in other ways and based on other distribution criteria.

Agricultural characteristic map processing system 269 then accesses one or more agricultural characteristic maps 277 to generate the agricultural characteristic-estimated constituent values 281. At block 370, weighted constituent value generator 270 obtains access to the agricultural characteristic-estimated constituent values 281 for the subregions under analysis. It will be noted that in some examples agricultural characteristic map processing system 269 may access the agricultural characteristic values on the one or more agricultural characteristic maps 277 and generate the agricultural characteristic-estimated constituent values 281 ahead of time, such as before operating at the field or before operating at a particular portion of the field, using the model or other correlation that correlates the agricultural characteristic values on the one or more agricultural characteristic maps 277 to crop constituent values. Block 372 shows that agricultural characteristic value extraction component 289 obtains the one or more agricultural characteristic maps 277 that show agricultural characteristic values for the different subregions in the field. Block 374 shows that correlation generator 291 generates or obtains a correlation between agricultural characteristic values and constituent values, and block 376 shows that agricultural characteristic-estimated constituent value generator 293 generates the agricultural characteristic-estimated constituent values 281 for the subregions in the field.

Block 378 shows that weighted constituent value generator 270 may access the agricultural characteristic-estimated constituent values 281 in other ways as well.

At block 380, weighted constituent value generator 270 generates weighted crop constituent values for each of the subregions using the distributed crop constituent values 278 for those subregions, and the agricultural characteristic-estimated constituent values 281 for those subregions. In one example, weighted constituent value generator 270 us the equation illustrated above in Equation 2 to generate the weighted crop constituent value for each of the subregions.

Once the weighted crop constituent values are generated for each subregion corresponding to a constituent measurement, action signal generator 272 generates an action signal based upon the weighted crop constituent values, as indicated by block 386. In one example, action signal generator 272 generates actions signals to store the weighted crop constituent values in data store 260, as indicated by block 388. Block 390 shows that action signal generator 272 may generate control signals to control controllable subsystems on the agricultural machine (such as agricultural harvester 100). At block 392, action signal generator generates control signals to control communication system 266 to communicate the weighted crop constituent values to a remote system 252 or to a remote vehicle 254, such as another agricultural machine, for instance, another agricultural harvester. Block 394 shows that action signal generator 272 may generate other action signals in other ways as well.

Figure 5B:
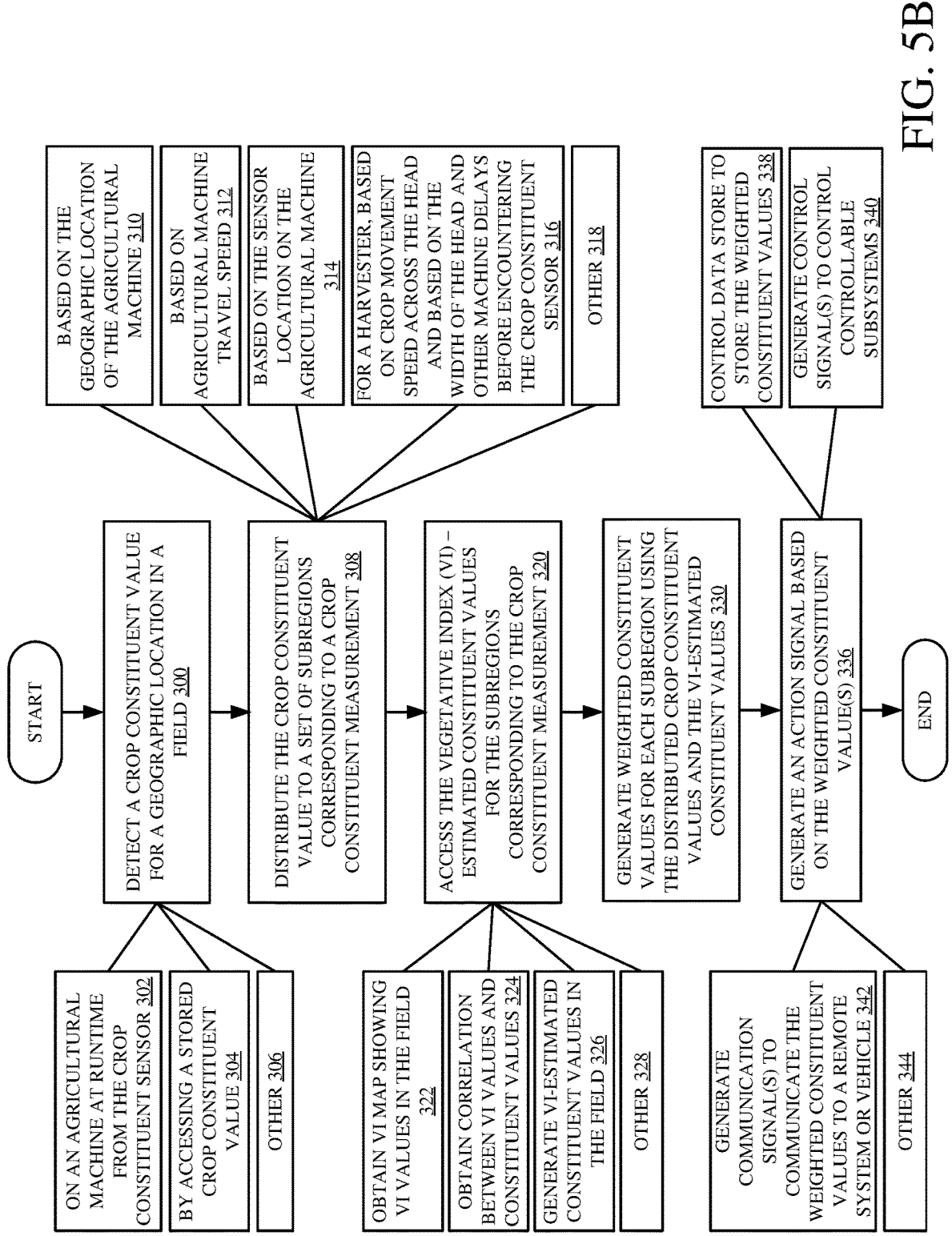
FIG. 5B is a flow diagram illustrating one example of the operation of an agricultural system.

FIG. 5B is a flow diagram showing one example of how agricultural system 250 generates weighted constituent values 284 for a set of subregions corresponding to a measured or detected aggregate constituent value that is sensed or detected by crop constituent sensor 264 during a measurement interval.

At block 300, crop constituent value distribution system 262 first obtains a crop constituent value for a geographic location in a field under analysis. Block 302 shows that, crop constituent value distribution system 262 may obtain the crop constituent value during runtime from crop constituent sensor 264. Block 304 shows that crop constituent value distribution system 262 may obtain the crop constituent value by accessing a stored crop constituent value that was obtained previously for the geographic location in the field. By way of example, it may be that a crop constituent sensor 264 is deployed on a sprayer and the sprayer generates crop constituent values corresponding to different geographic locations in the field being sprayed. The crop constituent values generated for the different geographic locations in the field being sprayed may be stored for later access by agricultural system 250. In one example, it may be that a crop constituent sensor 264 is deployed on an agricultural harvester and the agricultural harvester generates crop constituent values corresponding to different geographic locations in the field being harvested. The crop constituent values generated for the different geographic locations in the field being harvested may be stored for later use by agricultural system 250, such as to correctly allocate the crop constituent values to the different geographic locations in the field after the harvesting operation is complete.

Block 306 shows that crop constituent value distribution system 262 may obtain or detect the crop constituent value in other ways.

At block 308, crop constituent value distribution system 262 then distributes the crop constituent value to a set of subregions. By way of example, and referring to FIG. 3, when crop constituent sensor 200, 202 takes a measurement, crop constituent value distribution system 262 can distribute the crop constituent sensor value to the subregions 230-244. The geographic location of the subregions may be based upon a geographic location of agricultural harvester 100 at the time the measurement from crop constituent sensor 200, 202 is taken as indicated by block 310. Block 312 shows that the geographic location of each of the subregions 230-244 may be based upon the travel speed or ground speed of the agricultural machine (e.g., of the agricultural harvester 100 in the example shown in FIG. 3). Block 314 shows that the geographic location of the subregions 230-244 may also be based upon the location of sensor 200, 202 on the agricultural machine (e.g., in the example shown in FIG. 3 on agricultural harvester 100). Block 316 shows that when the agricultural machine is an agricultural harvester 100, then the geographic location of each of the subregions 230-244 may also be based upon the crop movement speed across the header 102, based upon the width of the header 102, and based upon other machine delays between when the crop is harvested and when it encounters crop constituent sensor 200, 202. Block 318 shows that crop constituent value distribution system 262 may distribute the crop constituent value to the subregions in other ways and based on other distribution criteria.

Vegetative index map processing system 268 then accesses VI map 276 to generate the VI-estimated constituent values 280. At block 320, weighted constituent value generator 270 obtains access to the vegetative index (VI)-estimated constituent values 280 for the subregions under analysis. It will be noted that in some examples vegetative index map processing system 268 can access the VI values on VI map 276 and generate the VI-estimated constituent values 280 ahead of time, such as before operating at the field or before operating at a particular portion of the field, using the model or other correlation that correlates the VI values on VI map 276 to crop constituent values. Block 322 shows that VI value extraction component 288 obtains the VI map 276 that shows VI values for the different subregions in the field. Block 324 shows that correlation generator 290 generates or obtain a correlation between VI values and constituent values, and block 326 shows that VI-estimated constituent value generator 292 generates the VI-estimated constituent values 280 for the subregions in the field.

Block 328 shows that weighted constituent value generator 270 may access the vegetative index-estimated constituent values 280 in other ways as well.

At block 330, weighted constituent value generator 270 generates weighted crop constituent values for each of the subregions using the distributed crop constituent values 278 for those subregions, and the VI-estimated constituent values 280 for those subregions. In one example, weighted constituent value generator 270 uses the equation illustrated above in Equation 1 to generate the weighted crop constituent value for each of the subregions.

FIG. 6 shows one example of the set of subregions 230-244 from FIG. 3 along with a table 334 that includes the crop constituent value (where the constituent is protein measured in grams/kilogram) for each of the subregions, the VI-estimated constituent value for each of the subregions, and the weighted crop constituent value for each subregion. FIG. 6 also shows that the average VI-estimated constituent value for the subregions 230-244 is 135 grams/kilogram. Row 204 in Table 334 shows the distributed constituent value, the VI-estimated constituent value and the weighted crop constituent value for subregion 230. Row 206 in table 334 shows the same values for subregion 234. Row 208 in Table 334 shows the same values for subregion 238. Row 210 in Table 334 shows the same values for subregion 242. Row 212 in Table 334 shows the same values for subregion 244. Row 214 in Table 334 shows the same values for subregion 240. Row 216 in table 334 shows the same values for subregion 236 and row 218 in Table 334 shows the same values for subregion 232. Applying Equation 1 to the values in Row 1 is illustrated by Equation 3 below:

$$C_{W_{230}} = \frac{(120_{g/kg})(140_{g/kg})}{135_{g/kg}} \quad \text{Eq. 3}$$
$$= 124.44_{g/kg}$$

$C_{W_{230}}$ is the weighted crop constituent value for subregion 230.

It will be noted that Equation 1 is one example of how the weighted crop constituent values can be generated based upon the distributed constituent values and VI-estimated constituent values, and other equations or mechanisms can be used to generate the weighted crop constituent values as well, such as Equation 2.

Once the weighted crop constituent values are generated for each subregion corresponding to a constituent measurement, action signal generator 272 generates an action signal based upon the weighted crop constituent values, as indicated by block 336 in the flow diagram illustrated in FIG. 5B. In one example, action signal generator 272 generates action signals to store the weighted crop constituent values in data store 260, as indicated by block 338. Block 340 shows that action signal generator 272 may generate control signals to control controllable subsystems on the agricultural machine (such as agricultural harvester 100). At block 342, action signal generator 272 generates control signals to control communication system 266 to communicate the weighted crop constituent values to a remote system 252 or a remote vehicle 254, such as another agricultural machine, for instance, another agricultural harvester. Block 344 shows that action signal generator 272 generates other action signals in other ways as well.

FIGS. 5A and 5B have discussed a system and methods for generating weighted crop constituent values for a set of subregions 230-244 corresponding to a measurement taken by crop constituent sensor 264 during a single measurement interval. It will be appreciated that the steps illustrated in FIGS. 5A and 5B may be taken repeatedly in order to generate the weighted crop constituent values for all subregions in a field, or for multiple different sets of subregions in a field.

It can thus be seen that the present description describes a system in which crop constituent values from a sensor are distributed to subregions within a field where the crop resides that gave rise to the sensor measurement. The distributed crop constituent values are then combined with an agricultural characteristic-estimated constituent value, such as a VI-estimated constituent value, for the same subregion to obtain a weighted crop constituent value for that subregion. Action signals may then be generated based upon the weighted crop constituent values.

The present discussion has proceeded with respect to an agricultural vehicle that comprises agricultural harvester 100. It could just as easily, though, have proceeded with respect to a different agricultural vehicle, such as a sprayer.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface displays have been discussed. The user interface display can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 7:
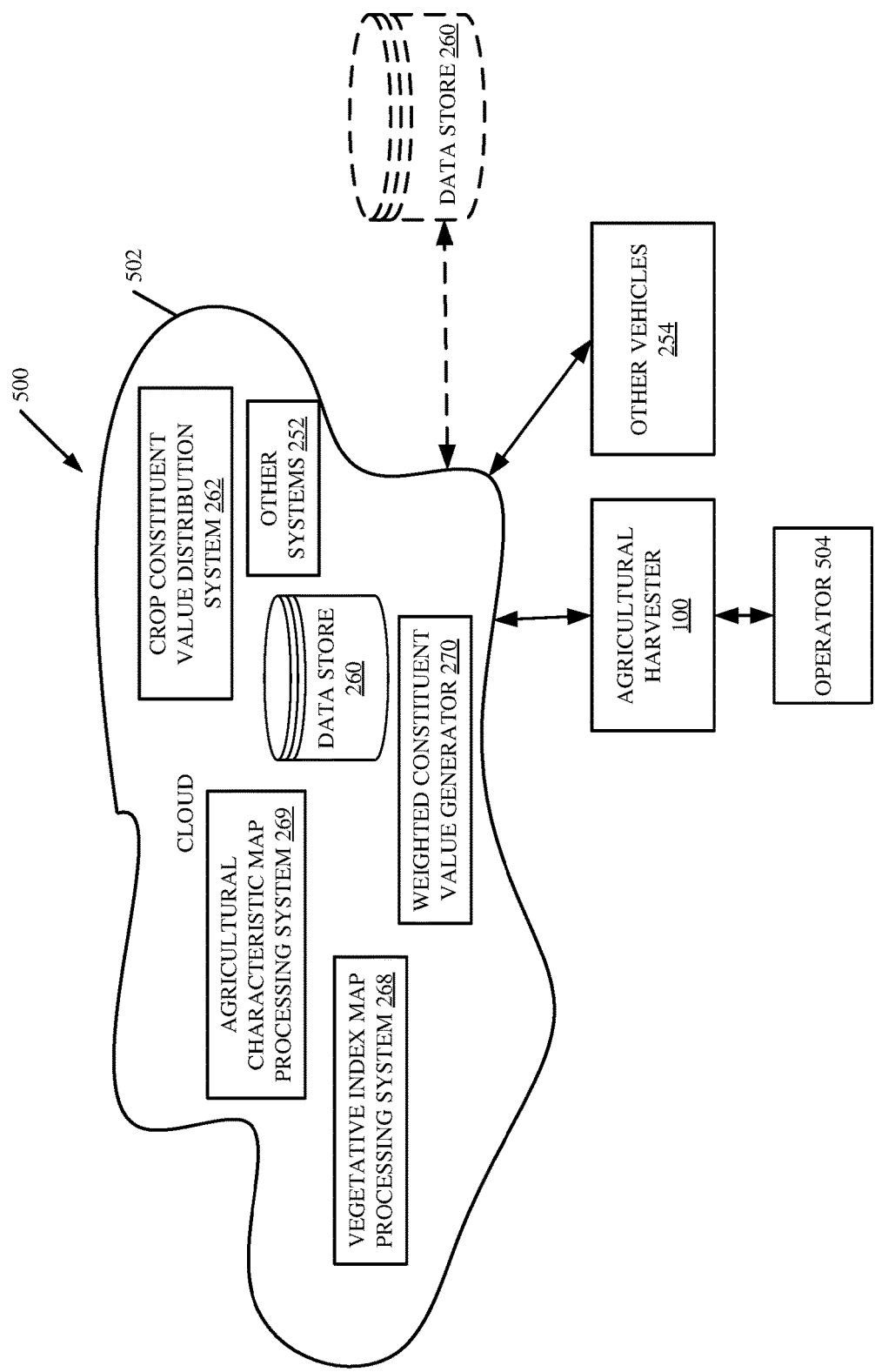
FIG. 7 is a block diagram of one example of the agricultural system illustrated in FIG. 4 deployed a remote server architecture.

FIG. 7 is a block diagram of agricultural system 250, shown in FIG. 4, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols.

For instance, remote servers can deliver applications over a wide area network and they can be accessed through a web browser or any other computing component. Software or components shown in FIG. 4 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIG. 4 and they are similarly numbered. FIG. 7 specifically shows that other systems 252, weighted constituent value generator 270, vegetative index map processing system 268, agricultural characteristic map processing system 269, crop constituent value distribution system 262, and data store 260 can be located at a remote server location 502. Therefore, harvester 100 or other vehicles 254, or both, access those systems through remote server location 502.

FIG. 7 also depicts another example of a remote server architecture. FIG. 7 shows that it is also contemplated that some elements of FIG. 1 are disposed at remote server location 502 while others are not. By way of example, data store 260 can be disposed at a location separate from location 502, and accessed through the remote server at location 502. Regardless of where the items are located, the items can be accessed directly by harvester 100, through a network (either a wide area network or a local area network), they can be hosted at a remote site by a service, or the items can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the agricultural harvester 100 comes close to the fuel truck for fueling, the system automatically collects the information from the agricultural harvester 100 using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the agricultural harvester 100 until the agricultural harvester 100 enters a covered location. The agricultural harvester 100, itself, can then send the information to the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
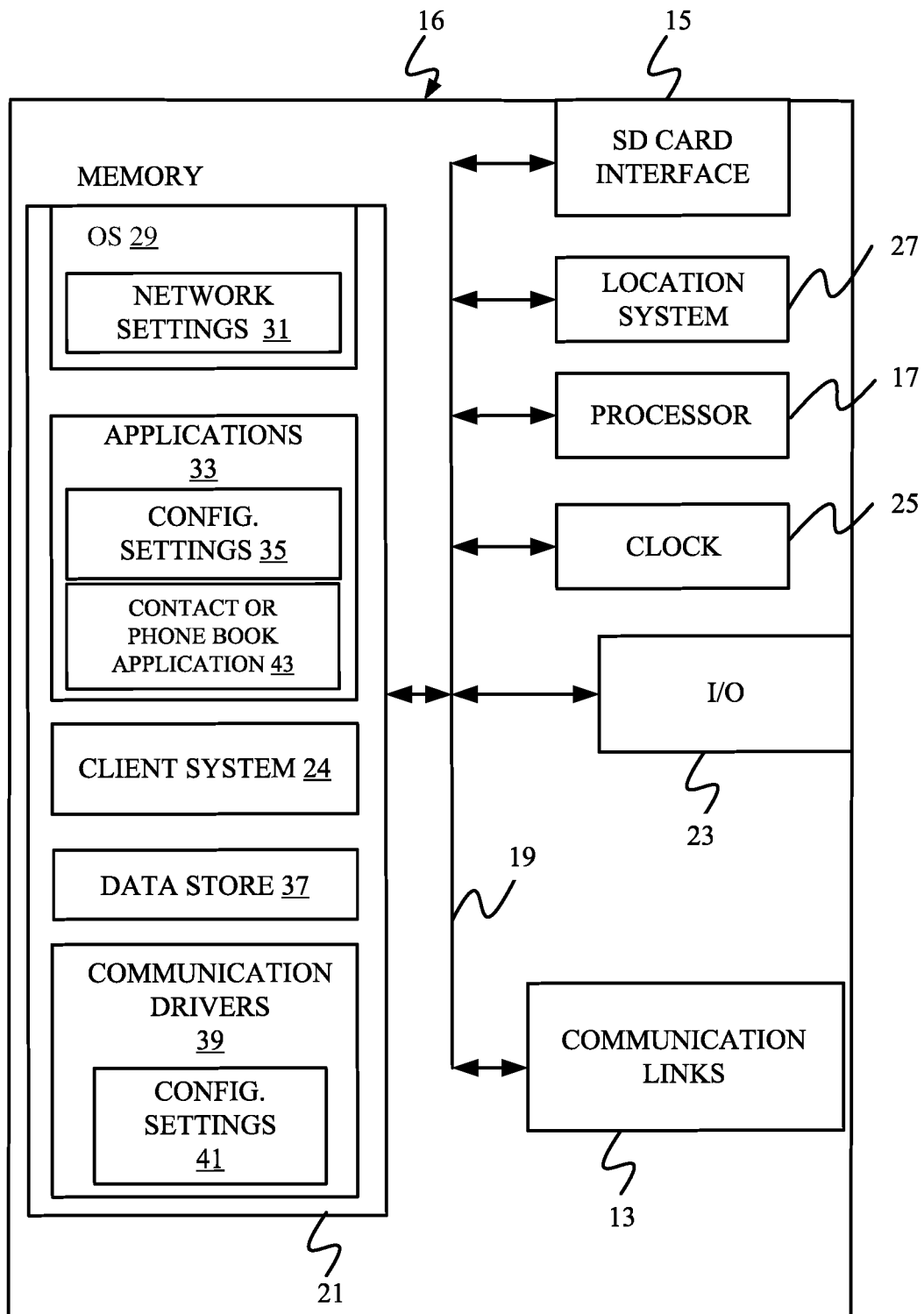
FIGS. 8-10 show examples of mobile devices.
Figure 9:
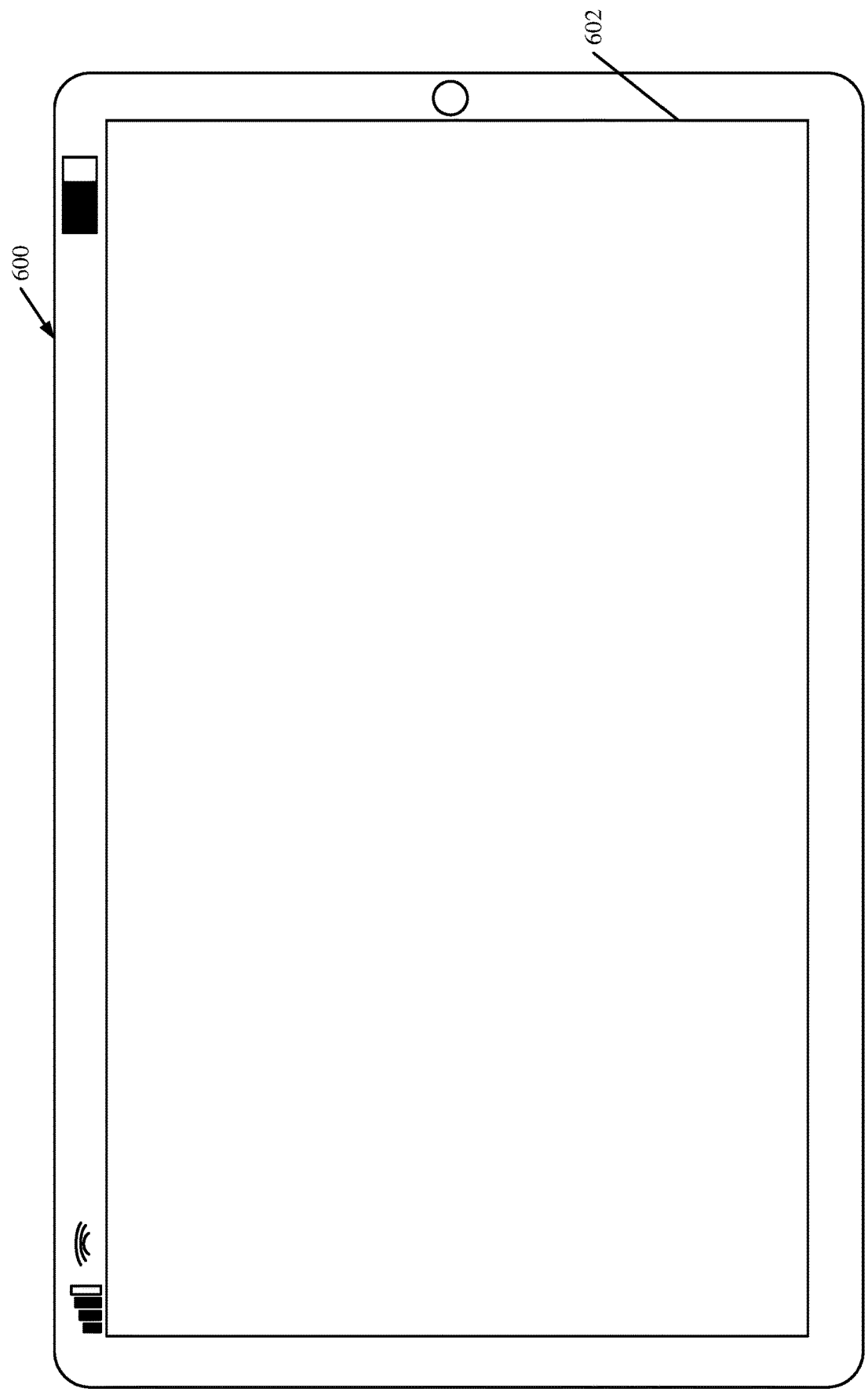
Figure 10:
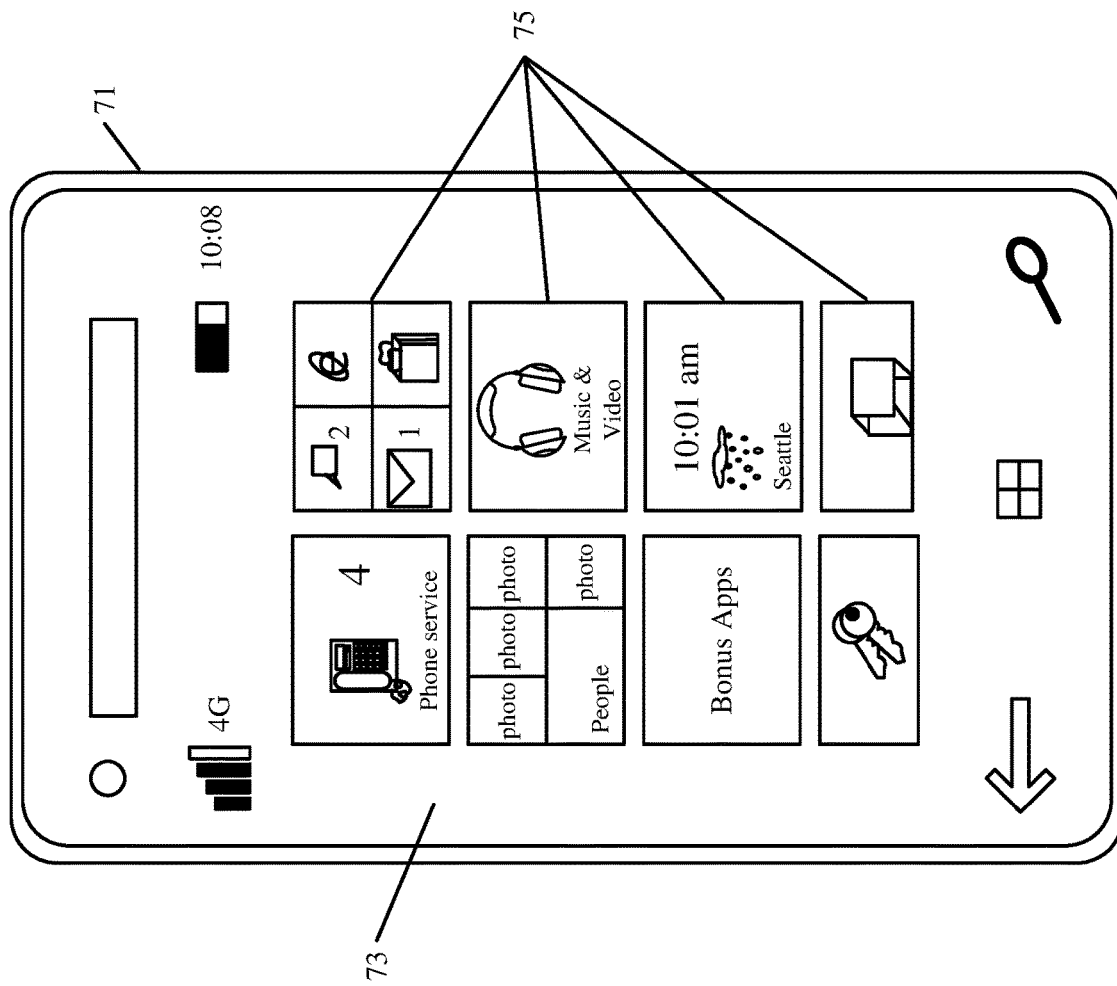

FIG. 8 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 for use in generating, processing, or displaying the stool width and position data. FIGS. 8-10 are examples of handheld or mobile devices.

FIG. 8 provides a general block diagram of the components of a client device 16 that can run some components shown in FIG. 4, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 9 shows one example in which device 16 is a tablet computer 600. In FIG. 9, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 10 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 11:
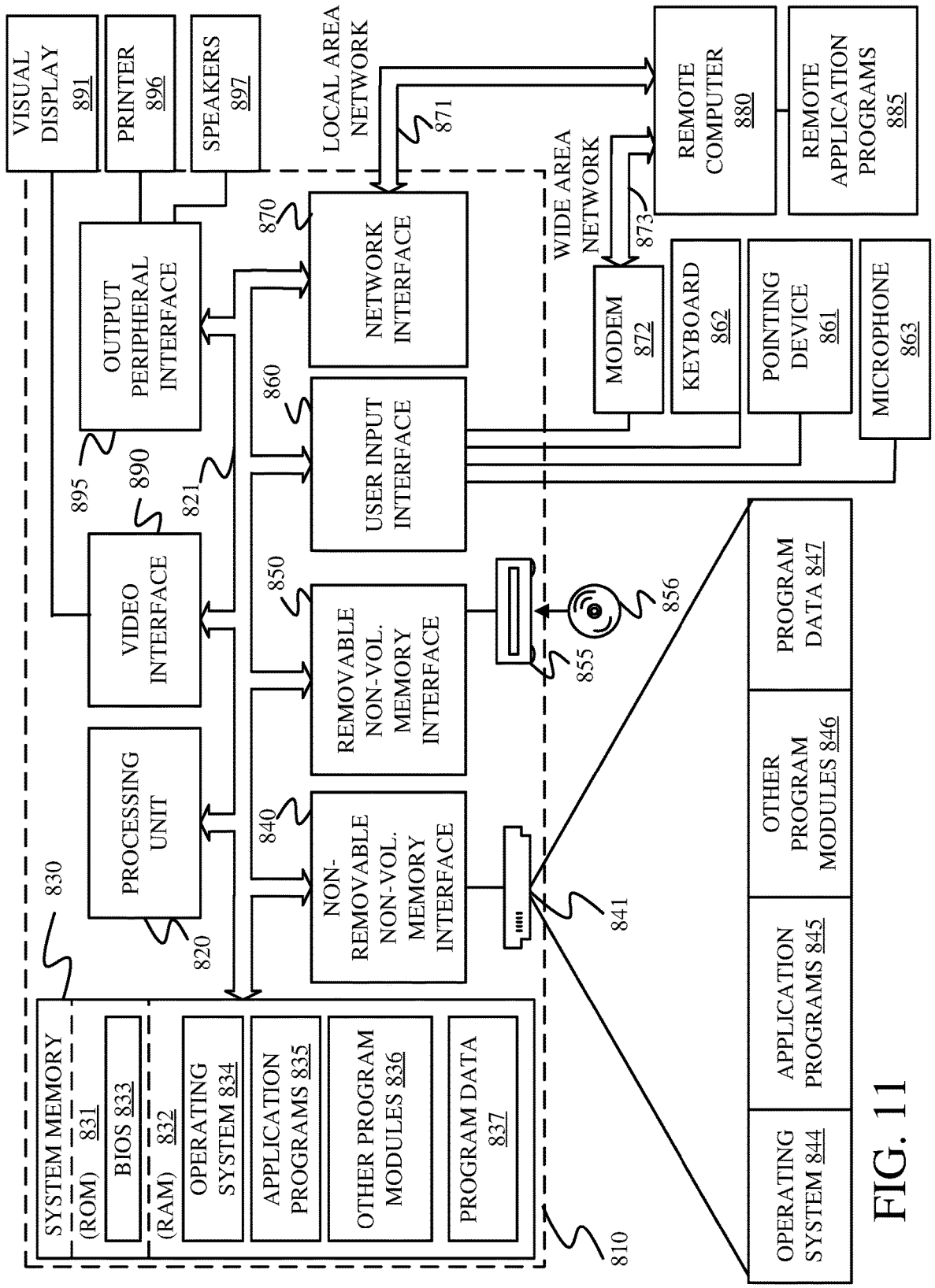
FIG. 11 is a block diagram of one example of a computing environment that can be used in the architectures illustrated in the previous figures.

FIG. 11 is one example of a computing environment in which elements of FIGS. 1-10, or parts of it, (for example) can be deployed. With reference to FIG. 11, an example system for implementing some embodiments includes a general-purpose computing device in the form of a computer 810 programmed to act as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIGS. 1-9 can be deployed in corresponding portions of FIG. 11.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 11 illustrates operating system 834, application programs 835, other program modules 836, and program data 837.

The computer 810 may also include other removable/non-removable volatile/nonvolatile computer storage media. By way of example only, FIG. 11 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 11, provide storage of computer readable instructions, data structures, program modules and other data for the computer 810. In FIG. 11, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network— CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 11 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural system comprising:
a crop constituent value distribution system configured to obtain a detected crop constituent value detected by a crop constituent sensor, the detected crop constituent value corresponding to a sensor measurement by the crop constituent sensor, the crop constituent value distribution system further configured to assign the detected crop constituent value, as a distributed constituent value, to a set of subregions from which the detected crop constituent value was measured during the sensor measurement;
a weighted constituent value generator configured to generate a weighted crop constituent value for each subregion in the set of subregions, the weighted crop constituent value for a subregion in the set of subregions being based on the distributed constituent value for the subregion and based on an agricultural characteristic-estimated constituent value for the subregion that is estimated based on an agricultural characteristic value for the subregion; and
an action signal generator configured to control a controllable subsystem of an agricultural machine based on the weighted crop constituent value for the subregions in the set of subregions.

2. The agricultural system of claim 1 wherein the agricultural characteristic-estimated constituent value for the subregion that is estimated based on an agricultural characteristic value for the subregion comprises a vegetative index (VI)-estimated constituent value for the subregion that is estimated based on a VI value for the subregion and further comprising:
a vegetative index map processing system configured to access a VI map that includes a VI value georeferenced to each of the subregions in the set of subregions and to generate the VI-estimated constituent value for the subregion in the set of subregions based on the VI value georeferenced to the subregion in the set of subregions.

3. The agricultural system of claim 2, wherein the vegetative index map processing system comprises:
a VI value extraction component configured to access VI values for each of the subregions from the VI map.

4. The agricultural system of claim 3, wherein the vegetative index map processing system comprises:
a correlation generator configured to generate a VI value-to-constituent value correlation between a given VI value and a constituent value.

5. The agricultural system of claim 4, wherein the vegetative index map processing system comprises:
a VI-estimated constituent value generator configured to generate the VI-estimated constituent value for the subregion based on the VI value georeferenced to the subregion and the VI value-to-constituent value correlation.

6. The agricultural system of claim 1, wherein the agricultural machine is an agricultural harvester.

7. The agricultural system of claim 1 and further comprising:
a communication system configured to communicate with a remote system over a network,
wherein the action signal generator is configured to generate an action signal to control the communication system to communicate the weighted crop constituent value to the remote system.

8. The agricultural system of claim 1 and further comprising:
a data store, and
wherein the action signal generator is configured to generate an action signal to control the data store to store the weighted crop constituent value.

9. The agricultural system of claim 1, wherein the agricultural machine comprises an agricultural harvester, and wherein the crop constituent sensor is deployed on the agricultural harvester and is configured to detect the crop constituent value corresponding to harvested crop during a harvesting operation.

10. A computer implemented method of controlling an agricultural machine comprising:
obtaining a detected crop constituent value detected by a crop constituent sensor, the detected crop constituent value corresponding to a sensor measurement by the crop constituent sensor;
assigning the detected crop constituent value, as a distributed constituent value, to a set of subregions from which the detected crop constituent value was measured during the sensor measurement;
generating a weighted crop constituent value for each subregion in the set of subregions, the weighted crop constituent value for a subregion in the set of subregions being based on the distributed constituent value for the subregion and based on an agricultural characteristic-estimated constituent value for the subregion that is estimated based on an agricultural characteristic value for the subregion; and
controlling a controllable subsystem of the agricultural machine based on the weighted crop constituent value for the subregions in the set of subregions.

11. The computer implemented method of claim 10, wherein the agricultural characteristic-estimated constituent value for the subregion that is estimated based on an agricultural characteristic value for the subregion comprises a vegetative index (VI)-estimated constituent value for the subregion that is estimated based on a VI value for the subregion, the method further comprising:
accessing a VI map that includes a VI value georeferenced to each of the subregions in the set of subregions; and
generating the VI-estimated constituent value for the subregion in the set of subregions based on the VI value georeferenced to the subregion in the set of subregions.

12. The computer implemented method of claim 11, wherein accessing a VI map comprises:
accessing VI values for each of the subregions from the VI map.

13. The computer implemented method of claim 12, wherein generating the VI-estimated constituent value comprises:
generating a VI value-to-constituent value correlation between a given VI value and a given crop constituent value.

14. The computer implemented method of claim 13, wherein generating the VI-estimated constituent value comprises:
generating the VI-estimated constituent value for the subregion based on the VI value georeferenced to the subregion and the VI value-to-constituent value correlation.

15. The computer implemented method of claim 10, wherein the agricultural machine comprises an agricultural harvester.

16. The computer implemented method of claim 10 and further comprising:
generating an action signal to control a communication system to communicate the weighted crop constituent value to a remote system.

17. The computer implemented method of claim 10, wherein the agricultural system comprises a data store, the computer implemented method further comprising:
generating an action signal to control the data store to store the weighted crop constituent value.

18. The computer implemented method of claim 10, wherein the agricultural machine comprises an agricultural harvester,
wherein the crop constituent sensor is deployed on the agricultural harvester, and
wherein obtaining a detected crop constituent value comprises:
detecting the crop constituent value corresponding to harvested crop during a harvesting operation.

19. An agricultural system comprising:
an agricultural vehicle configured to perform an agricultural operation in a field;
a crop constituent sensor, mounted on the agricultural vehicle, configured to perform a sensor measurement to detect a crop constituent value during the agricultural operation;
a crop constituent value distribution system configured to obtain the detected crop constituent value and to assign the crop constituent value, as a distributed constituent value, to a set of subregions from which the detected crop constituent value was measured during the sensor measurement;
a weighted constituent value generator configured to generate a weighted crop constituent value for each subregion in the set of subregions, the weighted crop constituent value for a subregion in the set of subregions being based on the distributed constituent value for the subregion and based on a vegetative index (VI)-estimated constituent value for the subregion that is estimated based on a VI value for the subregion; and
an action signal generator configured to control the agricultural vehicle based on the weighted crop constituent value for the subregions in the set of subregions.

20. The agricultural system of claim 19 and further comprising:
a VI value extraction component configured to access VI values for each of the subregions from a VI map that includes VI values georeferenced to the subregions;
a correlation generator configured to generate a VI value-to-constituent value correlation between a given VI value and a constituent value; and
a VI-estimated constituent value generator configured to generate the VI-estimated constituent value for the subregion based on the VI value georeferenced to the subregion and the VI value-to-constituent value correlation.

* * * * *